(12) United States Patent
Breuer et al.

(10) Patent No.: US 7,623,515 B2
(45) Date of Patent: Nov. 24, 2009

(54) CONTENT ROUTER NOTIFICATION

(75) Inventors: Matthias Breuer, Seevetal (DE); Marco Boerries, Los Altos Hills, CA (US); Markus Meyer, Winsen Luhe (DE); Venkatachary Srinivasan, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 825 days.

(21) Appl. No.: 11/182,288

(22) Filed: Jul. 14, 2005

(65) Prior Publication Data
US 2007/0014300 A1    Jan. 18, 2007

(51) Int. Cl.
H04L 12/28 (2006.01)
(52) U.S. Cl. .................... 370/389; 370/401
(58) Field of Classification Search ........... 370/389, 370/401, 392, 400, 402, 422, 465, 466, 467, 370/471, 386, 356, 349, 353, 352, 360, 301, 370/395.3, 395.2, 395.6, 395.21; 709/246, 709/203, 244
See application file for complete search history.

(56) References Cited

U.S. PATENT DOCUMENTS

| 4,354,230 A | 10/1982 | Murphy et al. |
|---|---|---|
| 4,631,146 A | 12/1986 | Gebauer et al. |
| 5,371,743 A | 12/1994 | DeYesso et al. |
| 5,371,882 A | 12/1994 | Ludlam |
| 5,436,960 A | 7/1995 | Campana, Jr. et al. |
| 5,440,719 A | 8/1995 | Hanes et al. |
| 5,457,478 A | 10/1995 | Frank |
| 5,475,813 A | 12/1995 | Cieslak et al. |
| 5,481,668 A | 1/1996 | Marcus |
| 5,625,757 A | 4/1997 | Kageyama et al. |
| 5,663,948 A | 9/1997 | Kobunaya |
| 5,668,943 A | 9/1997 | Attanasio et al. |
| 5,684,952 A | 11/1997 | Stein |
| 5,684,990 A | 11/1997 | Boothby |
| 5,727,202 A | 3/1998 | Kucala |
| 5,742,905 A | 4/1998 | Pepe et al. |
| 5,764,908 A | 6/1998 | Shoji et al. |
| 5,774,668 A | 6/1998 | Choquier et al. |
| 5,787,437 A | 7/1998 | Potterveld et al. |
| 5,814,798 A | 9/1998 | Zancho |
| 5,815,663 A | 9/1998 | Uomini |
| 5,852,724 A | 12/1998 | Glenn, II et al. |
| 5,864,653 A | 1/1999 | Tavallaei et al. |

(Continued)

FOREIGN PATENT DOCUMENTS

EP    0 144 815 A1    6/1985

(Continued)

OTHER PUBLICATIONS

International Preliminary Report on Patentability mailed on Jan. 16, 2008, for PCT Application PCT/US2006/023533, filed on Jun. 16, 2008, five pages.

(Continued)

*Primary Examiner*—Chi H Pham
*Assistant Examiner*—Alexander Boakye
(74) *Attorney, Agent, or Firm*—Morrison & Foerster LLP

(57) ABSTRACT

An apparatus, method and computer program product for communicating an outgoing command from a command memory of a content router to a content node using a notification signal to a gateway.

125 Claims, 28 Drawing Sheets

U.S. PATENT DOCUMENTS

| | | |
|---|---|---|
| 5,941,946 A | 8/1999 | Baldwin et al. |
| 5,956,719 A | 9/1999 | Kudo et al. |
| 5,974,417 A | 10/1999 | Bracho et al. |
| 6,005,860 A | 12/1999 | Anderson et al. |
| 6,021,449 A | 2/2000 | Chow et al. |
| 6,069,896 A | 5/2000 | Borgstahl et al. |
| 6,092,169 A | 7/2000 | Murthy et al. |
| 6,105,067 A | 8/2000 | Batra |
| 6,108,779 A | 8/2000 | Dean et al. |
| 6,134,581 A | 10/2000 | Ismael et al. |
| 6,141,690 A | 10/2000 | Weiman |
| 6,144,999 A | 11/2000 | Khalidi et al. |
| 6,157,944 A | 12/2000 | Pedersen |
| 6,163,856 A | 12/2000 | Dion et al. |
| 6,170,065 B1 | 1/2001 | Kobata et al. |
| 6,192,396 B1 | 2/2001 | Kohler |
| 6,236,991 B1 | 5/2001 | Frauenhofer et al. |
| 6,256,676 B1 | 7/2001 | Taylor et al. |
| 6,304,981 B1 | 10/2001 | Spears et al. |
| 6,311,187 B1 | 10/2001 | Jeyaraman |
| 6,327,610 B2 | 12/2001 | Uchida et al. |
| 6,327,612 B1 | 12/2001 | Watanabe |
| 6,452,809 B1 | 9/2002 | Jackson et al. |
| 6,457,062 B1 | 9/2002 | Pivowar et al. |
| 6,463,032 B1 | 10/2002 | Lau et al. |
| 6,463,463 B1 | 10/2002 | Godfrey et al. |
| 6,477,580 B1 | 11/2002 | Bowman-Amuah |
| 6,489,954 B1 | 12/2002 | Powlette |
| 6,496,858 B1 | 12/2002 | Frailong et al. |
| 6,496,941 B1 | 12/2002 | Segal et al. |
| 6,505,236 B1 | 1/2003 | Pollack |
| 6,510,050 B1 | 1/2003 | Lee et al. |
| 6,530,083 B1 | 3/2003 | Liebenow |
| 6,543,004 B1 | 4/2003 | Cagle et al. |
| 6,571,354 B1 | 5/2003 | Parks et al. |
| 6,577,905 B1 | 6/2003 | Robertson et al. |
| 6,596,077 B2 | 7/2003 | Myerson |
| 6,611,849 B1 | 8/2003 | Raff et al. |
| 6,622,192 B2 | 9/2003 | Chou et al. |
| 6,633,907 B1 | 10/2003 | Spencer et al. |
| 6,633,910 B1 | 10/2003 | Rajan et al. |
| 6,647,260 B2 | 11/2003 | Dusse et al. |
| 6,654,500 B1 | 11/2003 | Lyu |
| 6,670,982 B2 | 12/2003 | Clough et al. |
| 6,671,824 B1 | 12/2003 | Hyland et al. |
| 6,687,716 B1 | 2/2004 | Bradley |
| 6,691,243 B1 | 2/2004 | Belgardt et al. |
| 6,697,977 B2 | 2/2004 | Ozaki |
| 6,711,579 B2 | 3/2004 | Balakrishnan |
| 6,728,786 B2 | 4/2004 | Hawkins et al. |
| 6,744,874 B2 | 6/2004 | Wu |
| 6,748,570 B1 | 6/2004 | Bahrs et al. |
| 6,751,661 B1 | 6/2004 | Geddes |
| 6,766,469 B2 | 7/2004 | Larson et al. |
| 6,769,124 B1 | 7/2004 | Schoening et al. |
| 6,785,680 B1 | 8/2004 | Cragun |
| 6,785,712 B1 | 8/2004 | Hogan et al. |
| 6,785,868 B1 | 8/2004 | Raff |
| 6,799,224 B1 | 9/2004 | Dellacona |
| 6,813,770 B1 | 11/2004 | Allavarpu et al. |
| 6,822,951 B1 | 11/2004 | Patton |
| 6,834,195 B2 | 12/2004 | Brandenberg et al. |
| 6,839,564 B2 | 1/2005 | Sutinen et al. |
| 6,839,744 B1 | 1/2005 | Kloba et al. |
| 6,848,034 B2 | 1/2005 | Cohn et al. |
| 6,853,713 B1 * | 2/2005 | Fobert et al. ............ 379/142.17 |
| 6,857,123 B1 | 2/2005 | Nuxoll et al. |
| 6,859,834 B1 | 2/2005 | Arora et al. |
| 6,865,157 B1 | 3/2005 | Scott et al. |
| 6,865,261 B1 | 3/2005 | Rao et al. |
| 6,865,597 B1 | 3/2005 | Bandopadhyay et al. |
| 6,868,444 B1 | 3/2005 | Kim et al. |
| 6,883,034 B1 | 4/2005 | Pelavin et al. |
| 6,892,311 B2 | 5/2005 | Coppock et al. |
| 6,895,480 B2 | 5/2005 | Heil |
| 6,898,422 B2 | 5/2005 | Bern et al. |
| 6,901,429 B2 | 5/2005 | Dowling |
| 6,904,043 B1 | 6/2005 | Merchant et al. |
| 6,931,454 B2 | 8/2005 | Deshpande et al. |
| 6,944,662 B2 | 9/2005 | Devine et al. |
| 6,950,821 B2 | 9/2005 | Faybishenko et al. |
| 6,965,929 B2 | 11/2005 | Kumar |
| 7,000,032 B2 | 2/2006 | Kloba et al. |
| 7,020,662 B2 | 3/2006 | Boreham et al. |
| 7,028,312 B1 * | 4/2006 | Merrick et al. ............... 719/330 |
| 7,035,902 B1 | 4/2006 | Bates et al. |
| 7,051,087 B1 | 5/2006 | Bahl et al. |
| 7,051,088 B2 | 5/2006 | Sesek |
| 7,085,822 B1 | 8/2006 | Donatelli et al. |
| 7,085,824 B2 | 8/2006 | Forth et al. |
| 7,089,259 B1 | 8/2006 | Kouznetsov et al. |
| 7,089,297 B1 | 8/2006 | Salas et al. |
| 7,093,006 B2 | 8/2006 | Sanjeev et al. |
| 7,293,109 B2 | 11/2007 | Ott et al. |
| 7,487,262 B2 * | 2/2009 | Cardina et al. ............... 709/246 |
| 2001/0042124 A1 | 11/2001 | Barron |
| 2001/0047402 A1 | 11/2001 | Saimi et al. |
| 2001/0049286 A1 | 12/2001 | Hansmann et al. |
| 2001/0054073 A1 | 12/2001 | Ruppert et al. |
| 2002/0016818 A1 | 2/2002 | Kirani et al. |
| 2002/0032020 A1 | 3/2002 | Brown et al. |
| 2002/0039420 A1 | 4/2002 | Shacham et al. |
| 2002/0116396 A1 | 8/2002 | Somers et al. |
| 2002/0124114 A1 | 9/2002 | Bottom et al. |
| 2002/0129109 A1 | 9/2002 | Nozaki et al. |
| 2002/0133821 A1 | 9/2002 | Shteyn |
| 2002/0138579 A1 | 9/2002 | Goldberg |
| 2002/0161769 A1 | 10/2002 | Sutinen et al. |
| 2002/0174180 A1 | 11/2002 | Brown et al. |
| 2002/0194083 A1 | 12/2002 | Balabhadrapatruni et al. |
| 2003/0004884 A1 | 1/2003 | Kitazato |
| 2003/0018922 A1 | 1/2003 | Litwin, Jr. et al. |
| 2003/0065717 A1 | 4/2003 | Saito et al. |
| 2003/0074358 A1 | 4/2003 | Sarbaz et al. |
| 2003/0081557 A1 | 5/2003 | Mettala et al. |
| 2003/0084177 A1 | 5/2003 | Mulligan |
| 2003/0097361 A1 | 5/2003 | Huang et al. |
| 2003/0097381 A1 | 5/2003 | Detweiler et al. |
| 2003/0097487 A1 | 5/2003 | Rietze et al. |
| 2003/0130882 A1 | 7/2003 | Shuttleworth et al. |
| 2003/0143983 A1 | 7/2003 | Crampton |
| 2003/0145021 A1 | 7/2003 | Parkkinen |
| 2003/0145074 A1 | 7/2003 | Penick |
| 2003/0147219 A1 | 8/2003 | Chou |
| 2003/0172138 A1 | 9/2003 | McCormack et al. |
| 2003/0172139 A1 | 9/2003 | Srinivasan et al. |
| 2003/0172175 A1 | 9/2003 | McCormack et al. |
| 2003/0177171 A1 | 9/2003 | Brown, Jr. et al. |
| 2003/0187996 A1 | 10/2003 | Cardina et al. |
| 2003/0195922 A1 | 10/2003 | Andrews et al. |
| 2003/0212684 A1 | 11/2003 | Meyer et al. |
| 2003/0212739 A1 | 11/2003 | Boucher et al. |
| 2003/0212818 A1 | 11/2003 | Klein et al. |
| 2003/0212826 A1 | 11/2003 | Rapakko et al. |
| 2003/0217125 A1 | 11/2003 | Brancati et al. |
| 2004/0003132 A1 | 1/2004 | Stanley et al. |
| 2004/0006551 A1 | 1/2004 | Sahinoja et al. |
| 2004/0010569 A1 | 1/2004 | Thomas et al. |
| 2004/0034692 A1 | 2/2004 | Eguchi et al. |
| 2004/0044799 A1 | 3/2004 | Sivaraman et al. |
| 2004/0049543 A1 | 3/2004 | Kaminsky et al. |
| 2004/0059834 A1 | 3/2004 | Taylor et al. |
| 2004/0078450 A1 | 4/2004 | Chen et al. |
| 2004/0083472 A1 | 4/2004 | Rao et al. |

| | | | | | | |
|---|---|---|---|---|---|---|
| 2004/0088390 A1 | 5/2004 | Hall et al. | | EP | 1 406 458 A1 | 4/2004 |
| 2004/0088414 A1 | 5/2004 | Flynn et al. | | EP | 1 418 771 A2 | 5/2004 |
| 2004/0103157 A1 | 5/2004 | Requena et al. | | EP | 1 418 772 A2 | 5/2004 |
| 2004/0143836 A1 | 7/2004 | McCormack et al. | | EP | 1 443 701 A1 | 8/2004 |
| 2004/0151125 A1 | 8/2004 | Holmeide et al. | | JP | 5-67059 A | 3/1993 |
| 2004/0179529 A1 | 9/2004 | Pettey et al. | | JP | 7-262104 A | 10/1995 |
| 2004/0181580 A1 | 9/2004 | Baranshamaje | | JP | 10-308758 A | 11/1998 |
| 2004/0199614 A1 | 10/2004 | Shenfield et al. | | JP | 2000-209254 A | 7/2000 |
| 2004/0210450 A1 | 10/2004 | Atencio et al. | | JP | 2001-326695 A | 11/2001 |
| 2004/0215749 A1 | 10/2004 | Tsao | | JP | 2002-198925 A | 7/2002 |
| 2004/0225693 A1 | 11/2004 | Ganji et al. | | WO | WO-97/28505 A1 | 8/1997 |
| 2004/0230661 A1 | 11/2004 | Rashid et al. | | WO | WO-98/59477 A1 | 12/1998 |
| 2004/0246996 A1 | 12/2004 | Engel | | WO | WO-99/34305 A1 | 7/1999 |
| 2004/0247090 A1 | 12/2004 | Nurmela | | WO | WO-99/61984 A1 | 12/1999 |
| 2004/0252700 A1 | 12/2004 | Anandakumar et al. | | WO | WO-99/62268 A2 | 12/1999 |
| 2005/0003807 A1 | 1/2005 | Rosenfelt et al. | | WO | WO-99/62268 A3 | 12/1999 |
| 2005/0010653 A1 | 1/2005 | McCanne | | WO | WO-99/65256 A2 | 12/1999 |
| 2005/0015430 A1 | 1/2005 | Rothman et al. | | WO | WO-99/65256 A3 | 12/1999 |
| 2005/0021637 A1 | 1/2005 | Cox | | WO | WO-99/65256 C1 | 12/1999 |
| 2005/0041652 A1 | 2/2005 | Roy | | WO | WO-00/67176 A2 | 11/2000 |
| 2005/0043060 A1 | 2/2005 | Brandenberg et al. | | WO | WO-00/67176 A3 | 11/2000 |
| 2005/0044187 A1 | 2/2005 | Jhaveri et al. | | WO | WO-00/67176 C1 | 11/2000 |
| 2005/0044235 A1 | 2/2005 | Balahura et al. | | WO | WO-01/75684 A2 | 10/2001 |
| 2005/0055698 A1 | 3/2005 | Sasaki et al. | | WO | WO-01/75684 A3 | 10/2001 |
| 2005/0059393 A1 | 3/2005 | Knowles | | WO | WO-01/97442 A2 | 12/2001 |
| 2005/0060355 A1 | 3/2005 | Kadyk et al. | | WO | WO-01/97442 A3 | 12/2001 |
| 2005/0063398 A1 | 3/2005 | Choudhury et al. | | WO | WO-02/27547 A1 | 4/2002 |
| 2005/0063543 A1 | 3/2005 | Kayalackakom et al. | | WO | WO-02/33593 A1 | 4/2002 |
| 2005/0067482 A1 | 3/2005 | Wu et al. | | WO | WO-02/091224 A1 | 11/2002 |
| 2005/0071423 A1 | 3/2005 | Rajaniemi | | WO | WO-03/005206 A2 | 1/2003 |
| 2005/0076086 A1 | 4/2005 | Budd et al. | | WO | WO-03/005206 A3 | 1/2003 |
| 2005/0080891 A1 | 4/2005 | Cauthron | | WO | WO 03/005276 A2 | 1/2003 |
| 2005/0100329 A1 | 5/2005 | Lao et al. | | WO | WO 03/005276 A3 | 1/2003 |
| 2005/0108289 A1 | 5/2005 | East et al. | | WO | WO-03/079144 A2 | 9/2003 |
| 2005/0198351 A1 | 9/2005 | Nog et al. | | WO | WO-03/079144 A3 | 9/2003 |
| 2005/0234843 A1 | 10/2005 | Beckius et al. | | WO | WO-03/083691 A1 | 10/2003 |
| 2006/0259511 A1 | 11/2006 | Boerries et al. | | WO | WO-03/102778 A2 | 12/2003 |
| 2007/0014243 A1 | 1/2007 | Meyer et al. | | WO | WO-03/102778 A3 | 12/2003 |
| 2007/0014244 A1 | 1/2007 | Srinivasan et al. | | WO | WO-2004/040470 A1 | 5/2004 |
| 2007/0014277 A1 | 1/2007 | Ebbesen et al. | | WO | WO-2004/044773 A1 | 5/2004 |
| 2007/0014278 A1 | 1/2007 | Ebbesen et al. | | WO | WO-2004/049104 A2 | 6/2004 |
| 2007/0014303 A1 | 1/2007 | Schulz et al. | | WO | WO-2004/049104 A3 | 6/2004 |
| 2007/0014307 A1 | 1/2007 | Srinivasan et al. | | WO | WO-2005/001665 A2 | 1/2005 |
| 2007/0016632 A1 | 1/2007 | Schulz et al. | | WO | WO-2005/008998 A1 | 1/2005 |
| 2007/0016636 A1 | 1/2007 | Boerries et al. | | WO | WO-2005/010715 A2 | 2/2005 |
| 2007/0016646 A1 | 1/2007 | Tendjoukian et al. | | WO | WO-2005/011215 A1 | 2/2005 |
| 2007/0016676 A1 | 1/2007 | Breuer et al. | | | | |
| 2007/0028000 A1 | 2/2007 | Ebbesen et al. | | | | |
| 2007/0028293 A1 | 2/2007 | Boerries et al. | | | | |
| 2007/0038703 A1 | 2/2007 | Tendjoukian et al. | | | | |
| 2007/0100856 A1 | 5/2007 | Ebbesen | | | | |
| 2007/0100975 A1 | 5/2007 | Srinivasan et al. | | | | |
| 2007/0101021 A1 | 5/2007 | Meyer et al. | | | | |
| 2007/0101022 A1 | 5/2007 | Schulz et al. | | | | |
| 2007/0112880 A1 | 5/2007 | Yang et al. | | | | |
| 2008/0189379 A1 | 8/2008 | Naick et al. | | | | |

FOREIGN PATENT DOCUMENTS

| | | |
|---|---|---|
| EP | 0 144 815 B1 | 6/1985 |
| EP | 0 772 327 A2 | 5/1997 |
| EP | 0 772 327 A3 | 5/1997 |
| EP | 0 772 327 B1 | 5/1997 |
| EP | 0 909 058 A2 | 4/1999 |
| EP | 0 909 058 A3 | 4/1999 |
| EP | 0 909 058 B1 | 4/1999 |
| EP | 0 986 225 A1 | 3/2000 |
| EP | 1 126 387 A2 | 8/2001 |
| EP | 1 126 387 A3 | 8/2001 |
| EP | 1 221 661 A2 | 7/2002 |
| EP | 1 221 661 A3 | 7/2002 |
| EP | 1 280 314 A2 | 1/2003 |
| EP | 1 296 252 A1 | 3/2003 |

OTHER PUBLICATIONS

International Preliminary Report on Patentability mailed on Mar. 4, 2008, for PCT Application PCT/US2006/026304, filed on Jul. 6, 2006, ten pages.

International Search Report and Written Opinion mailed on Dec. 5, 2006, for PCT Application PCT/US06/23533, filed on Jun. 16, 2006, five pages.

International Search Report and Written Opinion mailed on Feb. 21, 2008, for PCT Application PCT/US2006/026304, filed on Jul. 6, 2006, eighteen pages.

International Search Report and Written Opinion mailed on May 22, 2008, for PCT Application PCT/US06/23535, filed on Jun. 16, 2006, eleven pages.

Non-Final Office Action mailed on Aug. 22, 2008 for U.S. Patent Application No. 11/182,331, 13 pages.

Coulouris, G. et al. (1994). *Distributed Systems: Concepts and Design*. Second Edition, Addison-Wesley Publishing Company, pp. 222-233, 311-318.

International Search Report mailed Jul. 11, 2003, for PCT Application No. PCT/US03/07180 filed Mar. 11, 2003, 1 page.

International Search Report mailed Jun. 23, 2003, for PCT Application No. PCT/US03/07179 filed Mar. 11, 2003, 1 page.

International Search Report mailed Oct. 1, 2003, for PCT Application No. PCT/US03/07182 filed Mar. 11, 2003, 2 pages.

International Search Report mailed Oct. 18, 2004, for PCT Application No. PCT/US04/02033 filed Jan. 21, 2004, 1 page.

International Search Report mailed Oct. 8, 2003, for PCT Application No. PCT/US03/07181 filed Mar. 11, 2003, 1 page.

U.S. Appl. No. 11/796,258, filed Apr. 27, 2007 for Yang et al.

Aprilog.com. (2000). "Plcc-adapter.com," located at <http://plcc-adapter.com/Site/ZIF-PLCC-to-PLCC-adapters.htm>, last visited on Dec. 7, 2005, 3 pages.

Barbir, A. et al. (Jul. 2003). "RFC 3568: Known Content Network (CN) Request-Routing Mechanisms," located at <http://www.faqs.org/rfcs/rfc3568.html>, last visited on Dec. 6, 2005, 14 pages.

Cherniak, M. et al. (Sep. 11, 2001). "Data Management for Pervasive Computing," VLDB, Rome, Italy, pp. 71-140.

Core Solutions. (Date Unknown). "IT Device Repair (ITDR)," 1 page.

Expand Networks. (Apr. 2004). "The Role of Accelerators in Disaster Recovery: Enabling Cost-Effective, High-Performance Backup Networks," 8 pages.

Geekmail, Inc. (2003). "Geekmail—IMAP, Anti-Spam Email Hosting," located at <http://web.archive.org/web/20040401200823/www.geekmail.com/home/>, last visited on Dec. 7, 2005, 3 pages.

Kozierok, C.M. (Sep. 20, 2005). "The TCP/IP Guide," located at <http://www.tcpipguide.com/free/index.htm>, last visited on Dec. 6, 2005, 3 pages.

Mailgov. (Date Unknown). "Product Features," located at <http://web.archive.org/web/20040607035920/http://mailgov.com/product_features.php>, last visited on Dec. 7, 2005, 1 page.

Motorola, Inc. (May 7, 2003). "Managed Services Solutions for Federal Government Agencies," located at <http://www.motorola.com/governmentandenterprise/contentdir/en_US/Files/SolutionInformation/FEDWhitePaperOverview.pdf>, last visited on Dec. 12, 2005, 8 pages.

Neon Software, Inc. (1993-2002). "LANSurveyor® Version 7 User's Manual," 244 pages.

Notable Solutions, Inc. (Date Unknown). "Methods of Routing Documents with AutoStore," 2 pages.

Oracle. (2005). "Oracle9i Lite: Data Sheet," located at <http://www.oracle.com/technology/products/lite/htdocs/o9ilite_datasheet/htm>, last visited on Dec. 6, 2005, 5 pages.

Oracle. (Mar. 2002). "Oracle9i: Recovery Manager Reference," 292 pages.

PeopleCube. (2005). "Meeting Maker Features & Benefits," located at <http://www.meetingmaker.com/products/meetingmaker/features_benefits.cfm>, last visited on Dec. 7, 2005, 3 pages.

Schuba, C. et al. (May 2005). "Integrated Network Service Processing Using Programmable Network Devices," Sun Microsystems, Inc. Technical Report, 30 pages.

VocalTec Communications Ltd. (Jul. 2004). "EssentraTM Product Suite: General Description," 16 pages.

Wildgate WirelessTM. (Date Unknown). "How Cool Can Email Get?," located at <http://www.wildgate.com/Register_Pages.Email.htm>, last visited on Dec. 7, 2005, 1 page.

Yau, D. et al. (Date Unknown). "Extensible Network Security Services on Software Programmable Router OS," 25 pages.

Youngtech, Inc. (2002-2004). "Disaster Recovery," located at <http://www.youngtech.com/documents/DisasterRecovery.pdf>, last visited Dec. 6, 2005, 2 pages.

Final Office Action mailed on May 27, 2009 for U.S. Appl. No. 11/182,073, filed Jul. 14, 2005, 14 pages.

Final Office Action mailed on Dec. 23, 2008 for U.S. Appl. No. 11/182,331, filed Jul. 14, 2005, 15 pages.

Mykkänen, J. et al. (2004). "Component and Service Technology Families," University of Kuopio Savonia Polytechnic, Kuopio, Finland, pp. 11-147. (Table of Contents Included.).

Non-Final Office Action mailed on Feb. 23, 2009, for U.S. Appl. No. 11/182,313, filed Jul. 14, 2005, 14 pages.

Non-Final Office Action mailed on Nov. 24, 2008 for U.S. Appl. No. 11/183,073, filed Jul. 14, 2005, 12 pages.

Non-Final Office Action mailed on Nov. 17, 2008, for U.S. Appl. No. 11/182,665, filed Jul. 14, 2005, 13 pages.

Non-Final Office Action mailed on Nov. 7, 2008 for U.S. Appl. No. 11/182,287, filed Jul. 14, 2005, 10 pages.

Final Office Action mailed on May 27, 2009, for U.S. Appl. No. 11/183,073, filed Jul. 14, 2005, 14 pages.

Final Office Action mailed on Dec. 23, 2008 for U.S. Appl. No. 11/182,331, filed Jul. 14, 2005, 15 pages.

Non-Final Office Action mailed on Nov. 24, 2008 for U.S. Appl. No. 11/183,073, filed Jul. 14, 2005, 12 pages.

Non-Final Office Action mailed on Nov. 7, 2008 for U.S. Appl. No. 11/182,287, filed Jul. 14, 2005, 10 pages.

Notice of Allowance mailed on July 24, 2009, for U.S. Appl. No. 11/182,313, filed Jul. 14, 2005, 8 pages.

Final Office Action mailed on Aug. 19, 2009, for U.S. Appl. No. 11/182,287, filed Jul. 14, 2005, 12 pages.

* cited by examiner

CONTENT ROUTER NOTIFICATION

CROSS-REFERENCE TO RELATED APPLICATIONS

This application is related to: U.S. application Ser. No. 11/182,288, filed concurrently herewith, entitled CONTENT ROUTER, to Torsten SCHULZ et al.; U.S. application Ser. No. 11/182,288, filed concurrently herewith, entitled CONTENT ROUTER ASYNCHRONOUS EXCHANGE, to Marco BOERRIES et al.; U.S. application Ser. No. 11/182, 288, filed concurrently herewith, entitled CONTENT ROUTER REPOSITORY, to Bjorn EBBESEN et al.; U.S. application Ser. No. 11/182,288, filed concurrently herewith, entitled CONTENT ROUTER FORWARDING, to Venkatachary SRTNIVASAN et al.; and U.S. application Ser. No. 11/182,288, filed concurrently herewith, entitled CONTENT ROUTER GATEWAY, to Meher TENDJOUKIAN et al.; each incorporated by reference herein.

BACKGROUND OF THE INVENTION

1. Field of the Invention

The present invention relates to maintaining user devices and accounts, and more particularly to synchronizing information accessible from multiple devices and networked accounts.

2. Description of the Related Art

Known routers and synchronization systems do not analyze the payload data received from one node to determine whether or not to forward all or part of the data to a second node. For example, a router uses an address it receives and a routing table to determine which destination nodes will receive a copy of the incoming packet. Known routers determine routing based on the address of packet. Additionally, known routers do not contain long term memory to hold packets. Thus, a packet will not be received by the second node unless the first node sends the packet to the router while the second node is also connected to the router.

A synchronization system holds a master copy of a set of records it is mirroring on one or more handheld devices. After a change occurs on one device and that device forwards a changed recorded to the synchronization system, the synchronization system updates its master copy, which is then available to other devices when they synchronize to the system. Known synchronization systems must keep a master copy of all synchronized records. For example, a hand held organizer may operate with a synchronization tool on a PC. Both the organizer and PC maintain a master copy of all records. Thus, a master copy may be maintained at multiple locations. Additionally, if a synchronization system is to work with devices not simultaneously connected to the synchronization system, the synchronization system will need to keep a copy of each new record. If a record represents an audio file or an image file, the synchronization system may need a substantial about of storage.

Hence, an improved system for synchronizing destinations of content would be advantageous and in particular a system allowing increased flexibility, reduced complexity and/or improved performance would also be advantageous.

BRIEF SUMMARY OF THE INVENTION

Accordingly, the Invention seeks to preferably mitigate, alleviate or eliminate one or more of the abovementioned disadvantages singly or in any combination.

In accordance with a first aspect of the invention, there is provided a gateway for communicating an outgoing command from a command memory of a content router to a content node, the gateway comprising: logic for receiving, from the command memory of the content router, a notification signal, wherein the received notification signal indicates a content type of an outgoing command in the command memory of the content router available for the content node; logic for sending, to the command memory of the content router, a request for the outgoing command, the request including the content type; logic for receiving, from the command memory of the content router, a response including the outgoing command; logic for preparing, in response to receiving the outgoing command, an outgoing message including the outgoing command; and logic for sending, to the content node, the message including the outgoing command.

In accordance with a second aspect of the invention, there is provided a method for communicating an outgoing command from a content router to a content node using a gateway, the method comprising, at the gateway: receiving, from the command memory of the content router, a notification signal, wherein the received notification signal indicates a content type of an outgoing command in the command memory of the content router available for the content node; sending, to the command memory of the content router, a request for the outgoing command, the request including the content type; receiving, from the command memory of the content router, a response including the outgoing command; preparing, in response to receiving the outgoing command, an outgoing message including the outgoing command; and sending, to the content node, the message including the outgoing command.

Some embodiments provide for sending, to the content node, the message including the outgoing command includes sending the outgoing command in a notification signal to the content node.

Some embodiments provide for delaying sending for a duration of time based on a connection type between the gateway and the content node, wherein the duration of time may be further based on a duration of time to a previous communication between the gateway and the content node.

Some embodiments provide for sending, to the command memory of the content router, a request including an acknowledgement indicating that the outgoing command may be discarded; and receiving, from the command memory of the content router, a response including an indication that the request including the acknowledgement was received by the command memory of the content router.

Some embodiments provide for sending, to the command memory of the content router, a request including an acknowledgement indicating that the outgoing command may be discarded, wherein the sending is in response to receiving, from the content node, the response indicating that the request including the command was received by the content node; and receiving, from the command memory of the content router, a response including an indication that the request including the acknowledgement was received by the command memory of the content router.

Some embodiments provide for sending, to the content node, a notification excluding the content type; receiving, from the content node, a request requesting a content type of the outgoing command; sending, to the content node, a response including the content type of the outgoing command; and receiving, from the content node, a request requesting the outgoing command, wherein the request includes the content type.

In accordance with a third aspect of the invention, there is provided a computer program product comprising program code for use in a gateway including processing logic for communicating an outgoing command from a content router to a content node, the computer program product comprising: program code for receiving, from the command memory of the content router, a notification signal, wherein the received notification signal indicates a content type of an outgoing command in the command memory of the content router available for the content node; program code for sending, to the command memory of the content router, a request for the outgoing command, the request including the content type; program code for receiving, from the command memory of the content router, a response including the outgoing command; program code for preparing, in response to receiving the outgoing command, an outgoing message including the outgoing command; and program code for sending, to the content node, the message including the outgoing command.

In accordance with a fourth aspect of the invention, there is provided a content router for communicating outgoing commands from the content router to a plurality of content nodes, the content router comprising: command memory for holding incoming and outgoing commands; and processing logic, coupled to the command memory, for: saving to the command memory an incoming command received from a first content node and associated with a content type; selecting a set of destination content nodes based on the content type and one or more routing parameters; and for each of the selected destination content nodes: saving an outgoing command to the command memory; sending, to a gateway, a notification signal, wherein the sent notification signal indicates the content type of the outgoing command in the command memory available for the destination content node; receiving, from the gateway, a request for the outgoing command, the request including the content type; sending, to the gateway, a response including the outgoing command; receiving, from the gateway, a request including an acknowledgement indicating that the outgoing command may be discarded; removing the outgoing command from the command memory; and sending, to the gateway, a response including an indication that the request including the acknowledgement was received by the content router.

In accordance with a fifth aspect of the invention, there is provided a method for communicating an outgoing command from a content router to a content node, the method comprising, at the content router: sending, to a gateway, a notification signal, wherein the sent notification signal indicates a content type of an outgoing command in the content router available for the content node; receiving, from the gateway, a request for the outgoing command, the request including the content type; sending, to the gateway, a response including the outgoing command; receiving, from the gateway, a request including an acknowledgement indicating that the outgoing command may be discarded; and sending, to the gateway, a response including an indication that the request including the acknowledgement was received by the content router.

In accordance with a sixth aspect of the invention, there is provided a computer program product comprising program code for use in a content router including processing logic for communicating an outgoing command from the content router to a content node, the computer program product comprising: program code for sending, to a gateway, a notification signal, wherein the sent notification signal indicates a content type of an outgoing command in the content router available for the content node; program code for receiving, from the gateway, a request for the outgoing command, the request including the content type; program code for sending, to the gateway, a response including the outgoing command; program code for receiving, from the gateway, a request including an acknowledgement indicating that the outgoing command may be discarded; and program code for sending, to the gateway, a response including an indication that the request including the acknowledgement was received by the content router.

BRIEF DESCRIPTION OF THE DRAWINGS

Embodiments of the invention will be described, by way of example only, with reference to the drawings, in which.

DETAILED DESCRIPTION OF THE INVENTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities that are capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1A:
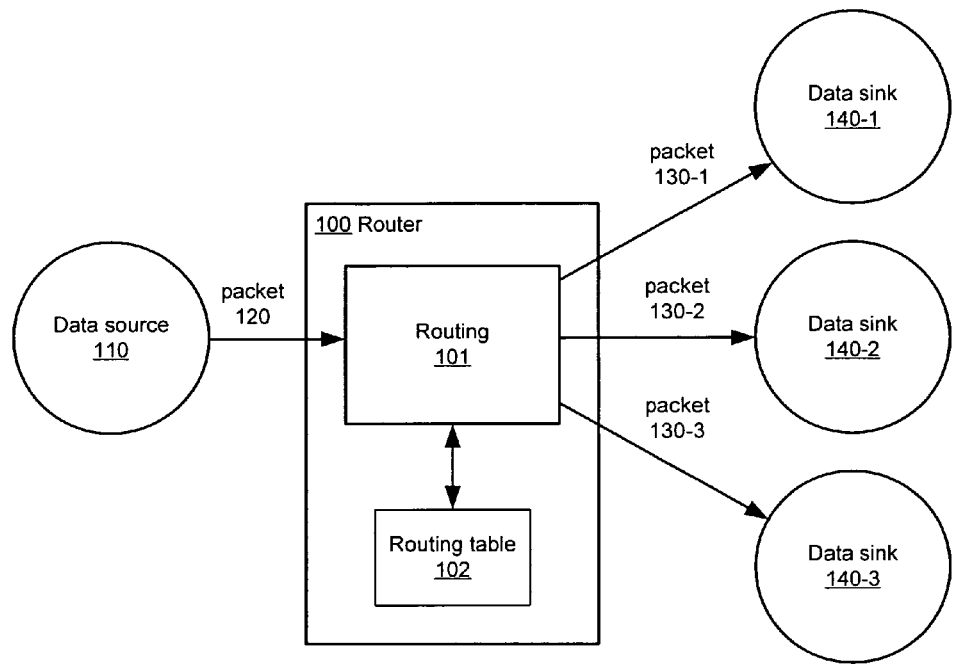
FIGS. 1A and 1B show information distribution and synchronization systems.
Figure 1B:
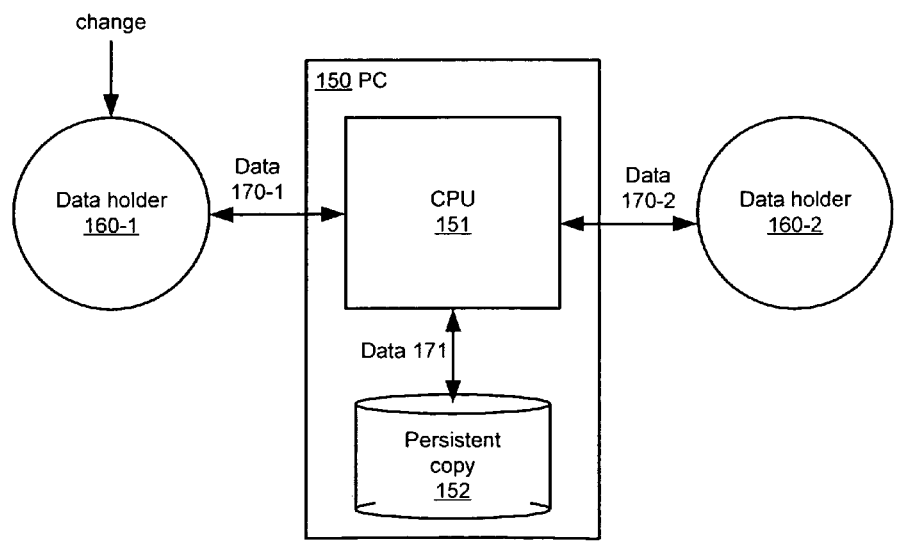

FIG. 1A shows a routing system. A router 100 includes a routing module 101 and a routing table 102 used to route packets 120. The router 100 uses both address information appended to the packet 120 and the routing table 102 to determine which data sinks 140-1 to 140-3 will receive a forwarded copy of an incoming packet 120. The router 100 forwards the packet 120 as packets 130-1 to 130-3. Known routers do not determine routing based on the type of content included in an incoming packet 120, but rather based on the address information appended to the packet 120.

FIG. 11B shows a synchronization system including a PC 150 and multiple data holders 160. A data holder 160 may be a hand held organizer connected to the PC 150 via a cradle. A user may change information, such as entering a new contact, into a first data holder 160-1. Periodically, the user connects the data holder 160 to the PC 150 and synchronizes each data holder 160 using a CPU 151 of the PC 150. The first data holder 160-1 exchanges data 170-1 with the CPU 151. The CPU 151 saves any updated and new information as data 171. The PC 150 accumulates a persistent copy 152 of data 171 synchronized through it. When a second data holder 160-2 synchronizes with the PC 150, the CPU 151 updates the second data holder 160-2 with the information saved from the first data holder 160-1. Even after both data holders 160-1 and 160-2 have been synchronized, the synchronization system preserves a copy of the changed information as persistent copy 152 even though the changed information is no longer needed for synchronization. Known synchronization systems keep a complete persistent copy 152 of data synchronized through the synchronization system.

Figure 2:
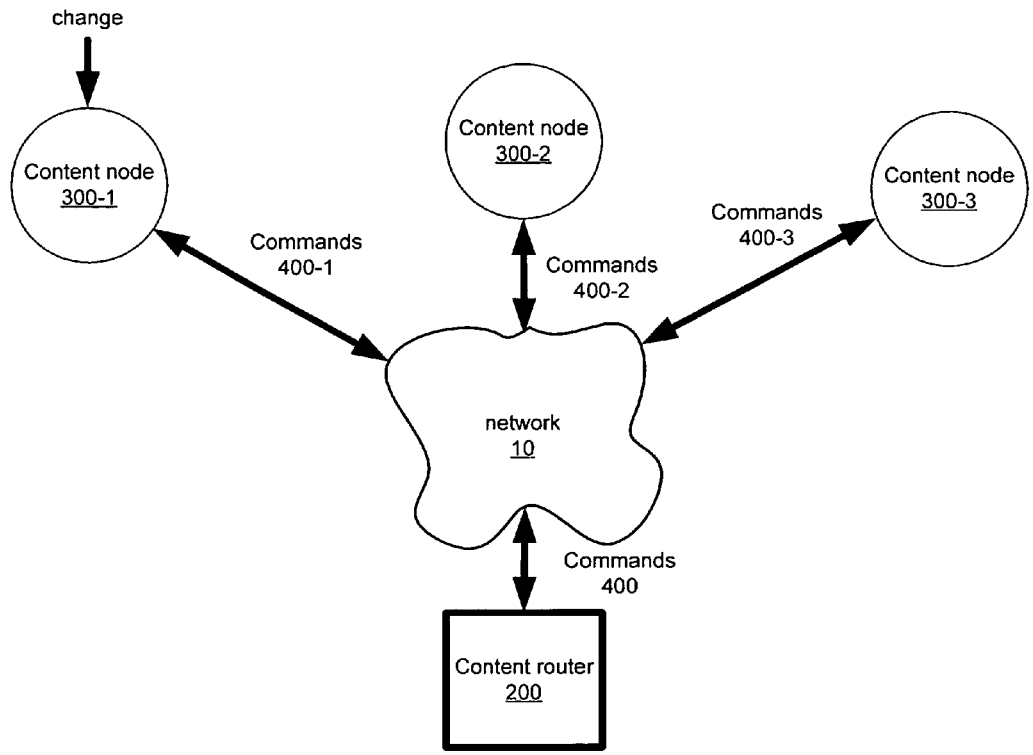
FIG. 2 illustrates a content router coupled to multiple content nodes via a network according to embodiments of the present invention.

FIG. 2 illustrates a content router 200 coupled to multiple content nodes 300-1 to 300-3 via a network 10 according to embodiments of the present invention. The content router 200 facilitates synchronization of similar and dissimilar content nodes 300-1 to 300-3 attachable to the network 10. The content router 200 may be a single network component implemented in hardware and/or software. Alternatively, the content router 200 may be a system of networked components 200. The content router 200 uses commands 400-1 to 400-3 sent across the network 10 to communicate information. The network 10 connects each content node 300-1 to 300-3 with the content router 200 using commands 400. The network 10 may be a conglomeration of disparate wired and/or wireless network such as interconnected intranets, the Internet and mobile radio networks. Alternatively, the network 10 may be a single network. Additionally, the content router 200 may bridge two or more separate networks.

A command 400-1 may be communicated within a message from a content node 300-1. The message may be encoded as a sequence of bits using a protocol available to the content node 300-1. A message may contain a segment of a command, in which case multiple messages may be aggregated to form a complete command. Alternatively, a message may contain multiple commands. In some protocols used by a content node 300, one or more messages may represent one or more commands. The content router 200 may translate between the message protocol used by a content node 300 and a command structure or protocol used internally in the content router 200.

From a content node 300, a user may use commands to enter, store, access, update, modify, and/or delete content or metadata (i.e., information about content). Content may have one of various content types, such as contacts, calendar events, tasks, emails and/or library items. Furthermore, content may have a personal information management (PIM) content type, which may include a contact, calendar event or a task. A library item includes a media object such as a photo image, an audio file, a video clip, a movie or a document, or may be a group of such items such as album of photos or collection of home movies. Metadata includes information about such content.

A content node 300 may be a user's account on a server. Such a content node 300 may have access to content of a single content type. For example, a user account may be a personal email account on an email server (e.g., Yahoo!® Mail), a family photo album account on a photo server (e.g., Yahoo!® Photos), a PIM account on a PIM server (e.g., Yahoo!® Address book or Yahoo!® Notepad), or a music library account on a multimedia library server (e.g., Yahoo!® Music). Furthermore, a content node 300 may be a user account having access to two or more content types. For example, a user account may have access to email, PIM information, calendar information and a notepad, such as with a Yahoo!® user account.

A content node 300 may be a user device. Such a user device may be a wired device, such as a home personal computer, an office PC, a digital camera or a set-top box, or may be a wireless device, such as a mobile phone, a laptop, handheld PC, or a digital camera with wireless capabilities. Some devices may have both wired and wireless capabilities, while other devices may have either wired or wireless capabilities. Some user devices may have access to a single content type. Other user devices have access to two or more content types.

A content node 300 may be a user device that organizes information, including PIM devices such as a Blackberry® or a Treo®, or more dedicated mobile phones that provide more limited information management services. Information management services may include, for example, PIM services such as calendar, address book, tasks, and notes. A calendar typically maintains time-related organizational attributes such as events (e.g., meetings, birthdays, holidays) related to corresponding date and time ranges. An address book typically maintains organizational attributes related to a person (e.g., a legal "person" such as a human or business entity, or even a pet), a place (e.g., the person's address), or other contact information attributes (e.g., telephone numbers).

Figure 3:
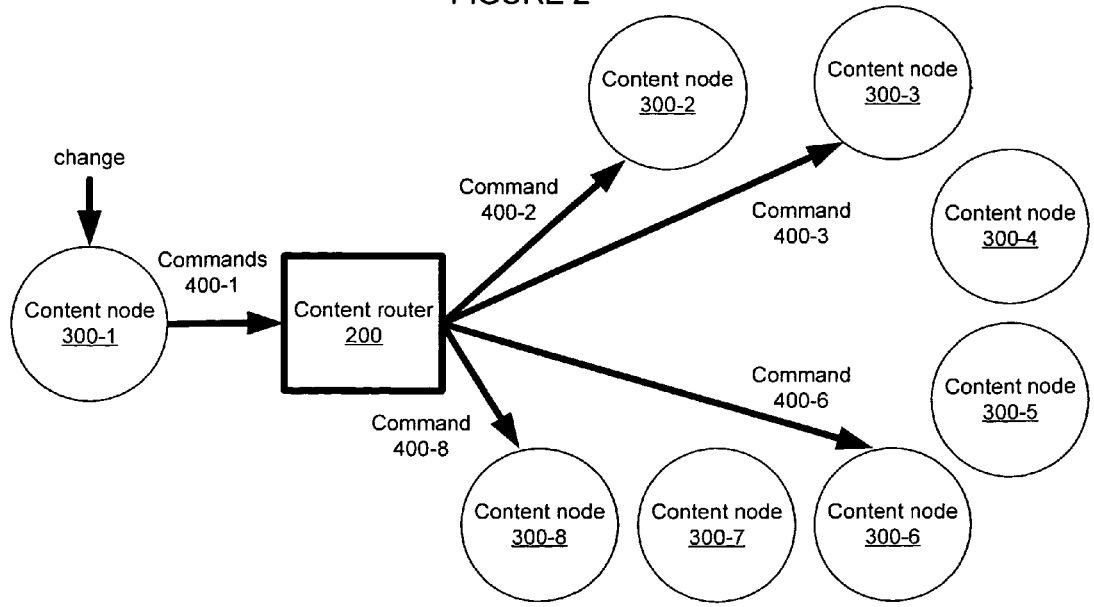
FIG. 3 shows a path of propagating a change in one content node to a selected set of content nodes via a content router according to embodiments of the present invention.

FIG. 3 shows a path of propagating a change in one content node 300-1 to a selected set of content nodes 300 via a content router 200 according to embodiments of the present invention. A set of content nodes 300 may include a null set of content nodes, a single content node, a subset of one or more content nodes, or all content nodes. A content node 300 may act as a source of data (data source), a sink of data (data sink), or a combination of both. In this case, content node 300-1 acts as a data source while content nodes 300-2, 300-3, 300-6 and 300-8 act as data sinks. A change to a content node 300-1 may represent one of a number of events including an addition, modification or deletion of content or metadata.

As shown, content node 300-1 acts as a source of content or metadata. The content node 300-1 may generate a command 400-1 including changed content, or a metadata indication of the change to content, which may be communicated to the content router 200. The content node 300-1 may push the command 400-1 to the content router 200 or it may be polled by the content router 200 for the command 400-1.

The content router 200 examines the contents of the command 400-1. Based on the contents of an incoming command 400-1, the content router 200 selects which of the possible content nodes 300-2 to 300-8 will be informed of the change. In this example, the content router 200 selects content nodes 300-2, 300-3, 300-6 and 300-8, then transforms the incoming command 400-1 into outgoing commands 400-2, 400-3, 400-6 and 400-8 to distribute an indication of the change. The outgoing commands 400-2, 400-3, 400-6 and 400-8 may or may not include the same contents as the incoming command 400-1. Additionally, the content router 200 does not keep a persistent copy of all content synchronized through it.

A content node 300-1 may be a user device (such as a PIM device) or a user account (such as a Yahoo! account) that contains one or more databases of content and/or metadata. For example, if the content node 300-1 includes an address book, the change may be a new, modified, or deleted contact. If the content node 300-1 includes a calendar, the change may be a new, modified, or deleted event, such as an appointment. If the content node 300-1 includes a task list, the change may be a new, modified, or deleted task. Similarly, if the content node 300-1 includes a note pad, the change may be a new, modified, or deleted note. The change may also be an addition, modification or deletion of a collection of information, such as a list of watched stocks, a list of bookmarked web pages, or a configuration of a home page.

If the content node 300-1 is an email account, the change may be that the email account has received new content, such as an incoming email message from the Internet, or has deleted content, such as deleting an existing email. The user may have updated metadata, such as changing a message state from unread to read, marking a message as unread, or setting an importance level. Similarly, if the content node 300-1 is a mobile phone, the change may be that it received new content, such as a new pager message or a new SMS message from a wireless network, or that the user has deleted content, such as deleting a message.

Furthermore, if the content node 300-1 is a media library, the change may indicate that a user has added, modified or deleted a media object, such as a photo image, an audio file, a video clip, a movie or a document, or may be a group of such items such as an album of photos or collection of home movies. For example, the change may indicate that a user has added a caption to a photo image, or has loaded a new song. Media objects are further described in related U.S. application Ser. No. 11/129,697, filed on May 13, 2005 and titled MEDIA OBJECT ORGANIZATION ACROSS INFORMATION MANAGEMENT SERVICES by inventors Marco BOERRIES et al., and incorporated by reference herein.

In describing a change, a content node 300-1 may send the actual new or modified content. In some embodiments, a content node 300-1 may instead send metadata. Such metadata may include characteristics of the changed content, a transformed copy of the changed content, and/or a reference, such as hyperlink or address pointer, to the content in memory. Sending a reference instead of the actual content allows a receiving content node 300-2 to access content from a sending content node 300-1 without requiring the content itself to pass through the content router 200.

A content router 200 may facilitate routing email among several email-capable content nodes 300, such as a user device or a user account. Email received at a user's first email account, e.g., a personal email account, may be forwarded via the content router 200 to the user's second account, e.g., a work email account on a second content node. Similarly, email received at the user's second email account may be forwarded through the content router 200 to the user's first email account. The user may also add a third email account, e.g., a Yahoo!® email account, and configure the content router 200 to route email messages received from the Internet at the third account to the first and second accounts.

Figure 4:
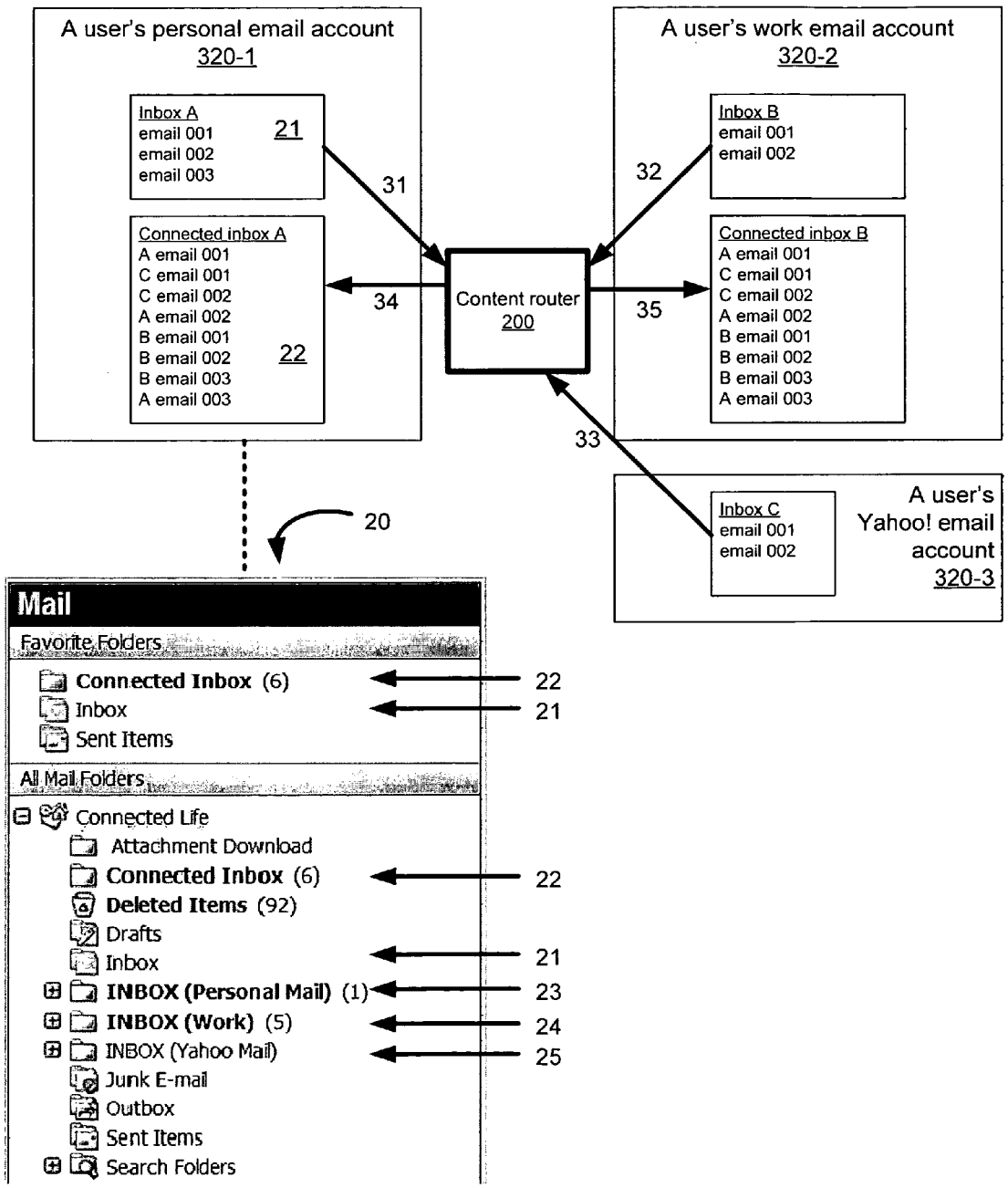
FIG. 4 shows a user's connected email accounts and includes an example screenshot according to embodiments of the present invention.

FIG. 4 shows a user's connected email accounts 320-1 to 320-3, and includes an example screenshot 20 according to embodiments of the present invention. Some content nodes 320, such as an Outlook account, allow a user to set up multiple email boxes or folders. Shown are two email accounts 320-1 and 320-2 with a connected inbox and one email account 320-3 without a connected inbox. Connected email accounts may report information to the content router 200 and may receive information from the content router 200.

For example, a content node (320-1, 320-2 or 320-3) may report a new incoming email to the content router 200 in a command (31, 32 or 33, respectively). In response to each incoming command (31, 32 or 33), the content router 200 selects a set of destination content node (e.g., 320-1 and 320-2, respectively) and forms an outgoing command (34 and 35) destined for an inbox of each selected content node (320-1- and 320-2, respectively).

The screenshot 20 from a user's personal email account 320-1 shows an inbox 21 for holding email messages received directly from the Internet without passing through the content router 200, and a connected inbox 22 for holding email messages received from the content router 200. The connected inbox 22 contains emails merged from each of the user's connected email accounts 320-1 to 320-3. By viewing the connected inbox 22, a user may quickly see in one folder all email destined for the user's multiple connected email accounts. A connected inbox 22 may thus be viewed as a window to all emails sent to a user across the user's several connected email accounts.

A user may also configure an email account to include a separate folder or inbox for each content node 300 that has email capabilities. Here, the screenshot 20 shows an inbox 23 for emails from a personal email content node 320-1, an inbox 24 for email from a work email content node 320-2, and an inbox 25 for email from a Yahoo!® email content node 320-3. Using separate folders allows a user to manage individual email accounts from one content node, for example, user account 320-1.

Figure 5:
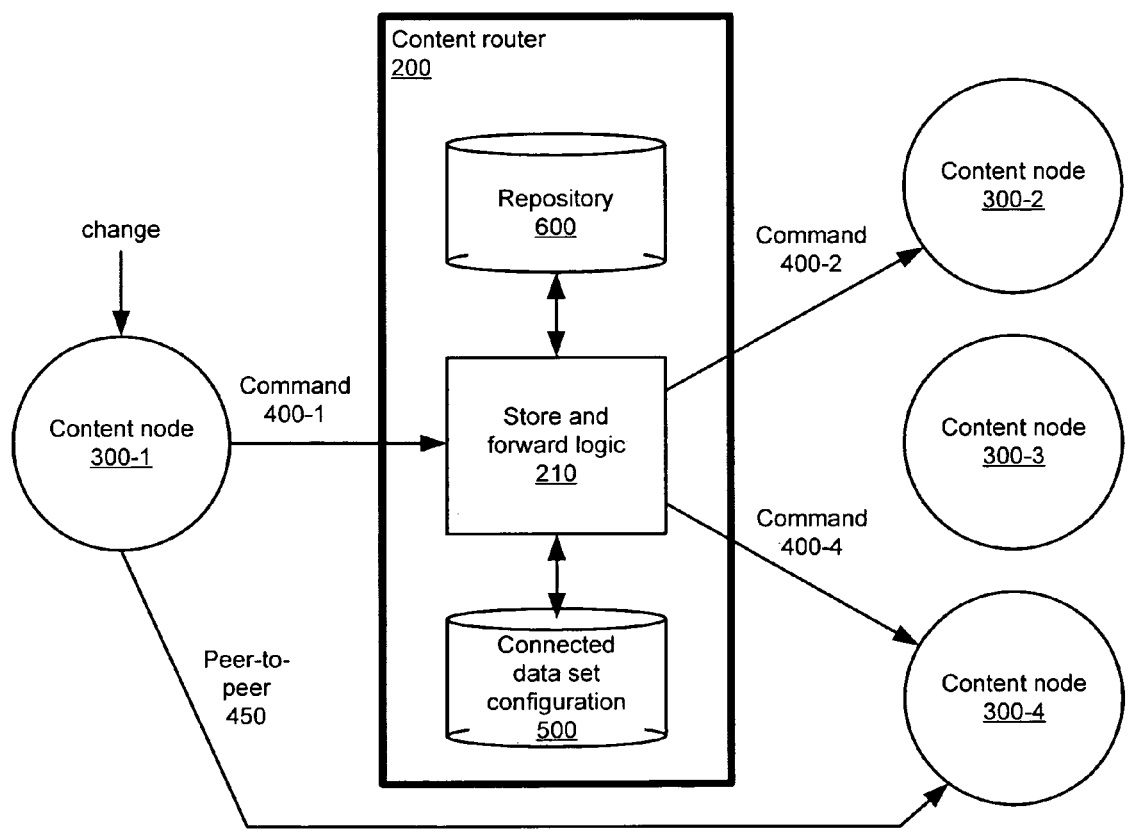
FIGS. 5 and 6 illustrate the connections to and processing performed by store and forward logic according to embodiments of the present invention.
Figure 6:
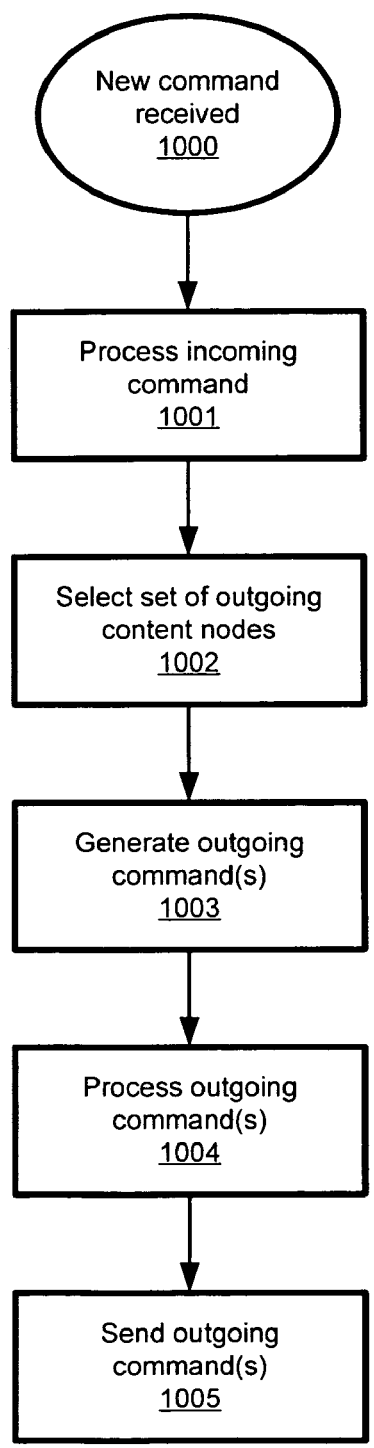

FIGS. 5 and 6 illustrate connections with and processing performed by store and forward logic 210 according to embodiments of the present invention. The store and forward logic 210 allows multiple connected content nodes 300 to communicate changes to information on one content node 300 to other content nodes 300 through the content router 200 without requiring each content node 300 to be simultaneously coupled to the content router 200. The store and forward logic 210 may be decoupled from content node specifics. That is, the store and forward logic 210 may treat each content node similarly, regardless of whether a content node is a user device or a user account, or whether the content node operates as a client or as a server. Additionally, the store and forward logic 210 may move the task of conflict detection away from the content nodes and centralize the task of conflict detection and resolution to within the store and forward logic 210.

The store and forward logic 210 may be implemented in hardware, executable code or a combination of both. The store and forward logic 210 may include VLSI and/or FPGA hardware. The store and forward logic 210 may include a stand alone server or a network of servers. The store and forward logic 210 may be implemented with a general purpose central processing unit (CPU) or may be implemented with a reduced instruction set computer (RISC). The store and forward logic 210 may include on-chip or off-chip memory such as RAM, PROM, EPROM, $E^2$PROM and/or the like. The store and forward logic 210 may also include magnetic memory, such as a hard disk drive, and may include optical memory. The executable code may be derived from scripts, software, firmware and/or machine code.

The content router 200 of FIG. 5 includes store and forward logic 210 coupled to a connected data set configuration 500, and a repository 600. The store and forward logic 210 may be coupled to associated content nodes 300-1 to 300-4. FIG. 6 shows a sequence of events triggered in the store and forward logic 210 by an incoming command beginning at 1000. Those actions include processing an incoming command at 1001, selecting outgoing content nodes at 1002, generating outgoing commands at 1003, processing outgoing commands at 1004, and sending the processed outgoing commands at 1005. Whether a command is an incoming or outgoing is viewed from the perspective of the store and forward logic 210.

At 1000, the sequence of events begins when a content node 300-1, having a change to report, sends a new command 400-1 to the store and forward logic 210. A content node 300-1 does not send the change (such as a command to add an included new email message) to other content nodes. Rather, the content node 300-1 sends the change to the store and forward logic 210, which may or may not create a set of outgoing command to send the new email message or parts of the new email message to a corresponding set of content nodes.

At 1001, the store and forward logic 210 processes the incoming command 400-1 from the content node 300-1. Processing incoming commands 400-1 may include transforming commands based on limitations or specialized capabilities of the originating content node 300-1. When transforming commands, the store and forward logic 210 may use the repository 600, which may hold one or more separable segments of a command, and the connected data set configuration 500, which contains transforming rules used when processing a command. Transforming incoming and outgoing commands is further described with reference to FIGS. 7A, 7B, 8A and 8B.

Processing an incoming command 400-1 may also include detection and resolution of a conflict between the incoming command 400-1 and a command pending in the store and forward logic 210. The store and forward logic 210 may hold multiple pending commands in memory waiting to be acted upon. A pending command may be a previously received and processed incoming command from a particular content node 300 that is waiting for further processing by the store and forward logic 210. Additionally, a pending command may be a command generated by the store and forward logic 210 in response to an incoming command. These generated commands are waiting to be transmitted to a particular content node 300 as an outgoing command (e.g., 400-2 or 400-4).

Conflict resolution may include discarding the new command 400-1, deleting a pending command, and/or aggregating of the new command 400-1 with a pending command. A conflict may arise if a new incoming command 400-1 conflicts with a previously received incoming command pending execution. For example, a previously received incoming command may be a command to add a new email received from the Internet by the content node 300-1. A subsequent incoming command may be to delete that same email, for example, if a user has deleted the email from its inbox on content node 300-1. If the command to add the new email is still pending in the store and forward logic 210 when the subsequent command to delete the same email is received, a conflict exists. In this case, the conflict is resolved by discarding both commands. Alternatively, if the subsequent incoming command was instead to add the same new email, the store and forward logic 210 detects the duplicate commands and resolves the conflict by discarding one of the duplicate commands.

A conflict may also arise if a new incoming command 400-1 conflicts with a command previously generated as an outgoing command for a particular content node 300. For example, the store and forward logic 210 may hold a pending outgoing command to update a contact in an address book. A new incoming command may be to delete that same contact altogether. The store and forward logic 210 detects and resolves this conflict by removing the pending outgoing command (update-contact) and saving the new incoming command (delete-contact). The new incoming command will eventually be processed and the delete-contact action will be propagated as an outgoing command to other connected content nodes 300.

The store and forward logic 210 may also aggregate an incoming command 400-1 with a pending command for a content node 300. For example, a previously received incoming command 400-1 may be to add a new task to a task list. A subsequent incoming command 400-1 may be to modify this task in some way. The store and forward logic 210 detects and resolves this conflict by incorporating the modifications from the subsequent incoming command (modify task) into the previous incoming command (add-task). The resulting aggregated command may be an add of the modified task. The resulting aggregated command may replace the previous incoming command. Alternatively, the previous incoming command may be discarded and the resulting aggregated command may be saved as a new incoming command. Detection and resolution of conflicts are further described with reference to FIGS. 9A-9C and 10A-10D.

At 1002, the store and forward logic 210 selects a set of outgoing content nodes, here content nodes 300-2 and 300-4. When selecting outgoing content nodes, the store and forward logic 210 may again use the connected data set configuration 500, which also contains routing parameters used in routing rules. Routing rules and the connected data set configuration 500 are further described with reference to FIG. 11.

At 1003, the store and forward logic 210 generates an outgoing command 400-2 and 400-4 for each selected content node 300-2 and 300-4, respectively. Depending on capabilities and a configuration of the selected content node, the store and forward logic 210 may alter the processed incoming command to suit the limitations or requirements of the selected destination content node. For example, depending upon limitations of a destination content node, the store and forward logic 210 may use a repository 600 to hold a separable segment of an incoming command 400-1 and either modify or eliminate that segment from the outgoing command. Conversely, the content router 200 may insert additional segments of information into an outgoing command.

The content router 200 may alter a command based on user defined rules, system defined rules, or known content node limitations. The content router 200 may modify a command based on information found within the incoming command 400-1. The content router 200 may append metadata, such as location, time or other information accessible from a user's account or device, to the outgoing command. The content router 200 may hold a record of how a command is modified so that it may reverse the modification if a related command is returned. In some cases, the content router 200 passes a command through without modification.

At 1004, the store and forward logic 210 processes the outgoing commands. As with incoming commands at 1001, the store and forward logic 210 similarly performs conflict detection and resolution between a new outgoing command and pending incoming and outgoing commands.

At 1005, the store and forward logic 210 sends the outgoing commands 400 to the respective content nodes 300. Sending an outgoing command 400 may include signalling a notification to the content node 300. Unlike a request (in a request-response protocol), a notification is a signal where a sender does not expect a response or an acknowledgement that the notification was received. In this respect, a notification is self contained in that it is complete once sent. Additionally, a notification may be implemented in software (e.g., a semaphore, flag or software signal instruction) and/or hardware (e.g., a hardware line or a register). The notification may include a content type of the outgoing command 400. If the content node is connected to the network 10 with an IP address, the store and forward logic 210 may send an HTTP command to notify the content node that an outgoing command is pending. If the content node is a mobile phone having SMS capabilities, the store and forward logic 210 may send a notification via an SMS message.

A content node 300-1 may send content having one or more segments in a command 400-1. To minimize the amount of data flowing out of the content router 200, the store and forward logic 210 may replace one or more segments of a command with a corresponding one or more references that provide a link back to the original content rather than forwarding the original segments themselves. Alternatively, the content node 300-1 may include one or more references to a source of the content rather than including the content itself.

A content node 300-4 receiving the reference to content (e.g., a reference to a new photo residing on content node 300-1) may instigate a peer-to-peer transfer 450 to retrieve the content from content node 300-1. In this manner, the content router 200 may facilitate a transfer of content between two content nodes in the form of a peer-to-peer transfer 450 while both content nodes are simultaneously connected to the network 10.

Due to limitations or requirements of a content node, the store and forward logic 210 may adapt the command by modifying, replacing or eliminating a separable segment of the command before sending it to a content node. For example, some content nodes may be unable to process, use or store some segments of a command. In some embodiments, the store and forward logic 210 may accommodate these content nodes that have limited capabilities using one of three methods described below, some of which use a repository. The store and forward logic 210 may also uses these methods for other reasons, such as memory limitations in a content node or bandwidth restrictions between the store and forward logic 210 and the content node, even though the content node is capable of handling the entire incoming command.

In some cases, the content router 200 is configured to poll a content node 300 for new commands. A content router 200 may periodically poll a content node 300 to determine whether any changes have occurred. The period of polling may be based on the type or expected cost of a connection to the network. For example, if a content node 300 is a mobile phone connected to the network via an SMS connection, polling may take place every 24 hours. If the mobile phone connected to the network via a GPRS data network connection, polling may occur every 20 minutes. If the mobile phone is placed in a docking station with a wired connection to the Internet, polling may occur every few seconds to every few minutes.

In some cases, notifications from the store and forward logic 210 to a content node 300 may be blocked because the content node 300 is behind a firewall. To receive commands, the content node 300 may be configured to poll the content router 200. When the content node 300 polls for pending outgoing commands 400, the store and forward logic 210 may reply with one command or a batch of commands for the content node 300 to process. The structure of commands 400 is further described with reference to FIGS. 13 and 14A-14I. The notification and exchange of commands between the store and forward logic 210 is further described with reference to FIGS. 15A-15C and 16A-16D.

According to a first method, the store and forward logic 210 may accommodate a limited capability content node by stripping incompatible or undesired segments from the payload and save the stripped segments in a repository 600. Thus, the repository 600 may hold segments of commands, which will be available for future use. If those segments are later needed, the store and forward logic 210 may access them from the repository 600. This method is described below with reference to FIGS. 7A and 7B.

Figure 7A:
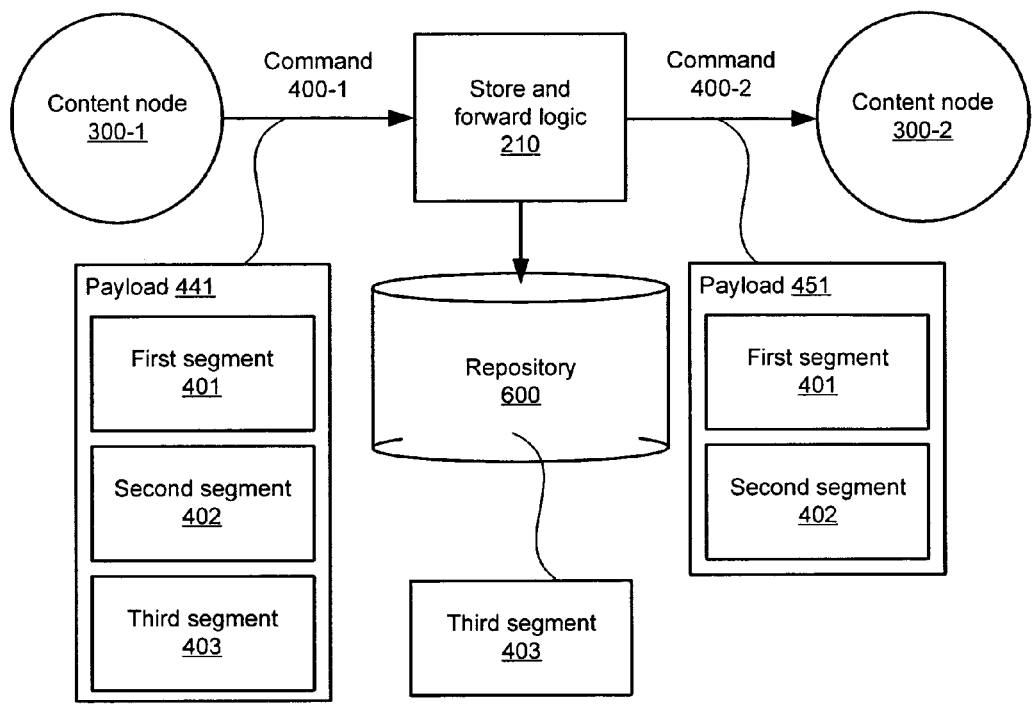
FIGS. 7A and 7B illustrate store and forward logic coupled to a repository according to embodiments of the present invention.
Figure 7B:
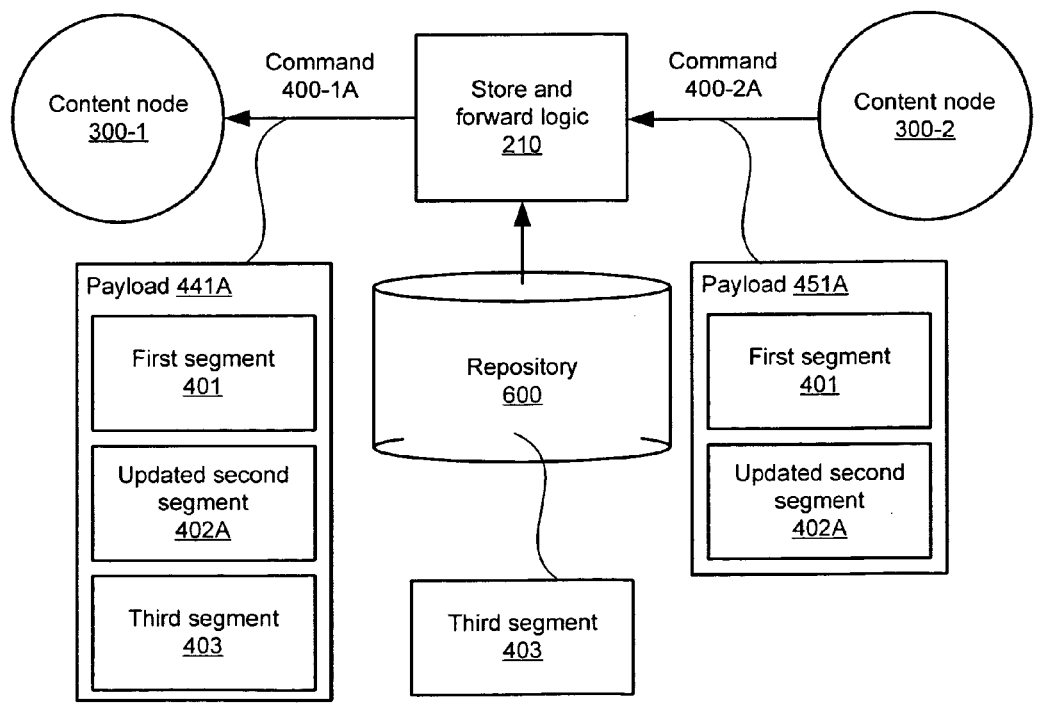

FIGS. 7A and 7B illustrate store and forward logic 210 coupled to a repository 600 according to embodiments of the present invention. Due to limitations or requirements of a content node 300, the store and forward logic 210 may adapt the command by eliminating a segment of the command before sending it to the content node 300. Before adapting the command, the store and forward logic 210 may preserve a copy of the unmodified segment or the entire command in the repository 600. Thus, the repository 600 may hold one or more segments of commands, which will be available for future use. In accordance with other embodiments, a segment may also be available to remove segments, such as a file in an email, from a command. For example, a file may be removed for an incoming command as described below with reference to FIG. 8A. Alternatively, a file may be removed for an incoming command as described below with reference to a file relay server and FIG. 12E.

FIG. 7A shows store and forward logic 210 using a repository 600 to hold a separable segment of an incoming command 400-1 from a first content node 300-1. When commands contain content that is separable and distinct, the separable content may be parsed away from the command or piecewise modified. For example, a contact may include a full name (first segment 401), a home phone number (second segment 402) and a work phone number (third segment 403). Each of these segments may be separable and distinct. That is, one or more of these segments may removed and/or modified and/or combined, thereby forming a modified command. For example, if a particular content node, such as a mobile phone, has a limitation that it can only handle a single phone number, the store and forward logic 210 may remove the work phone number (third) from an incoming command when preparing the corresponding outgoing command. The store and forward logic 210 may also place the work phone number in a repository 600 for future use.

As another example, an incoming command may include content such as a new email message having an email body and an attached file. The attached file is separable and distinct from the email body. The store and forward logic 210 may generate an outgoing command 400-2 to add the new email to a second content node 300-2. The outgoing command 400-2 to the second content node 300-2 may include the email body but only a reference to the file.

As shown, an incoming command 400-1 is forwarded in part as an abridged outgoing command 400-2 to a second content node 300-2. The incoming command 400-1 includes an exemplary payload 441 containing three segments of content and/or metadata 401, 402 and 403. The store and forward logic 210 stores a copy of the third segment 403 in the repository 600 and also prepares an outgoing command 400-2 with a payload 451 containing the first segment 401 and the second segment 402, but leaving off the third segment 403. The content router 200 may leave off the third segment 403, for example, due to a limitation of the destination content node 300-2. Such a limitation may include the content node 300-2 having a limited amount of allocated storage capacity, or a general transforming rule that removes all attachments that are in a predetermined format.

As another example, a user may add a new contact to a content node 300-1. The content node 300-1 sends an add contact command 440 containing a payload 441, which represents the contact created at the content node 300-1. The payload 441 may contain three segments 401 to 403 of information. The first segment 401 may be a structure holding a first and last name. The second segment 402 may be a phone number. The third segment 403 may be a hyperlink to a webpage. If a destination content node 300-2 is incapable of receiving a hyperlink, then the store and forward logic 210 may strip off the third segment 403 containing the hyperlink. Therefore, the payload 451 sent from the store and forward logic 210 may be different from the payload 441 received by the store and forward logic 210. The store and forward logic 210 stores the third segment 403 in the repository 600 for possible future use. For example, the store and forward logic 210 may access the repository 600 after a user changes a segment of the payload 451 and before the store and forward logic 210 forwards the change to the first content node 300-1, as discussed below.

FIG. 7B shows store and forward logic 210 accessing segments from the repository 600 in response to an incoming command 400-2A, which contains the original first segment 401 and the updated second segment 402A, from the second content node 300-2. The second segment 402 may have been updated as the result of a user modifying the segment, such as an email attachment, at content node 300-2. When the store and forward logic 210 processes the incoming command 400-2A from content node 300-2, it determines whether any segments previously associated with payload 451 and now associated with payload 451A are held in the repository 600. The store and forward logic 210 determines that the third segment 403 was previously associated with payload 451, and merges the third segment 403 from the repository 600 with the payload 451A containing the original first segment 401 and an updated second segment 402A to create a full data structure. If content node 300-1 is configured to process the content held in each segment 401 to 403, the store and forward logic 210 prepares a payload 441A containing the first segment 401, the updated second segment 402A, and the reattached third segment 403.

According to a second method, the store and forward logic 210 may accommodate a limited capability content node 300-2 by modifying an incompatible or undesired segment from the payload 441. The store and forward logic 210 may save this segment in the repository 600 if it may be needed in the future. This second method is similar to the first method except that, in the second method, the segment stripped in the first method is instead modified and sent to the content node.

If in the future, the limited capability content node returns the modified segment in a command, the store and forward logic 210 may replace this returned segment with the original segment from the repository 600 before the store and forward logic 210 forwards the command to other content nodes.

For example, if a command 400-1 arrives from the first content node 300-1 including a first name string and a second name string, but the second content node 300-2 is only able to handle a single-string name, the store and forward logic 210 may replace the two string structure with a single string structure containing a concatenated first and last name in the single string structure. The store and forward logic 210 may store the structure including the first name string and the second name string in the repository 600. If that content is later sent (either in a modified or unmodified form) from the second content node 300-2 and a destination content node can handle two-string names, the store and forward logic 210 may replace the concatenated string in the incoming command from the second content node 300-2 with the copy of the two string structure from the repository 600. In this way, missing content from one limited-ability content node 300-2 may be restored before it is forwarded to other content nodes.

Instead of using the repository 600 to preserve an original segment of content that was stripped or modified, store and forward logic 210 may retrieve the original segment from its source content node or from storage referenced by the source content node.

According to the third method, segments are not saved to a repository. The store and forward logic 210 may accommodate a limited capability content node by stripping or modifying an incompatible or undesired segment from the command payload. However, with this method, a copy of the stripped or modified segment is not preserved in a repository. If those segments are needed later, the store and forward logic 210 may request and receive the segment from the source of the original incoming command. An example of this method is described below with reference to FIGS. 8A and 8B.

Figure 8A:
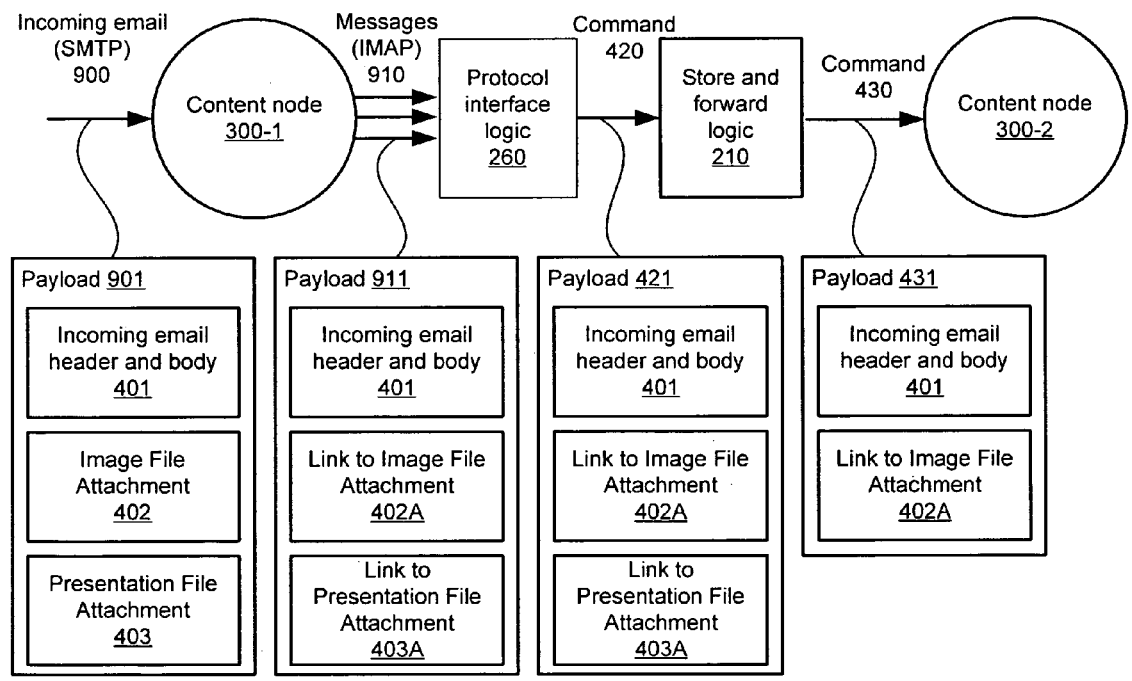
FIGS. 8A and 8B illustrate a process of stripping a separable segment of an exemplary email then requesting the stripped segment from a source of the email according to embodiments of the present invention.

FIG. 8A illustrates a process of stripping a segment of an exemplary email according to embodiments of the present invention. An incoming email 900 arrives at a first content node 300-1 from the Internet over an SMTP connection. The email 900 includes a payload 901, which contains an incoming email header and body 401 containing information such as date and time and to, from and reply email addresses as well as the text entered by the sender. The payload 901 also includes an image file attachment 402, such as a JPEG file, and a presentation file attachment 403 such as a PowerPoint presentation. An application running on the content node 300-1 may convert the attachments 402 and 403 to links 402A and 403A, which allow a capable content node to access the attachments through the hyperlinks to the attachments. The content node 300-1 may then create one or more messages 910, according to an email protocol such as IMAP, forming a payload 911 including the incoming email header and body 401, the link to the image file 402A, and the link to the presentation file attachment 403A. The content node 300-1 sends the messages 910 to protocol interface logic 260 within the content router 200.

The protocol interface logic 260 converts the one or more messages 910 into a command 420 containing a payload 421 including the incoming email header and body 401, the link to the image file 402A, and the link to the presentation file attachment 403A extracted from payload 911. The protocol interface logic 260 allows for content nodes that use different protocols to function with the content router 200. The store and forward logic 210 receives the incoming command 420 from the protocol interface logic 260 and prepares an outgoing command 430 for content node 300-2. In this example, the content node 300-2 is unable to a process presentation file attachment 403 or its link 402A. For this content node 300-2, the store and forward logic 210 is configured to strip off any links to a presentation file attachment 403A. The store and forward logic 210 prepares the outgoing command 430 including a payload 431 containing the incoming email header and body 401 and the link to the image file 402A, but not the link to the presentation file attachment 403A. In this case, the store and forward logic 210 does not preserve a copy of the link 403A in a repository 600 for later use.

After the content router 200 has forwarded a stripped email to content node 300-2, a user at content node 300-2 may forward the email to an external Internet address. When protocol interface logic 260 receives the forwarded email, it may determine that the email is missing one or more segments contained in the original email. The protocol interface logic 260 may request the missing segments from an inbox at content node 300-1 containing the complete email. After receiving the original segments, the protocol interface logic 260 may restore the segments to the forwarded email. Next, the protocol interface logic 260 may use an email server associated with inbox at content node 300-1 to forward the email to the external Internet address.

Figure 8B:
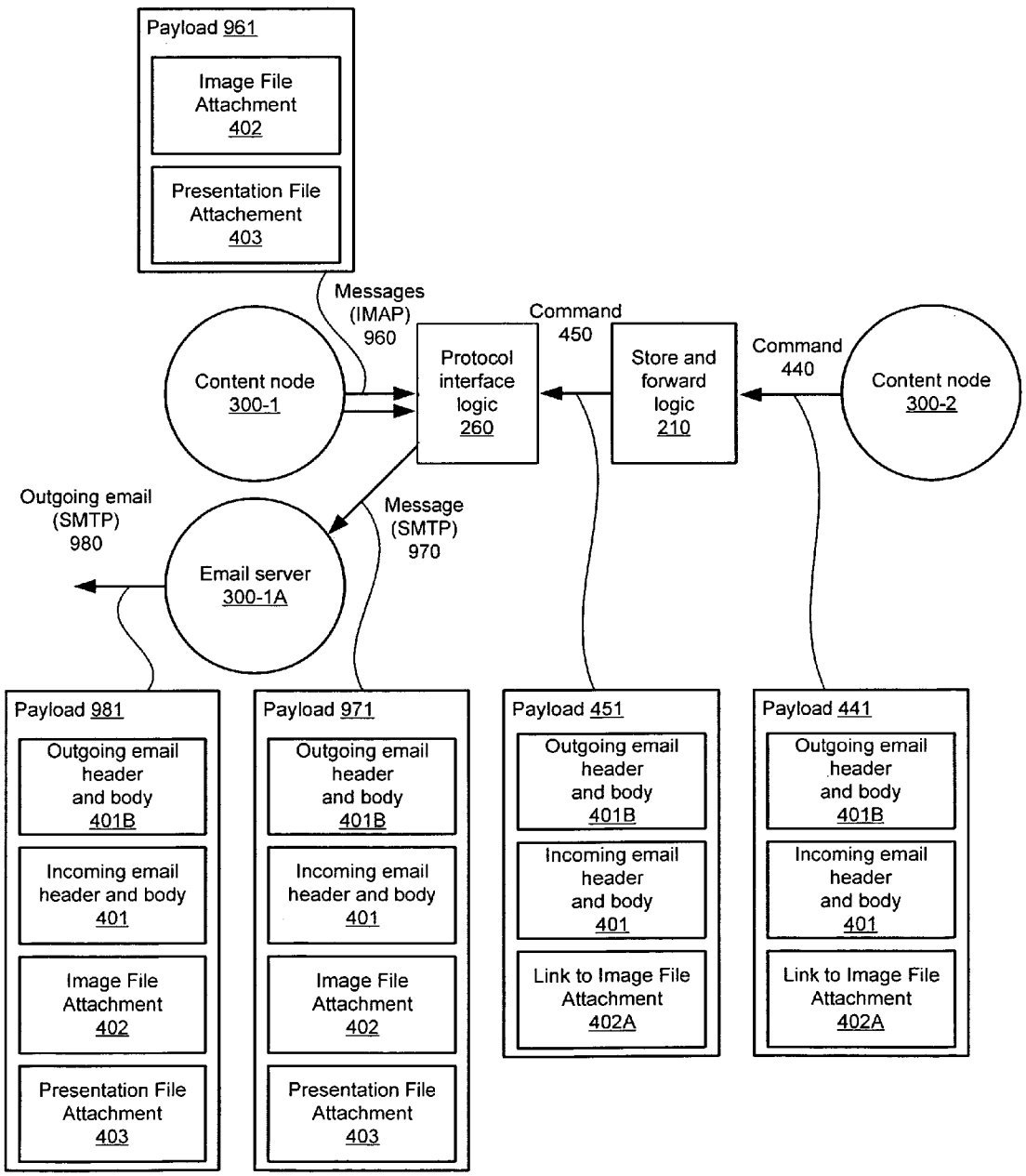

FIG. 8B illustrates a process of restoring a stripped segment to an email if a user later forwards the email according to embodiments of the present invention. A user may forward an email previously received at content node 300-2. For example, the content node 300-2 sends a command 440 containing a payload 441 including a newly created outgoing email header and body 401B, the original incoming email header and body 401, and the link to the image file 402A. This incoming command 440 includes neither the presentation file attachment 403 nor its link 403A. In response to receiving the incoming command 440, the store and forward logic 210 generates an outgoing command 450 including a payload 451 containing the segments from payload 441.

The protocol interface logic 260 receives command 450 and detects that it is a forwarded email. The protocol interface logic 260 may attempt to restore the stripped segments by requesting the unabridged email from the first content node 300-1. Alternatively, the protocol interface logic 260 may request just the stripped segments 402 and 403. In response, the first content node 300-1 sends the protocol interface logic 260 the stripped segments, for example, in one or more IMAP messages 960, forming a payload 961 that includes the image file attachment 402 and the presentation file attachment 403.

The protocol interface logic 260 prepares an email containing a payload 971 including the outgoing email header and body 401B, the incoming email header and body 401, the original image file attachment 402, and the original presentation file attachment 403. The protocol interface logic 260 may forward the email to an email server 300-1A associated with content node 300-1, for example, in an SMTP message 970 including payload 971.

The email server 300-1A responds to the SMTP message 970 with an outgoing email 980 to the external Internet address. The outgoing email 980 contains each of restored segments of the incoming email that were previously stripped off or modified by the protocol interface logic 260. The outgoing email 980 also contains the outgoing email header and body 401B created at content node 300-2. As a result, the outgoing email may appear that it was forwarded from an email containing the original attachments 402 and 403 even though the content node 300-2 from where the user forwarded the email had limited capabilities and received neither attachment.

A repository 600 may also be used for keeping an inventory of information routed among connected content nodes. Alternatively, the inventory may be kept in separate memory. The inventory may include characteristics of content and/or characteristics of metadata of one or more content types routed to and from the content router. The inventory may be used for summarizing characteristics of routed content residing on one or more of the connected content nodes 300. The inventory may be used to preview an item count. For example, if one or more routing parameters are changed for a particular content node 300, the content router 200 may estimate or determine the number of additional items of a particular content type would need to be fetched from one or more other content nodes 300 to place the particular content node 300 in line with the updated routing parameters. The characteristics may be used to compute a summary number of a content type residing on a content node falling within a condition based on the characteristics in the inventory. The entries in the inventory may be counted to summarize a number of a particular content type reside on a content node. In some embodiments, the inventory may be used during conflict checking to identify duplicate commands.

For an email content type, the content router may collect information in an inventory from each email message routed through the content router 200 and residing on a content node. For example, for each command to add a new email message, the content router 200 may save characteristics of the email such as the existence of the email and a date the email was received by the content node. The entries in the inventory may be counted to summarize a number of email messages residing on a content node. The date of each email may be used to summarize a number of email messages residing on a content node falling within a specified date range based on a date characteristic in the inventory for a plurality of email messages routed through the content router. If a user wishes to see a number of email messages that a content node would contain if the user changed a routing parameter, such as the number of days an email should reside on a content node, the content router 200 may compute the number of emails in an inventory that fall within a particular date range.

The inventory may also be used by a scheduler on the content router 200 to remove email messages from a content node 300 previously routed through the content router 200 to the content node 300. A scheduler on the content router 200 may periodically compare dates in the inventory of email messages previously routed through the content router 200. For example, the schedule may compare these dates to a routing parameter indicating a number of days a user as elected to maintain routed emails on the content node. The routing parameter may be to keep emails from the last three days on a user device, such as a mobile phone. New email messages may be forwarded to the user device as they arrive to the content router 200 and an inventory kept of each new email. As emails are deleted by actions of a user at one or more content nodes, the content nodes sends email deletion commands to the content router and the inventory may be updated accordingly. The scheduler may periodically (e.g., nightly) compare the dates of emails in the inventory to the routing parameter indicating that emails should only be kept on the user device for the certain number of days. If the inventory indicates that the user device contains email older that the routing parameter permits, the scheduler on the content router may generate a command to delete each email on the user device that is older than allowed by the routing parameter. For example, the routing parameter may indicate keeping a two day history of emails on the user device. Each night the scheduler may store a command to delete emails from the user device that are older than two days. Additionally, the inventory may be used to indicate to a user a number of emails that would need to be removed from or added to a content node if a routing parameter where changed. For example, if a routing parameter for a content node currently indicated keeping two days of emails were changed to keeping one day of email, the content router 200 may determine from the inventory data associated with the content node that a particular number of email messages would need to be deleted from the content node. Similarly, if the routing parameter were changed from two days to three days for a particular content node 300, the content node 200 may determine, from inventory data related to the particular content node 300 and to another related content node, the number of email messages that would need to be routed from the related content node to the particular content node.

Similarly, the inventory may be used by the content router to limit a number of one or more content types on a content node. The content router may send delete commands corresponding to each add command of a content type wherein the content node already holds a predetermined number of content of a type. Alternatively, a scheduler may be used to periodically determine if a content node has a number of content items in excess of predetermined threshold number for each content type. The predetermined threshold number may be configured by the user or alternatively may be a default value for the content node type. For example, if a content node, such as a mobile phone, may have 500 or more email messages. A content node, such has a user account may have a larger predetermined threshold number, such has 5000. For each new email message added to the content node, the content router may send a corresponding delete command to remove the oldest email message from the content node. Alternatively, a scheduler may periodically determine if a content node has more that a predetermined number of items of a particular content type and then send one or more delete commands to remove outdated content. For example, a predetermined number may be 500, which may indicate that a particular user device may have up to 500 emails. If the content router determines that the user device has more than 500 emails, it may send a number of delete commands to remove email messages in excess of 500. In some embodiments, the content router sends delete commands to remove the oldest emails messages in excess of the predetermined threshold number. When provisioning a content node, the inventory may be used to request the most recent 500 emails from other content nodes for forwarding to the provisioned content node. As new emails arrive, they may be added to the content node until a predetermined limit, such as 5000, is reached. Once the limit is reached, the content router may issue delete commands to remove the oldest email messages from the content node.

Similarly for events, the content node may have a predetermined threshold number for a maximum number of events on a content node. For each new event added to the content node, the content router may send a delete command to remove the oldest event if the predetermined threshold number would otherwise be exceeded. Alternatively, the content router may periodically review the inventory to determine a number of event-content types exist on a content node. It may then send one or more delete commands to delete the oldest events from the content node.

Similarly for tasks, the content node may have a predetermined threshold number for a maximum number of tasks on a content node. For each new task added to the content node, the content router may send a delete command to remove the oldest task if the predetermined threshold number would otherwise be exceeded. Alternatively, the content router may periodically review the inventory to determine a number of task-content types exist on a content node. The content router may then send one or more delete commands to delete the oldest tasks from the content node. Alternatively, the content router may then send one or more delete commands to delete completed tasks until the predetermined threshold number is not exceeded.

Additionally, the content router 200 may calculate and save a checksum of the new email. The checksum may be used when determining if a command to add a new email duplicates a command in the command memory or a command previously passed through the content router.

Figure 9A:
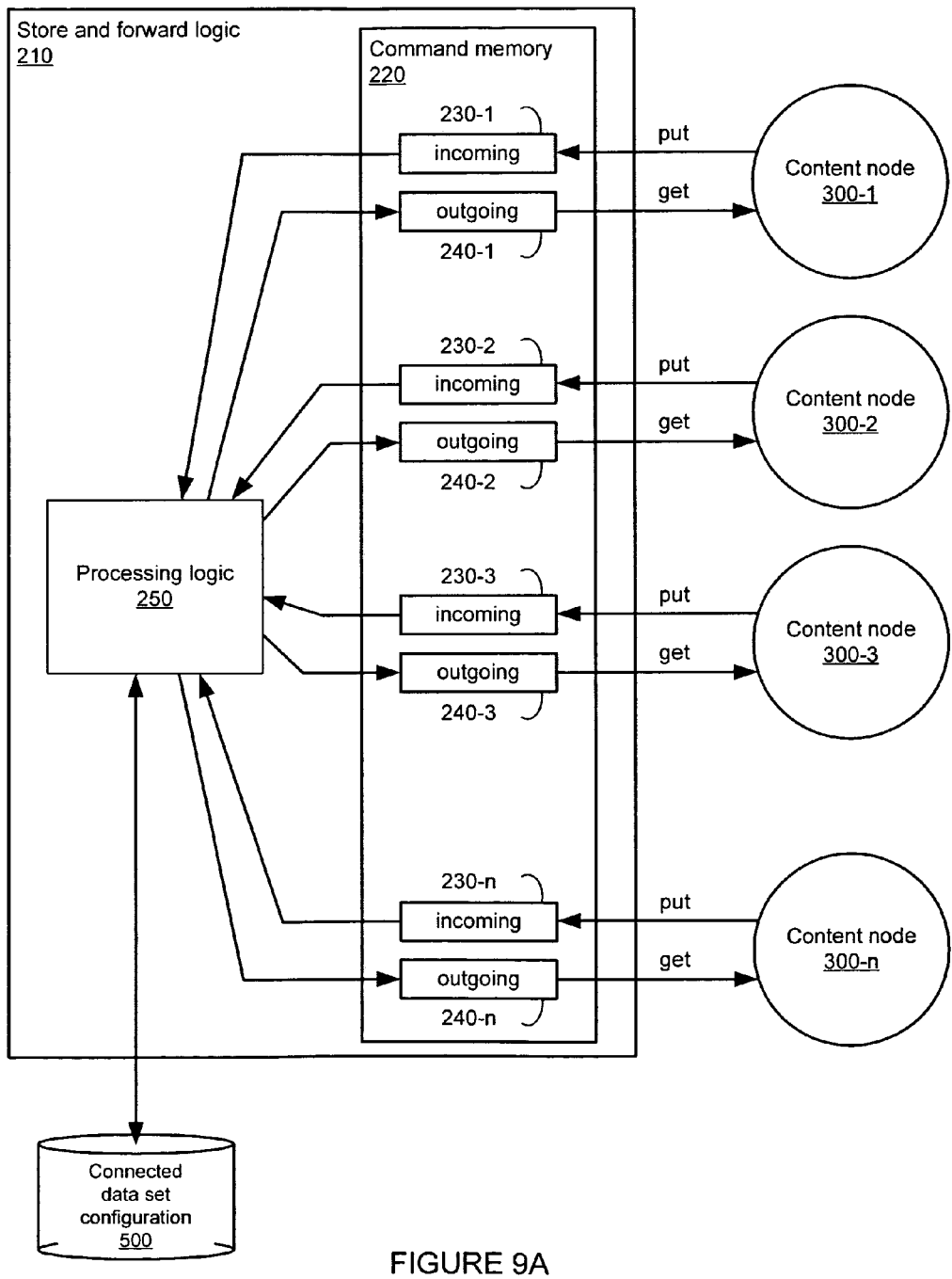
FIGS. 9A to 9C show a structure of a store and forward logic and data path between processing logic and content nodes according to embodiments of the present invention.
Figure 9B:
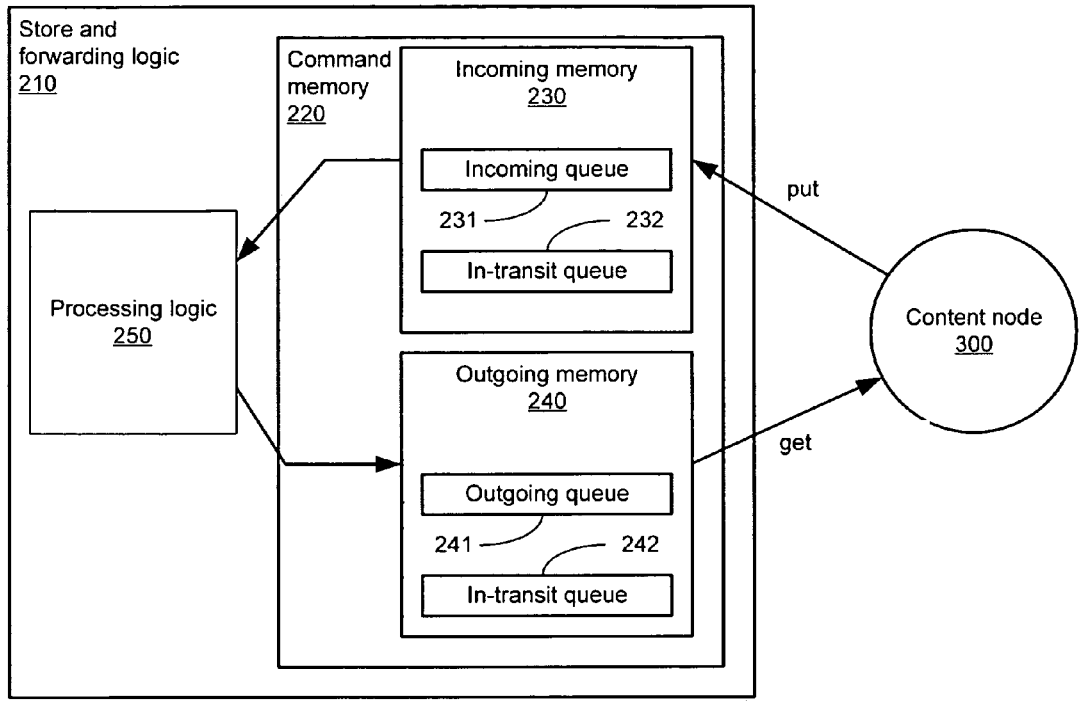
Figure 9C:
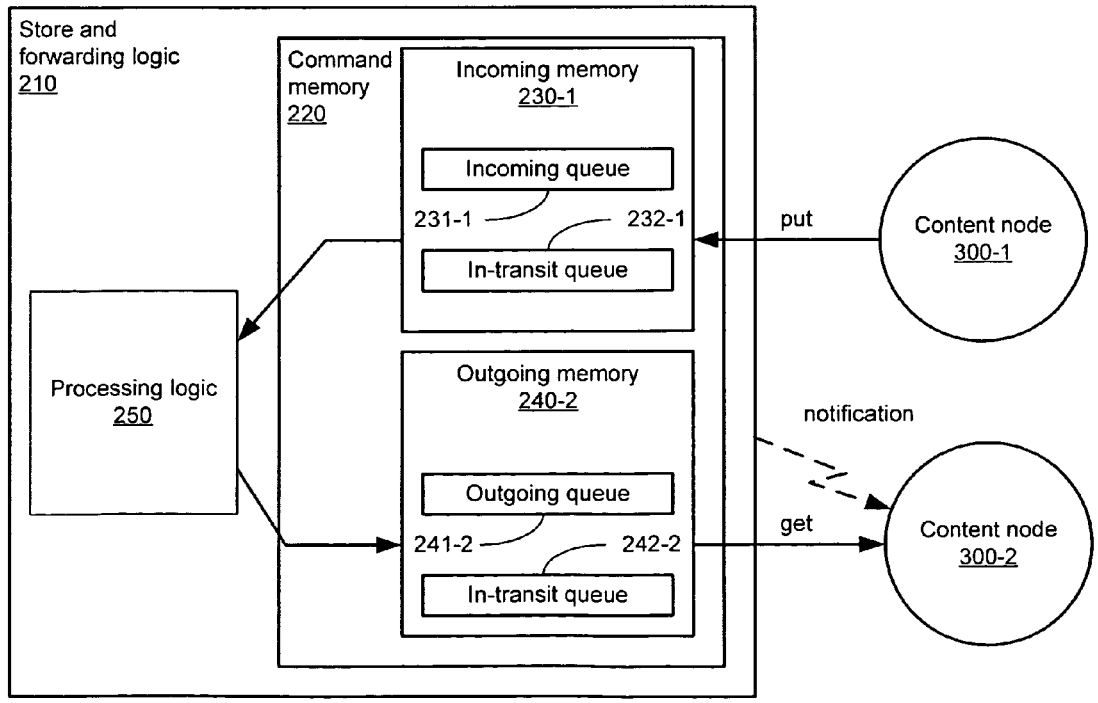

FIGS. 9A to 9C show a structure of a store and forward logic 210 and data path between processing logic 250 and content nodes 300-1 to 300-*n* according to embodiments of the present invention.

FIG. 9A shows store and forward logic 210 having a command memory 220 and processing logic 250. The processing logic 250 is coupled to a connected data set configuration 500 and to the command memory 220. The command memory 220 is also shown coupled to content nodes 300-1 to 300-*n*. The command memory 220 may be configured to include both incoming memory 230 and outgoing memory 240 for each content node 300. A content node 300 may push (put) one or more commands to the incoming memory 230. A content node 300 may also pull (get) one or more commands from the outgoing memory 240.

Those skilled in the art will recognize that the incoming memory 230 and outgoing memory may be formed using a database. For example, command memory 220 may be configured in a database containing commands. Each command in the database may be associated with attributes. For example, an attribute associated with a command in the database may identify the command as an incoming command or an outgoing command for a particular content node 300.

FIG. 9B shows a structure of the command memory in the store and forward logic 210 for a single content node 300 according to embodiments of the present invention. The command memory 220 includes incoming memory 230 and outgoing memory 240.

In some embodiments, the incoming memory 230 includes an incoming queue 231 and a corresponding in-transit queue 232. The incoming queue 231 holds incoming commands received by the store and forward logic 210 from a content node 300 but have not been responded to by the processing logic 250. The corresponding incoming in-transit queue 232 holds incoming commands that the processing logic 250 is in the process of responding to. Once an incoming command has been successfully responded to by the processing logic 250, processing logic 250 may be discarded the incoming command from the in-transit queue 232. If the processing logic 250 was unsuccessful at processing an incoming command, for example, if a necessary resource is unavailable, the processing logic 250 may move the incoming command from the in-transit queue 232 back to the incoming queue 231.

In some embodiments, the outgoing memory 240 includes an outgoing queue 241 and a corresponding in-transit queue 242. The outgoing queue 241 holds outgoing commands generated by the processing logic 250 (in response to an incoming command) but the processing logic 250 has not initiated sending of the outgoing command to the content node 300. The corresponding outgoing in-transit queue 242 holds outgoing commands that the processing logic 250 has initiated sending to the content node 300 but a confirmation or assurance that the content node 300 has received the outgoing command has not been received by the processing logic 250.

Those skilled in the art will again recognize that a database may used to hold commands and that one or more attributes associated with each command may indicate that the command is in the incoming queue 231, the corresponding incoming in-transit queue 232, the outgoing queue 241, or the corresponding outgoing in-transit queue 242.

FIG. 9C shows incoming memory 230-1 used for holding an incoming command from a source content node 300-1 and outgoing memory 240-2 used for holding an outgoing command to a destination content node 300-2.

During a period when a source content node 300-1 is coupled to the store and forward logic 210, the source content node 300-1 may send (put) a command or set of commands to the content router 200. The processing logic 250 may place the incoming command or set of commands the incoming queue 231-1 associated with the source content node 300-1.

At some later point in time, the processing logic 250 may respond to an incoming command held in the incoming queue 231-1. As part of responding to an incoming command in the incoming queue 231-1, the processing logic 250 may move the incoming command from the incoming queue 231-1 to the in-transit queue 232-1 of the incoming memory 230-1. Additionally, the processing logic 250 may select a destination content node 300-2 for which it may generate an outgoing command. In general, the processing logic 250 may select a set of destination content nodes to include multiple destination content nodes, a single destination content node, or no destination content nodes. Next, the processing logic 250 may place the generated outgoing command in the outgoing queue 241-2 of a destination content node.

After the processing logic 250 has successfully prepared and written an outgoing command to the outgoing queue 241-2, the processing logic 250 may remove the incoming command from the in-transit queue 232-1 in the incoming memory 230-1. If the processing logic 250 is unsuccessful at either preparing or writing the outgoing command, the processing logic 250 may move the incoming command from the in-transit queue 232-1 back to the incoming queue 231-1. In this manner, an incoming command is either successfully responded to or it is placed back into the incoming queue 231-1 for a future attempt at processing the incoming command.

The processing logic 250 may send a notification to the content node 300-2 to inform the content node 300 that an outgoing command is pending in the outgoing queue 241-1. At some later point in time, the destination content node 300-2 may request (pull) the outgoing command from the outgoing queue 241-2. Alternatively, the content router 200 may push the outgoing command to the destination content node 300-2. After the process of sending the outgoing command to the destination content node 300-2 has been initiated but before the processing logic 250 has determined that the outgoing command was successfully sent and/or received, the processing logic 250 may move the outgoing command from the outgoing queue 241-2 to the in-transit queue 242-2 associated with the destination content node 300-2.

A success at sending and/or receiving may be internally determined by the processing logic 250, determined by receipt of an instruction to remove the outgoing command, or determined by receipt of an acknowledgement (ACK) or an equivalent notification providing sufficient assurance that the outgoing command has been received by the destination content node 300-2. Communicating an acknowledgement may be initiated by the destination content node 300-2 or by an intermediary acting as a proxy for the destination content node 300-2 as described below with reference to FIGS. 15B, 15C, 16B and 16C.

If a negative acknowledgement (NACK) is received, an error is detected, a time-out has occurred, or the like, the outgoing command residing in the in-transit queue 242-2 may be moved back to the outgoing queue 241-2. As a result, if a failure is determined, for example a temporary failure, the processing logic 250 may have a future opportunity to resend the outgoing command from the outgoing queue 241-2 to the destination content node 300-2. If the processing logic 250 determines that the failure is permanent, it may discard the command thereby avoiding a potential endless loop of transferring a command in and out of an in-transit queue 232, 242.

In this way, it is sufficiently confirmed that an outgoing command is either received by the destination content node 300-2 or placed back into the outgoing queue 241-2 for a future attempt at sending it to the destination content node 300-2.

The act of moving commands between an incoming or outgoing queue 231, 241 and a corresponding in-transit queue 232, 242 helps assure that a command is only discarded after it has been properly responded to or sent. Additionally, the process of moving a command between the incoming or outgoing queue 231, 241 and the in-transit queue 232, 242 may occur with an actual move of data from one allocated buffer to another. Alternatively, the process of moving between queues may occur virtually by changing a state of a flag or an attribute in a database. Additionally, each time a command enters either the incoming queue 231 or the outgoing queue 241, for example from an in-transit queue 232 or 242 after an error condition has occurred, the processing logic 250 may perform a conflict check as described below.

FIGS. 10A to 10D show a Put-Get-Ack procedure from points of view a content node 300 and a content router 200 according to embodiments of the present invention. A goal of this procedure is to resolve conflicting commands within the incoming and outgoing queues 231, 241. By resolving conflicts within the incoming and outgoing queues 231, 241, content nodes 300 may be freed from the burden of resolving conflicts.

According to the PUT-GET-ACK procedure, a content node 300 first sends (PUTs) of all commands pending in the content node 300 to the content router 200. The content router 200 resolves any conflict between an incoming command and a command already in either the incoming queue 231 or outgoing queue 241. After the content node 300 has sent all commands to the content router 200, the content node 300 receives (GETs) commands from the outgoing queue 241. Finally, an acknowledgement (ACK) is received by the content router 200 assuring that the content node 300 received the outgoing commands.

Figure 10A:
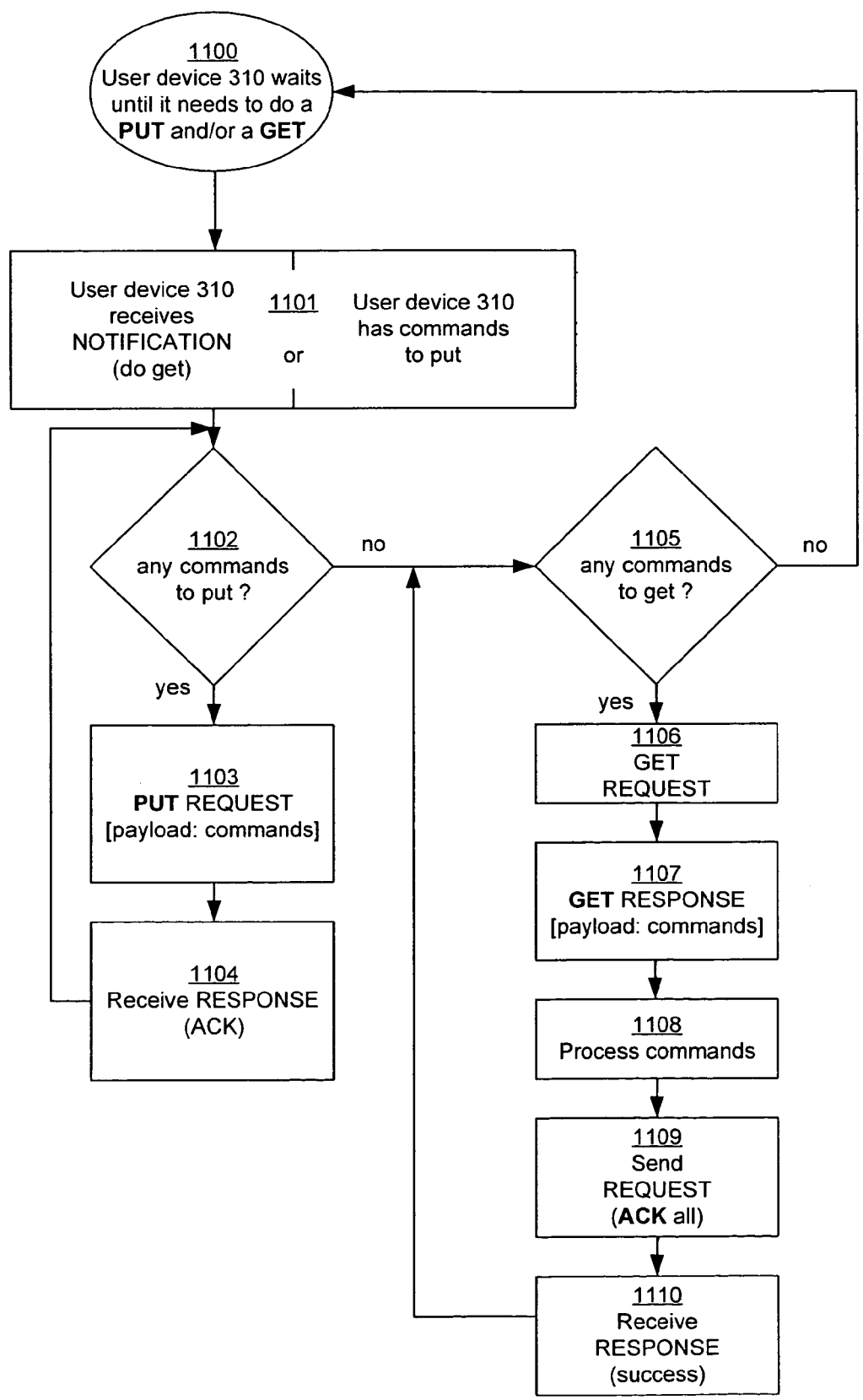
FIGS. 10A to 10D show a PUT-GET-ACK procedure from a point of view a content node and a content router according to embodiments of the present invention.

FIG. 10A shows a PUT-GET-ACK procedure between a content router 200 and a content node 300 from a point of view of the content node 300. At 1100, a content node 300, such as a user device 310, waits until there is a need or an ability to put a command to or get a command from the content router 200.

At 1101, a content node 300 receives a notification from the content router 200 that a command is pending in the outgoing queue 241 and/or the content node 300 determines that it has one or more commands to send to the content router 200.

At 1102, the content node 300 first determines whether there are any commands to send to the content router 200. By requiring that the content node 300 sends commands before receiving commands, resolution of conflicts is handled in the content router 200 rather than by the content node 300.

At 1103, the content node 300 sends a request to PUT commands from the content node 300 to the content router 200. If the content node 300 has one or more commands to put to the content router 200, it may send a sequence of one or more individual requests each containing a payload including a command. Alternatively, it may send a sequence of one or more requests each containing a payload including batches of commands.

At 1104, the content node 300 receives an acknowledgement that the commands were received by the content router 200. The content node 300 then checks again at 1102 to determine whether there are any more commands to put to the content router 200.

At 1105, if the content node 300 does not have any pending commands to put to the content router 200, the content node 300 next checks to determine if there are any commands to get. In some embodiments, the content router 200 includes an indication in the acknowledgement received in 1104. The indication may inform the content node 300 that a pending command is waiting in the outgoing queue 241. If no commands were pushed to the content router 200, the content node 300 may determine that there may be one or more pending commands to get based on the notification received earlier.

If there are commands to GET from the content router 200, at 1106, the content node 300 sends a request to the content router 200. At 1107, the content node 300 then receives a response having a payload containing the one or more commands. At 1108, the content node 300 processes the commands, which may include executing the commands or may simply saving the commands for future execution. At 1109, the content node 300 sends to the content router 200 an acknowledgement (ACK) that the commands were received and processed. At 1110, the content node 300 waits for a response that its acknowledgement (ACK) successfully was received by the content router 200.

Next, again at 1105, the content node 300 checks to see whether there are any more commands to get. The content node 300 may determine whether the content router 200 has additional commands by examining the last received response received at 1110. In some embodiments, a response may contain an indication that one or more additional commands are pending in the outgoing queue 241. In some embodiments, a response may contain the one or more additional commands that were pending in the outgoing queue 241. In cases where the response contains an indication that one or more additional commands are pending in the outgoing queue 241, the content node 300 continues by requesting and processing the commands at 1106. In cases where the response contains the one or more additional commands, the content node 300 continues by processing the commands at 1108.

Figure 10B:
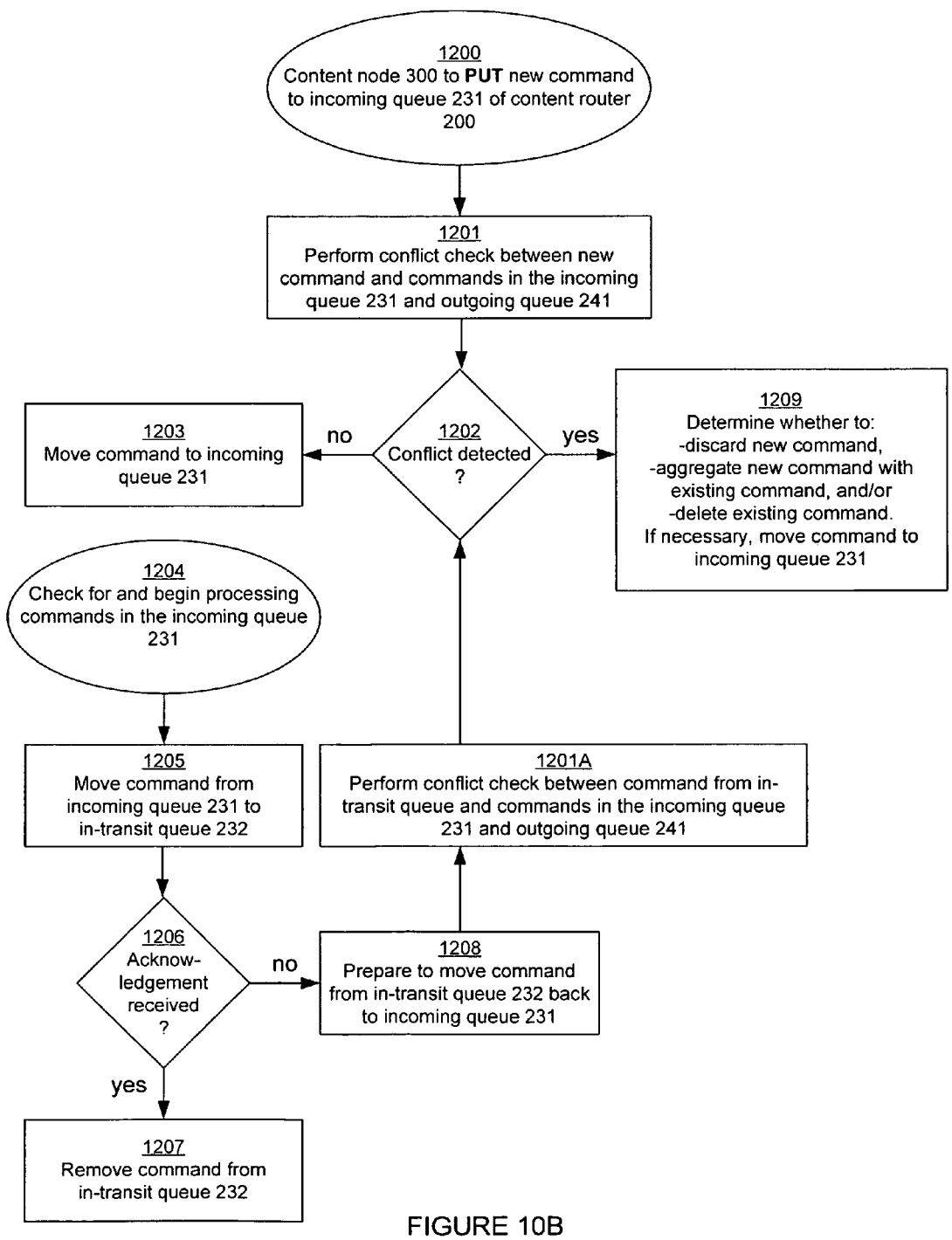

FIG. 10B shows a PUT-GET-ACK procedure between a content router 200 and a content node 300 from the point of view of the content router 200 receiving a new incoming command PUT to the content router 200 by the content node 300. At 1200, a content node 300 sends a new command to the content router 200, where the new command is destined for the incoming queue 231.

At 1201, the processing logic 250 determines whether any conflict exists between the new command and any command existing in either the incoming queue 231 or the outgoing queue 241. At 1209, if a conflict exists between the new command and an existing command, the processing logic 250 resolves the conflict by determining whether to discard the new command, aggregate the new command with the existing conflicting command, remove the existing conflicting command from the queue 231 or 241, and/or move the new command to the incoming queue 231. The process of detecting and resolving conflicts between a new command and an existing command is further described below with reference to FIG. 10D. At 1203, if no conflict is detected, the processing logic 250 moves the command to the incoming queue 231.

At a future time, the processing logic 250 begins processing commands in the incoming queue 231 as shown at 1204. At 1205, once processing has been initiated, the processing logic 250 may move the command from the incoming queue 231 to the in-transit queue 232. At 1206, the processing logic 250 receives an acknowledgement that the command was processed, receives a negative acknowledgement that the command was not processed, or determines that due to a failure, such as a timeout, the command must be processed again.

At 1207, the processing logic 250 receives an acknowledgement. Therefore, the processing logic 250 removes and discards the command from the in-transit queue 232. Alternatively at 1208, if a timely acknowledgement is not received, the processing logic 250 prepares to move the command from the in-transit queue 232 back to the incoming queue 231 for reprocessing at 1204. At this point, the command to be moved may be treated as a new command. At 1201A, the processing logic 250 performs a conflict check between the command to be moved and commands in the incoming and outgoing queues 231, 241 for the content node 300. The process then continues as described above with reference to 1202.

Figure 10C:
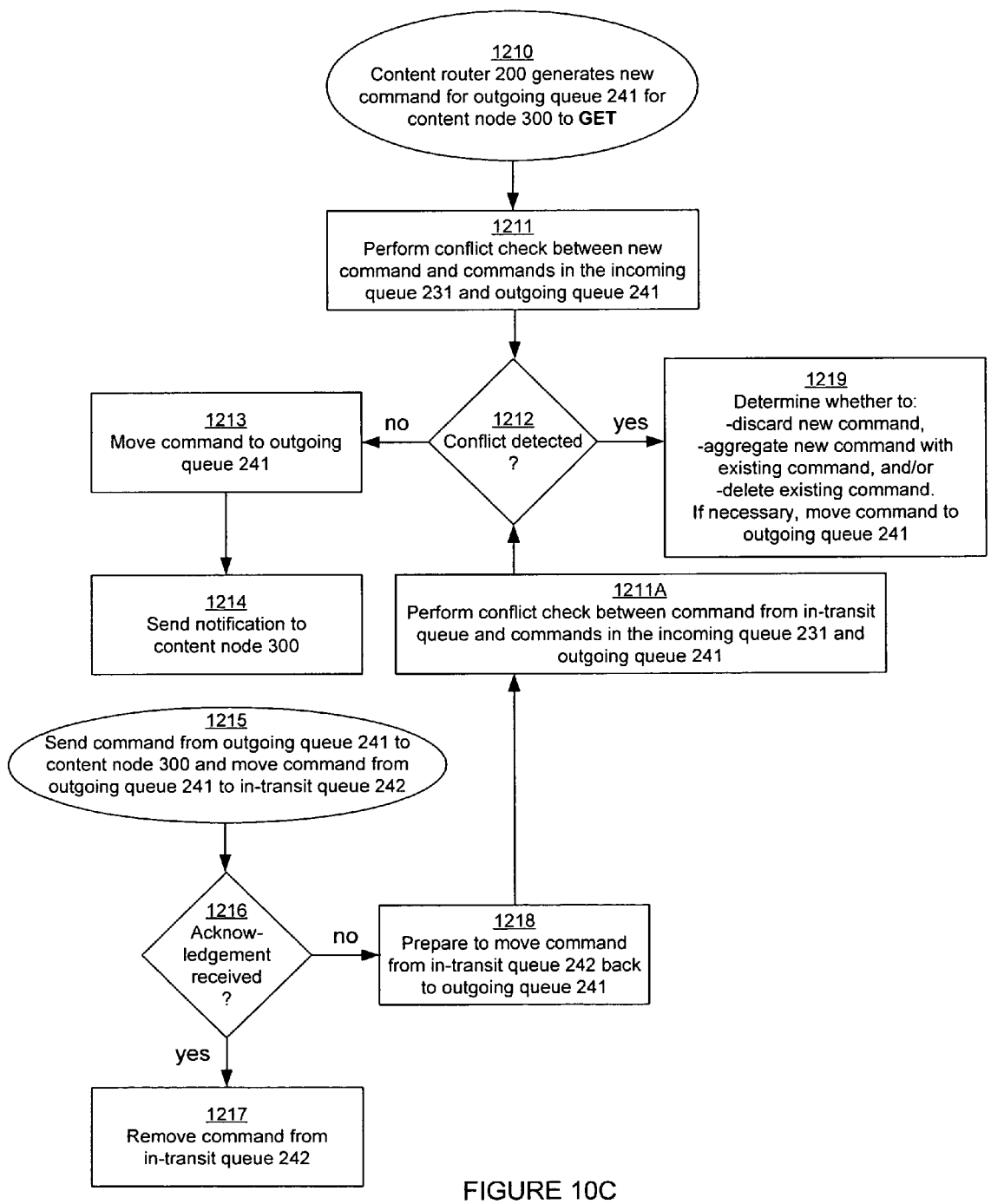

FIG. 10C shows a PUT-GET-ACK procedure between a content router 200 and a content node 300 from the point of view of the content router 200 generating a new outgoing command for a content node 300 to GET from the content router 200. At 1210, the content router 200 may generate a new outgoing command in response to an incoming command from a different connected content node associated with the same user.

At 1211, the processing logic 250 determines whether any conflict exists between the new command and any command existing in either the incoming queue 231 or the outgoing queue 241. At 1219, if a conflict exists between the new command and an existing command, the processing logic 250 resolves the conflict by determining whether to discard the new command, aggregate the new command with the existing conflicting command, remove the existing conflicting command from the queue 231 or 241, and/or move the new command to the outgoing queue 241. At 1213, if no conflict is detected, the processing logic 250 moves command to the outgoing queue 241. At 1214, the processing logic 250 may send a notification to the content node 300 to indicate that a new command is waiting in the outgoing queue 241.

At a future time, the processing logic 250 begins processing the commands in the outgoing queue 241. At 1215 once processing has been initiated, the processing logic 250 send a command from the outgoing queue 241 to the content node 300. The processing logic 250 may also move the command from the outgoing queue 241 to the in-transit queue 242. At 1216, the processing logic 250 waits for an acknowledgement from the content node 300 indicating that the command was processed by the content node 300. A failure may occur if the processing logic 250 receives a negative acknowledgement that the command was not processed or determines that due to a failure, such as a timeout, the command must be processes again.

At 1217, the processing logic 250 receives an acknowledgement. Therefore, the processing logic 250 removes and discards the command from the in-transit queue 242. Alternatively at 1218, if a timely acknowledgement is not received, the processing logic 250 prepares to move the command from the in-transit queue 242 back to the outgoing queue 241 for reprocessing. At this point, the command to be moved may be treated as a new command. At 1211A, the processing logic 250 performs a conflict check between the command to be moved and commands in the incoming and outgoing queues 231, 241 for the content node 300. The process then continues as described above with reference to 1212.

Figure 10D:
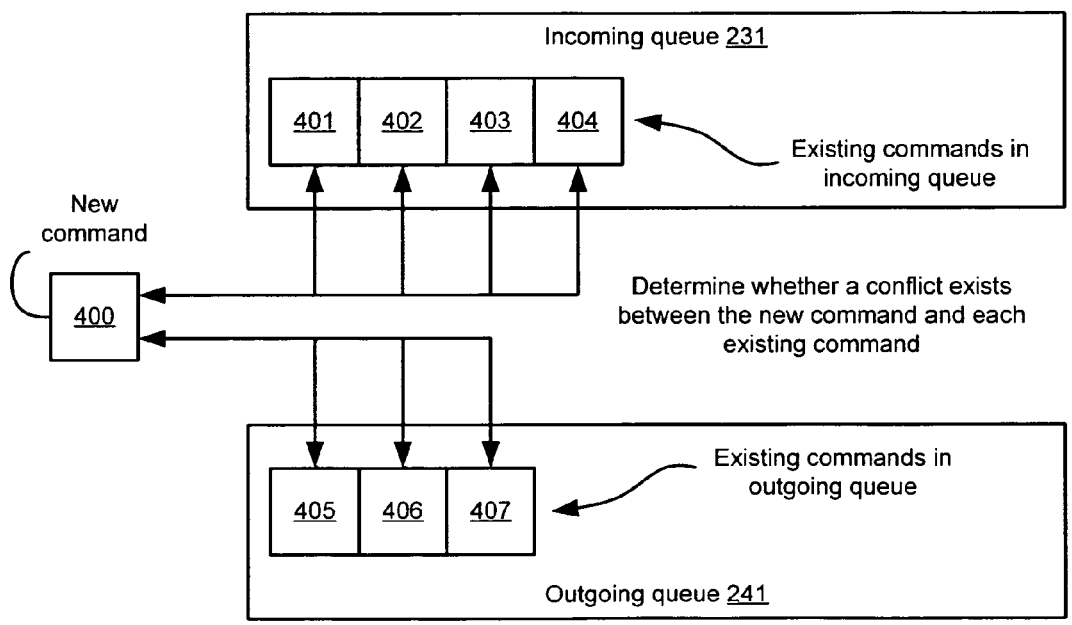

FIG. 10D shows a structure for detecting conflicts between a new command 400 and existing commands 401-407 in the incoming queue 231 and the outgoing queue 241. A new command 400 may be received from a content node 300 or generated by the processing logic 250. New commands 400 from a content node 300 are destined for the incoming queue 231. New commands 400 generated by the processing logic 250 are destined for the outgoing queue 241. Before a new command 400 is saved in either the incoming queue 231 or the outgoing queue 241, the processing logic 250 determines whether a conflict exists.

To determine whether a conflict exists, the processing logic 250 compares the new command 400 to existing commands 401-407 in the incoming queue 231 and/or the outgoing queue 241. If the new command 400 and an existing queued command contain related content or metadata, the processing logic 250 may determine that a conflict must be resolved between the new command 400 and this existing command.

To resolve a detected conflict, the processing logic 250 may determine if one command supersedes the other. In the case where the existing command supersedes the new command, the processing logic 250 may discard the new command 400. In the case where the new command supersedes the existing command, the processing logic 250 may either replace the existing command with the new command 400 in the appropriate queue 231 or 241, or it may remove the existing command from the queue 231 or 241 and add the new command 400 as a new entry at a different location in the appropriate queue 231 or 241.

Alternatively, the processing logic 250 may determine that the new command 400 and the command conflicting with the new command 400 should be aggregated into a single command. In the case where commands are aggregated, the processing logic 250 may either replace the existing command with an aggregated command, or it may remove the existing command from the queue 231 or 241 and add the aggregated command as a new entry in the appropriate queue 231 or 241.

Figure 11:
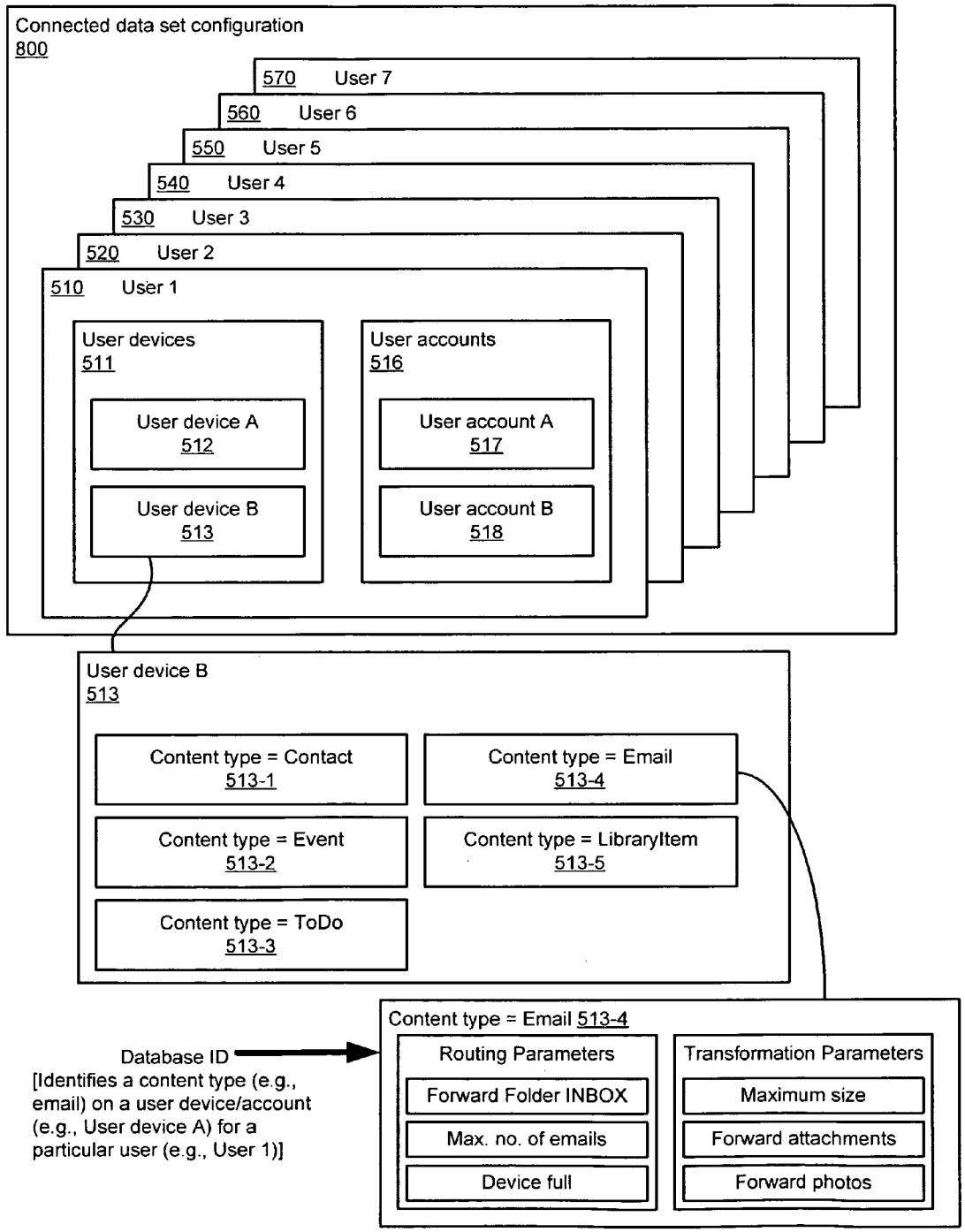
FIG. 11 illustrates representation of a structure of a connected data set configuration according to embodiments of the present invention.

FIG. 11 illustrates a representation of a structure of a connected data set configuration 800 according to embodiments of the present invention. A connected data set configuration database 800 includes a hierarchal configuration, e.g., 510 to 570, for each user connected to the content router 200. A first user defines a connected data set configuration 510 using a configuration and maintenance tool. The configuration and maintenance tool may be, for example, a web based graphical user interface (GUI) having access to the database 800 via SQL database calls.

Each user configuration 510 to 570 may include a configuration for user devices 511 and for user accounts 516. Each configuration for user devices 511 includes a set of configurations for each user device 512, 513. Each configuration for user accounts 516 includes a set of configurations for each user account 517, 518. Each user device and account configuration 512, 513, 517 and 518 includes a set of configurations for each configured content type.

Those skilled in the art will recognize that the connected data set configuration database 800 may be structured using one of several possible hierarchal structures. For example, user devices configuration 511 and user accounts configuration 516 may be combined into a single structure. The hierarchal structure between user devices or user accounts and content type may be reversed such that a content type configuration contains a configuration for multiple user devices and/or user accounts, rather than having a user device or user account configuration containing a configuration for multiple content type.

As shown, a user device configuration 513 contains a configuration for each content type processed by the user device. For example, if user device B is capable of processing contacts, events, to do items (tasks), emails and library items, the user device B configuration 513 may contain respective configurations 513-1, 513-2, 513-3, 513-4 and 513-5. A database ID may be allocated for each content type of a user's connected content nodes. Therefore, a database ID may have a one-to-one relationship to a particular content type on a particular connected content node for a particular user. This database ID may be used by a content node when it communicates with the content router 200. For example, each command that is generated by a content node may include a specific database ID to identify the user, the content node and the content type as described below with reference to FIG. 13.

A configuration 513-1 for contact content type of a particular content node (e.g., user device B 513) may require a contact to include a phone number. For example, some mobile phones only allow a contact including a phone number. Alternately, a user may only want contacts with phone numbers on the user's device. If such a flag is set, all contacts without a phone number will not be routed to this content node. A flag may indicate may indicate that phone numbers must be digits only without other ASCII characters. In this case, a repository may be used as described below to hold an unfiltered version of a ASCII filled phone number while the content router will prepare a contact include a digit-only phone number.

A configuration 513-2 for event content type of a particular content node may allow only events occurring within the next two weeks (or other set future duration) to be routed to the content node. Therefore, if one content node sends a new event to the content router, the content router will determine if this event will occur within the predetermined future time. If the flag and duration indicate that the event falls outside the parameters, the content router will not route the event to this content node. Additionally, a content router may include an inventory as described below that may be periodically reviewed to determine if an event falls within the duration and may be retrieved from one content node and sent to this content node. Another flag may indicate that all attachments will be removed from an event before forwarding to this content node. Another flag may indicate that all notes will be removed from an event before forwarding to this content node.

Similarly, a configuration 513-3 for to-do task content type of a particular content node may allow only tasks due within the next two weeks (or other set future duration) to be routed to the content node.

A configuration 513-4 for email is shown to include routing parameters used in routing rules and transformation parameters used in transformation rules. Routing rules may be used by the processing logic 250 to select a set of destination content nodes. The set may be a null set, whereby no content nodes are selected for receipt of an outgoing command. Alternatively, the set may indicate one or more destination content nodes that may receive an outgoing command. Routing rules include the capability of a content node to receive a particular content type, or an upper limit on a number of elements allowed on a content node. For example, a routing rule may be to bar any commands to a device that will increase the number of unread or read emails. A routing parameter may be a flag indication if the content node is or is not accepting commands. For example, if the content node's email box is full, the flag may be set to block sending of additional emails. A routing parameter may indicate the maximum size of an acceptable input. For example, if a content node is a mobile phone with limited memory, the routing parameter may be used to block all email messages greater that a particular size (e.g., greater than 1 kilobyte). A routing parameter may indicate that the content router should block all commands destined to the content node if the connection speed is below a predetermined rate or if the connection type does not provide a high transfer rate. For example, routing parameter may indicate that a content node, such as a mobile phone, will not receive email messages with attachments if the mobile phone is not connected with a wired connection.

For each selected destination content node, the processing logic 250 may generate an outgoing command. The processing logic 250 may use transformation parameters when processing transformation rules. Transformation rules may be used to determine the contents of the generated outgoing command. For example, a transformation parameter may be a maximum size value used to truncate commands to a maximum size (e.g., limiting the size to less than 1 kilobyte). A transformation parameter may be a flag used to determine whether a particular content type should be cut from the command. For example, a flag may be used to indicate that the content node only accepts attachments that are image files. A transformation parameter may be a flag used to block all attachments. For example, a flag may be used to indicate that the content node does not accept attachments that are document files. A transformation parameter may indicate that the content router should remove all attachments if the connection speed is below a predetermined rate or if the connection type does not provide a high transfer rate. For example, transformation parameter may indicate that a content node, such as a mobile phone, accepts email messages with the attachments if the mobile phone is connected with a wired connection but indicates that the attachments may be stripped off if the mobile phone is connected with a wireless connection. A transformation parameter may be a flag used to block all attachments if the content node if approaching a full state. For example, a flag may be used to indicate that the content node does not accept attachments when the content node is nearly full (e.g., 90% full). The content node may strip attachments from emails thereby preserving free memory on the content node.

A configuration 513-5 for library item content type of a particular content node may allow only images to be routed to the content node. Another flag may be used to filter audio files. Additionally, another flag may be used to filter movie files.

FIGS. 12A to 12E illustrate external and internal logic, which may be used to interface a content router 200 to user devices 310 and user accounts 320 according to embodiments of the present invention.

Figure 12A:
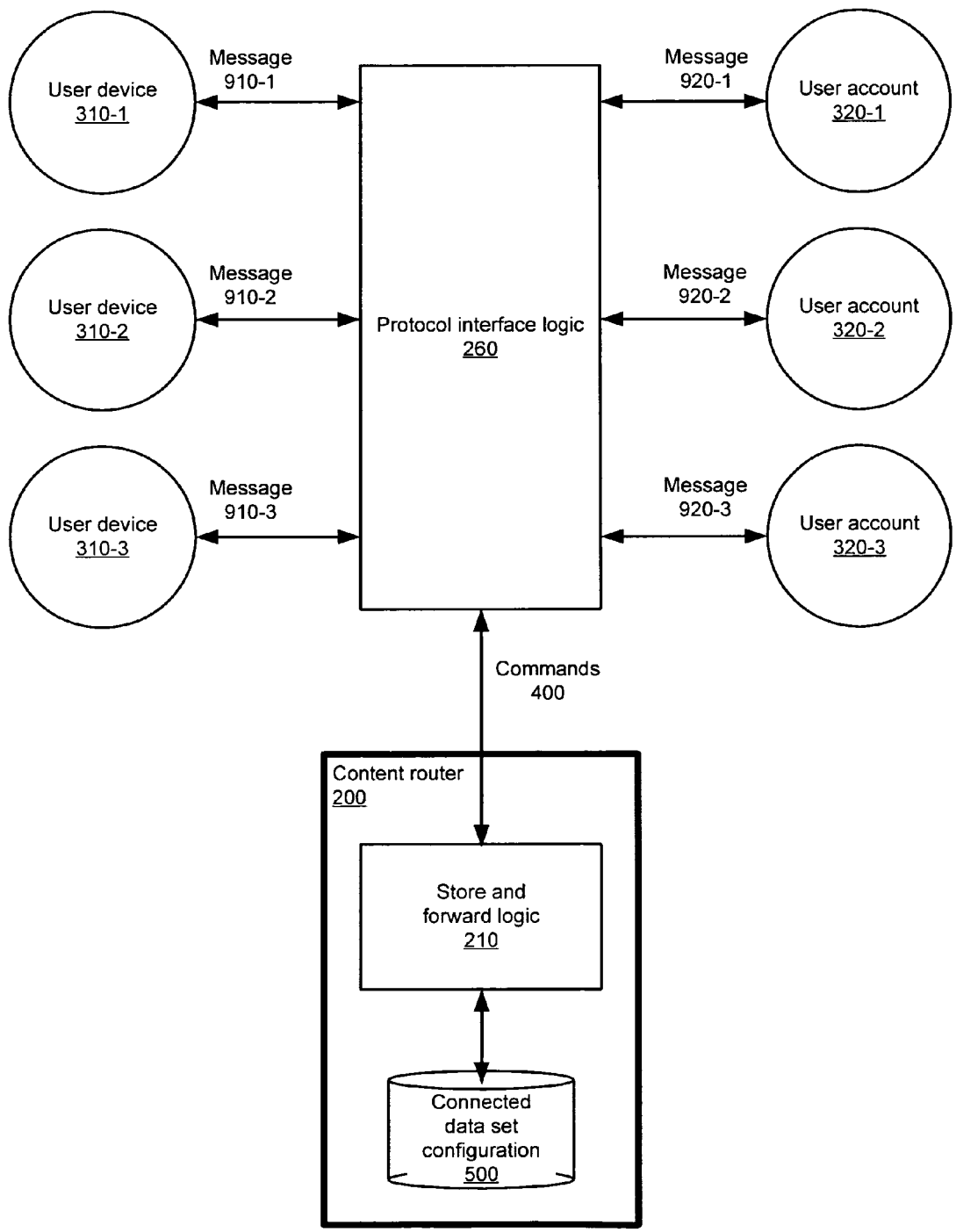
FIGS. 12A to 12E illustrate external and internal logic, which may be used to interface a content router to user devices and user accounts according to embodiments of the present invention.

FIG. 12A illustrates a content router 200 coupled to an external protocol interface logic 260 and including a connected data set configuration 500 and store and forward logic 210 coupled to a command interface of protocol interface logic 260. The protocol interface logic 260 may be used to couple the store and forward logic 210 with various content nodes types such as user devices 310-1 to 310-3 and user accounts 320-1 to 320-3 using interfaces having disparate protocols.

In the embodiment shown, the protocol interface logic 260 translates between a protocol used by a content node 310, 320 and commands 400 processed in the store and forward logic 210. Specifically, the protocol interface logic 260 receives messages 910-1 to 910-3 and 920-1 to 920-3 based on a specific content node protocol used to communicate with the content node 310-1 to 310-3 and user accounts 320-1 to 320-3. The protocol interface logic 260 converts these signals to commands 400 for the store and forward logic 210. The protocol interface logic 260 also receives commands 400 from the store and forward logic 210 and converts these commands back to messages 910-1 to 910-3 and 920-1 to 920-3 tailored for the specific content node 310-1 to 310-3 and 320-1 to 320-3.

As described above, a content router 200 couples to a command interface of the protocol interface logic 260. As described below, the content router 200 couples to a message interface of protocol interface logic 260.

Figure 12B:
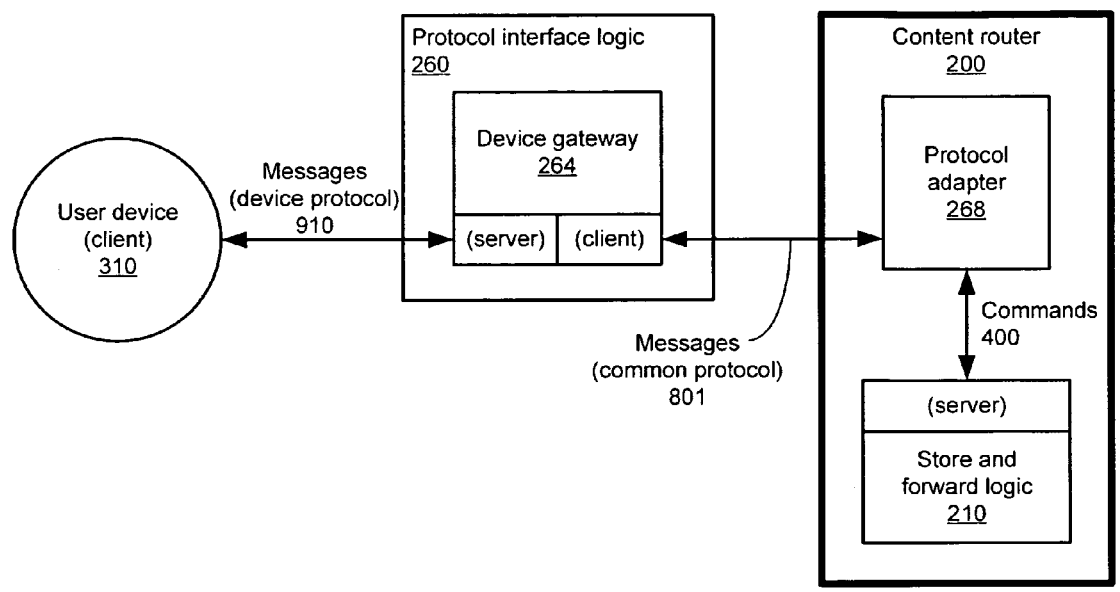

FIG. 12B shows a content router 200 including store and forward logic 210 and a protocol adapter 268 translating between messages 801 and commands 400. The protocol interface logic 260 including a device gateway 264 translating between messages 910 from a user device and messages from the content router 200. The device gateway 264 couples the content router 200 with user devices utilizing various protocols. The various user devices and protocols may include a mobile phone running a SyncML protocol or an SMS based protocol, a Java™ based client device running a binary protocol, a home personal computer based client running HTTP protocol, or the like.

The device gateway 264 performs a function of translating between various protocols used by the different user device types and a common protocol, such as a XML-RPC (extensible Markup Language-Remote Procedure Calling) protocol, used by the content router 200. A common protocol allows for easier scalability when additional gateways also using the common protocol are coupled to the content router 200. Furthermore, using a common protocol decouples the function of device protocol conversion from the protocol adapter 268 as well as from the store and forward logic 210.

In addition to translating protocols, the device gateway 264 models a server to support a client-server relationship from the point of view of the user device 310, which acts as a client. The device gateway 264 also models a client to support a client-server relationship from the point of view of the store and forward logic 210, which acts as a server.

In an alternative embodiment, the protocol adapter 268 is separate from the content router 200. The protocol adapter 268 may be part of the protocol interface logic 260 or may be standalone.

Some user devices 310 may include a user interface application unaware of the content router 200. For these user devices 310, the user device 310 may include a data routing driver knowledgeable of the content router 200 and which interfaces with the user interface application. The data routing driver uses an available protocol to communicate with the content router 200 thereby coupling the user application with the content router 200. Commands received over the available protocol are translated into instructions for the user application. Additionally, changes made within the application are communicated as messages sent over the available protocol to the content router 200.

Some user devices 310 may include both a data routing driver and an application knowledgeable of the content router 200. Other user devices 310, such as a SyncML-enabled mobile phone, may not need a data routing driver knowledgeable of the content router 200 because of capabilities inherent in such devices. For example, a SyncML-enabled mobile phone inherently includes over-the-air SyncML synchronization routines invokeable by the content router 200. Therefore, the content router 200 may push changes to the SyncML-enabled mobile phone without requiring content router knowledgeable software on the user device 310.

Figure 12C:
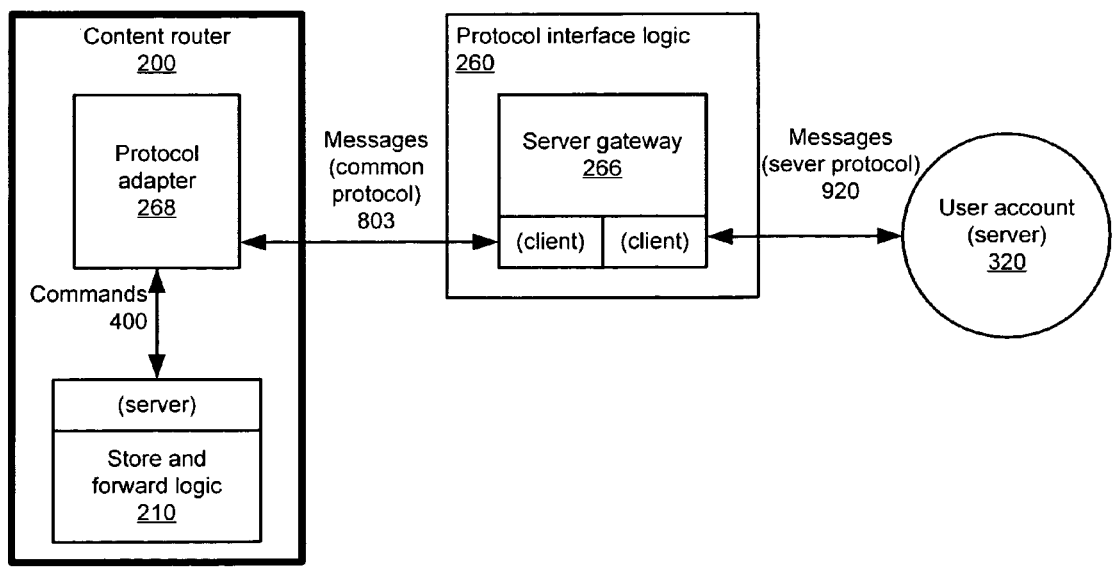

FIG. 12C shows a content router 200 including store and forward logic 210 and a protocol adapter 268 translating between messages 801 and commands 400. The protocol interface logic 260 including a server gateway 266, which translates between messages 920 from a user account and messages having a common protocol for use in the content router 200. The server gateway 266 couples the content router 200 with user accounts utilizing various protocols.

The server gateway 266 allows access to the content router 200 by user accounts communicating according to various server protocols such as HTTP XML, J DAV, Web DAV Exchange, IMAP, POP3, or the like. The server may include a PIM server, such as a Yahoo!® PIM server, a photo server, such as a Yahoo!® Photos server, an email server, such as a PacBell email server, or the like. For example, a content node 320 may be a user's email account on an email server using an IMAP protocol to communicate to the content router 200.

Similar to the device gateway 264, the server gateway 266 models a client to the store and forward logic 210. Unlike the device gateway 264, which models an intermediary between a client and a server, the server gateway 266 models an intermediary between two servers. Typically, two servers do not communicated in a client-server relationship. The server gateway 266, however, allows the account server to communicate with the store and forward logic 210 server, both acting as servers in a client-server relationship. To facilitate this communication, the server gateway 266 models a client to support a client-server relationship from the point of view of the user account 320 and models a client from the point of view of the store and forward logic 210.

As described above, the protocol interface logic 260 is positioned externally from the content router 200. As described below, the content route 200 includes the protocol interface logic 260

Figure 12D:
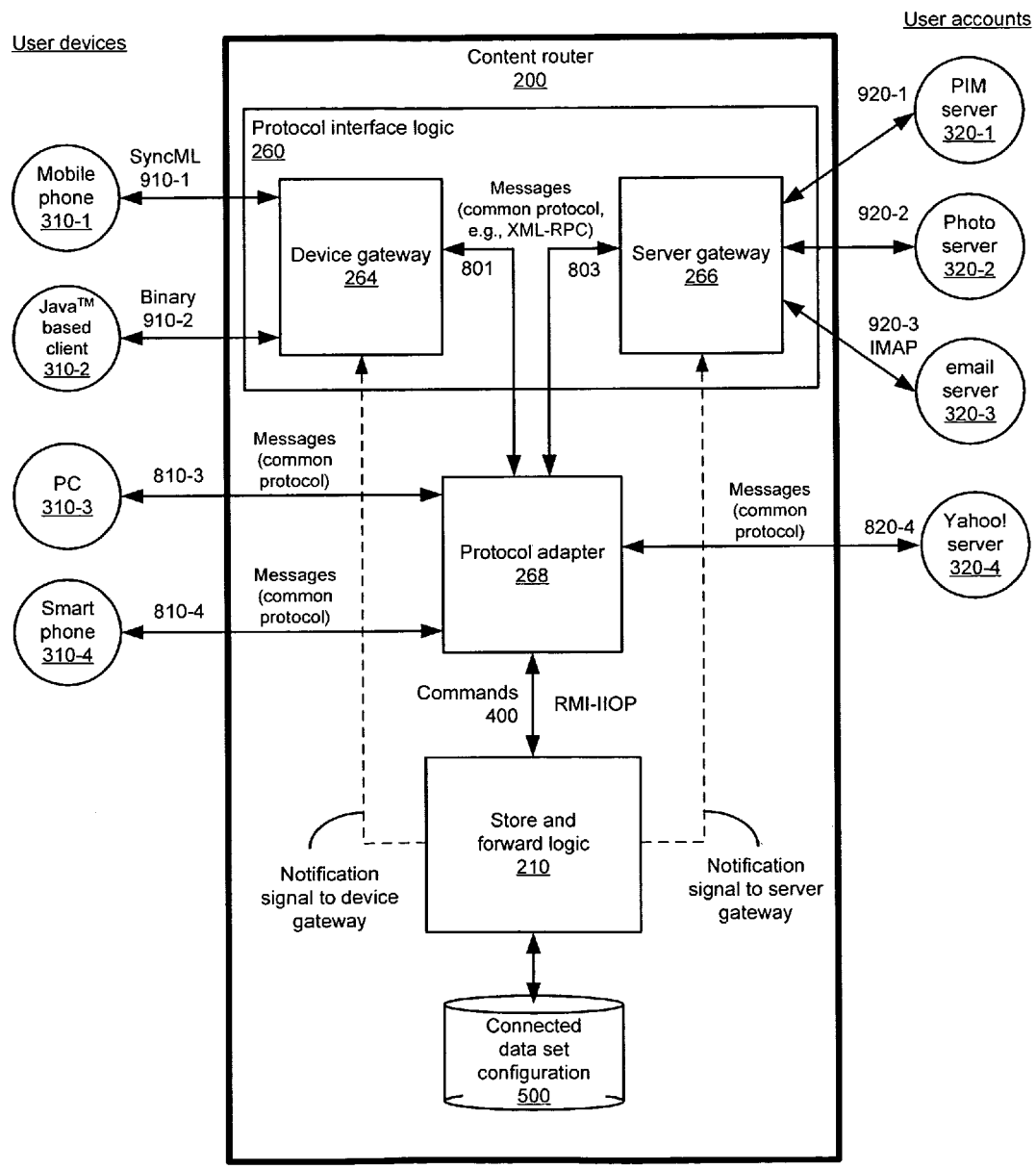

FIG. 12D shows a content router 200 containing store and forward logic 210, a protocol adapter 268, and protocol interface logic 260 including a device gateway 264 and a server gateway 266. As described above, the device gateway 264 and a server gateway 266 translate between protocols used by devices and servers and a common protocol, such as an XML-RPC protocol. The protocol adapter 268 translates between the common protocol and commands 400 used to communicate with the store and forward logic 210. Commands 400 sent between the store and forward logic 210 and the protocol adapter 268 may be in a request-response scheme such as in a Java™ platform including a Remote Method Invocation over Internet Inter-ORB Protocol (RMI-IIOP) technology interface. A Java RMI platform allows an object running on a Java enabled content node to invoke methods on an object running in a Java based store and forward logic 210 and vise versa. Furthermore, the content router 200 may configure the device gateway 264 and/or the server gateway 266 with one or more of the routing parameters and/or one or more of the transformation parameters, such that the gateway may perform routing and transformations on commands of a content node.

The device gateway 264 is shown coupling the protocol adapter 268 to a mobile phone 310-1 running a SyncML protocol 910-1 and a Java™ based client device 310-2 operating with a binary protocol 910-2. The server gateway 266 is shown coupling the protocol adapter 268 to a PIM server 320-1, a photo server 320-2, and an email server 320-3 with protocols 920-1, 920-2, and 920-3, respectively.

A common protocol, such as XML-RPC, allows applications running on disparate operating systems and in different environments to make remote procedure calls using HTTP as a transport layer and XML as an encoding scheme. The XML-RPC protocol allows complex data structures to be transmitted from an application running on the device gateway 264, the server gateway 266, an XML-RPC-enabled device, or an XML-RPC-enabled server to the protocol adapter 268 and the store and forward logic 210. The protocol adapter 268 or the store and forward logic 210 may process the received data structure and return a result to the application.

Content nodes having the capability to communicate using the common protocol may bypass the gateway and may communicate directly with the protocol adapter 268. For example, a Symbian device or a WinCE, Win32 or home personal computer (PC) 310-3 running a client application may communicate directly with the protocol adapter 268 and avoids the device gateway 264 since the PC 310-3 already employs the common protocol. Additionally, a smart phone 310-4 may also communicate using the common protocol and avoid the device gateway 264. Similarly, user accounts may use the common protocol thereby bypassing the server gateway 266 to communicate with the protocol adapter 268. As shown, a Yahoo!® server 320-4 uses the common protocol thereby avoiding the server gateway 266. In some embodiments, a content node communicates with commands 400 directly (not shown), and thus may avoid using a protocol adapter 268.

By using a common protocol, the protocol adapter 268 may treat messages 801 from device gateway 264, messages 803 from a server gateway 266, messages 810-3, 810-4 from user devices 310-3, 310-4 and messages 820-4 from user accounts 320-4 similarly, thereby simplifying the design and implementation of the protocol adapter 268. Therefore, incoming messages in the common protocol are treated similarly regardless of input path to the protocol adapter 268. As a result, the store and forward logic 210 may treat commands from each content node similarly.

The content router 200 may also include a notification signal (dotted line) sent from the store and forward logic 210 to a device and/or server gateway 264, 266 as shown in FIG. 12D. If an outgoing command is waiting in the outgoing queue 241, the store and forward logic 210 may periodically send a notification signal (dotted lines) to the appropriate gateway 264, 266. A notification may be send from the store and forward logic 210 to the gateway 264, 266 using telnet, HTTP, a custom API, or the like. The gateway 264, 266 then may initiate a request for the outgoing command or commands 400 from the store and forward logic 210. The gateway 264, 266 may receive a response including the command from the outgoing queue 241.

In some embodiment, after a gateway 264, 266 receives a notification signal and fetches an outgoing command, the gateway prepares an outgoing notification message containing the command. If the outgoing command is relatively small in size, the gateway 264, 266 may include the command within the notification.

According to some embodiments, the store and forward logic 210 determines that a notification may be sent to a content node 300 to inform the content node 300 that the outgoing queue may contain an outgoing command. The store and forward logic 210 generates a notification signal for a gateway 264, 266. The gateway 264, 266 receives a notification signal from the store and forward logic 210. The notification signal may indicate availability of an outgoing command in the outgoing queue 241 for a content node 300. In response to receiving the notification signal, the gateway 264, 266 may request the outgoing command, for example, by a call to the protocol adapter 268. The protocol adapter 268 retrieves the command from the store and forward logic 210, which provides it to the gateway 264, 266. The gateway 264, 266 receives the response containing the outgoing command. The gateway 264, 266 prepares an outgoing notification containing the outgoing command. The gateway 264, 266 may encode the outgoing command into a compact binary sequence. The gateway 264, 266 then sends the outgoing notification to the content node 300, which may be either a user device 310 such as a mobile phone or a user account 320 such as an email account. For example, a device gateway 264 may send the outgoing notification to a mobile phone by way of an SMS gateway. The gateway 264, 266 may send an acknowledge that the outgoing notification to the store and forward logic 210 via the protocol adapter 268.

Figure 12E:
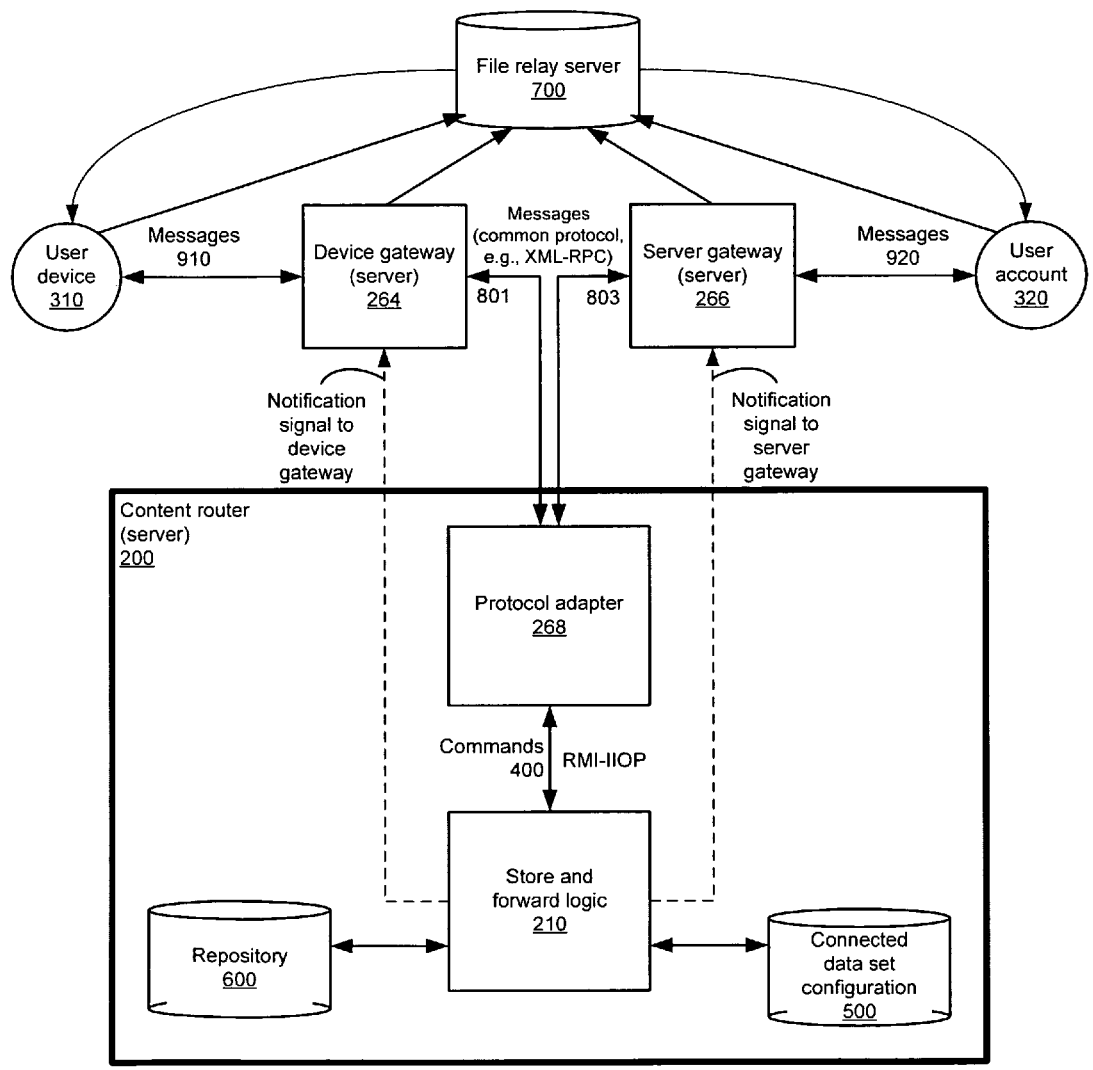

FIG. 12E shows a multi-server content routing system according to embodiments of the present invention. The content router 200 operates as a first server. The content router 200 includes store and forward logic 210 and a protocol adapter 268, which may communicate internally via a command based exchange, such as with RMI-IIOP, and externally via a common protocol, such as XML-RPC. The content router 200 may also include a connected data set configuration 500 and/or a repository 600 and/or a file relay server 700 either internally to or externally from the content router 200. Furthermore, the command memory 220, the connected data set configuration 500, the repository 600, and the file relay server 700 may each be formed in separate memory, combined in a common memory, or formed in a combination of separate and combined memory. For example, the command memory 220, the connected data set configuration 500, the repository 600, and the file relay server 700 may each be formed in separate databases, such as separate relational databases, or two or more may be combined a combined database.

The content routing system also includes servers to communicate to content nodes. A device gateway (server) 264 interfaces to user devices 310 using device specific protocols 910. A server gateway (server) 266 interfaces to user accounts 320 using server specific protocols 920.

Some embodiments of the present inventions include or are coupled to a file relay server 700. The file relay server 700 acts as a file relay memory and may be coupled to one or more of the servers and/or content router 200 (direct connection not shown in figure) and/or one or more of the content nodes.

The file relay server 700 facilitates transportation of commands having separable segments among a plurality of content nodes comprising detaching the segments prior to the commands being saved to a command memory of a store and forward logic. The file relay server 700 may provide an input for a content node 310, 320, a server 264, 266, or a content router 200 (a protocol adapter 268 or a store and forward logic 210) to store one or more files so that the files may be removed from incoming commands before the incoming command is stored in the command memory 220 of the store and forward logic 210. By removing separable segments, especially large files, the command memory is capable of holding a larger number of commands and may be more agile in processing commands. The file relay server 700 may also provide a mechanism for routing file from and to a content node behind a firewall. Two content nodes 300 separated by a firewall may not permission to access content, such as a file, and metadata from the other. However, if both content nodes 300 are able to provide the content and/or metadata to the file relay server 700 either directly or indirectly through a server 264, 266, a content router 200, a protocol adapter 268, or a store and forward logic 210, the content nodes 300 may, in effect, exchange the content and/or metadata. Additionally, in some embodiments, a file is encrypted by the content node 310, 320, a server 264, 266, a content router 200, a protocol adapter 268, or a store and forward logic 210 before it is saved to the file relay server 700. In some embodiments, a security mechanism is implemented so that a file provided by one content node are only available to other content nodes connected to the same user, for example, as configured in the connected data set configuration for that users. A security mechanism may include authentication of each request for a file from the file relay server 700, as well encryption of the received and delivered files.

The multi-server content routing system may use the file relay server 700 to provide a path for a content node to receive an attachment when a peer-to-peer 450 connection, as shown in FIG. 5, is not desirable or not possible. A peer-to-peer 450 connection may not be possible when one or both of the content nodes are behind firewalls that block peer-to-peer connections. Additionally, a peer-to-peer 450 connection may not be possible when each content node is not simultaneously connected to the network 10. The file relay server 700 may provide a temporary repository for attachments or other segments of a command.

The file relay server 700 may off load processing form the store and forward logic 210. For example, a source content node, a device gateway or a protocol adapter may cut a detachable segment from an incoming command or message, such as a large file from an email. A reference to the stored segment on the file relay server 700 may be positioned in place of the removed segment in the incoming command. The content router 200 and connected content nodes 300 may process a reference to a file residing on the file relay server 700 in a similar manner as a reference back to a file residing on the source content node 300. The resulting abridged incoming command may then be sent to the store and forward logic 210 and may be significantly smaller by the removal or replacement with a reference of a large segment. At some subsequent time, an outgoing command corresponding to the abridged incoming command may pass out from the store and forward logic 210. The protocol adapter, device gateway or a destination content node may detect the reference and replace the reference with the segment retrieved from the file relay server 700. In this way, the command memory 220 may be spared the task of holding large files.

In a first scenario, a stand alone file relay server 700 is used. First, a new email including an attachment is received via the Internet by a user's corporate email account. The user account communicates a change, that is, the arrival of the new email to the content router 200. The store and forward logic 210 receives an incoming command containing the email, however, the content node 300 replaced the attachment in the email with a metadata link identifying the location of the attachment on the corporate server. If the email account is behind a firewall, other connected content nodes may not be able to access a metadata link to the attachment. In this case, the store and forward logic 210 may forward the metadata link to the protocol interface logic 260 and may instruct the protocol interface logic 260 to fetch the attachment based on the metadata link. The protocol interface logic 260 directs the fetched attachment to the file relay server 700. When generating outgoing commands in response to the incoming command, the store and forward logic 210 replaces the metadata link identifying the corporate server as the source of the attachment with a link locating the attachment on the file relay server 700. A content node receiving the outgoing command will be referred to the file relay server 700 rather than to an inaccessible server.

In a second scenario, a public email server is used as the file relay server 700. As was described above, a new email including an attachment is received via the Internet by a user's corporate email account. The user account communicates the arrival of the new email to the store and forward logic 210 with a reference to the attachment rather than the attachment itself. The store and forward logic 210 instructs the protocol interface logic 260 to fetch the attachment based on the reference. In this scenario, the protocol interface logic 260 directs the attachment to a command destined for the public email server. The store and forward logic 210 then generates commands to each of the other connected content nodes with a metadata link directing a user to the public email server rather than the corporate email server. In this way, a content node may have access to an attachment that originated on an email server inaccessible to the content node.

In another scenario, a first content node sends an incoming command including an embedded attachment to the content router 200. The gateway 264 or 266 removes the attachment from the command and saves the attachment to the file relay server 700. The gateway may remove all attachments or alternately particular attachment types. The gateway may base the decision to remove one or more attachments base on one or more configuration parameters, which may be specific to a content node, a content node type and/or a user's connected data set configuration. The gateway may replace the attachment with a reference, which may allow a gateway or a content node itself to retrieve the attachment from the file relay server 700. Alternatively, the protocol adapter 268 or the store and forward logic 210 may swap the attachment and a reference in the command and store to and/or retrieve the attachment from the file relay server 700.

In some embodiments, the content node 310 or 320 interfaces with the file relay server 700. For example, if a user account 320 receives an email with an attached file from the Internet, it may forward the email to the content router 200 as a command to add a new email containing a file. Alternatively, the user account 320 may detach then forward the file to the file relay server 700. The content node 320 then generates and sends a command with the email having the attachment replaced with a reference to the file on the file relay server 700. When a destination content node, for example, user device 310, receives an outgoing command with the reference, the content node 310 may automatically retrieve the file from the file relay serer 700 and replace the reference with the retrieved file to restore the original email. Alternatively, the content node 310 may allow the user to manually fetch the file by following the reference to the file relay server 700.

In some embodiments, the gateways 264, 266 interfaces with the file relay server 700. For example, if a gateway 264, 266 receives an incoming command from a source content node 310 or 320 to add a new email containing an attached file, the gateway 264, 266 receiving the incoming command may forward the file to the file relay server 700 then substitute the file in the command with a reference to the file on the file relay server 700. At some later point in time when an outgoing command that contains the reference is sent towards a destination content node, the server 264, 266 receiving command from the content router 200 may restore the email by replacing the reference with the file extracted from the file relay server 700.

In some embodiments, the protocol adapter 268 interfaces (not shown) with the file relay server 700. For example, if the protocol adapter 268 receives an incoming command from a source content node 310, 320 to add a new email containing a file, the protocol adapter 268 may forward the file to the file relay server 700. The protocol adapter 268 then replaces the attached file with a reference to the file on the file relay server 700. When a destination content node 310, 320 requests an outgoing command that contains the reference, the protocol adapter 268 may replace the reference with the file extracted from the file relay server 700.

In some embodiments, the store and forward logic 210 interfaces (not shown) with the file relay server 700. For example, if the store and forward logic 210 receives an incoming command from a source content node 310, 320 to add a new email containing a file, the store and forward logic 210 may forward the file to the file relay server 700. The store and forward logic 210 then replaces the file in the command with a reference to the file on the file relay server 700. When the store and forward logic 210 retrieves an outgoing command that contains the reference, it may replace the reference with the file extracted from the file relay server 700.

FIGS. 13 and 14A to 14I show structures of various commands according to embodiments of the present invention.

Figure 13:
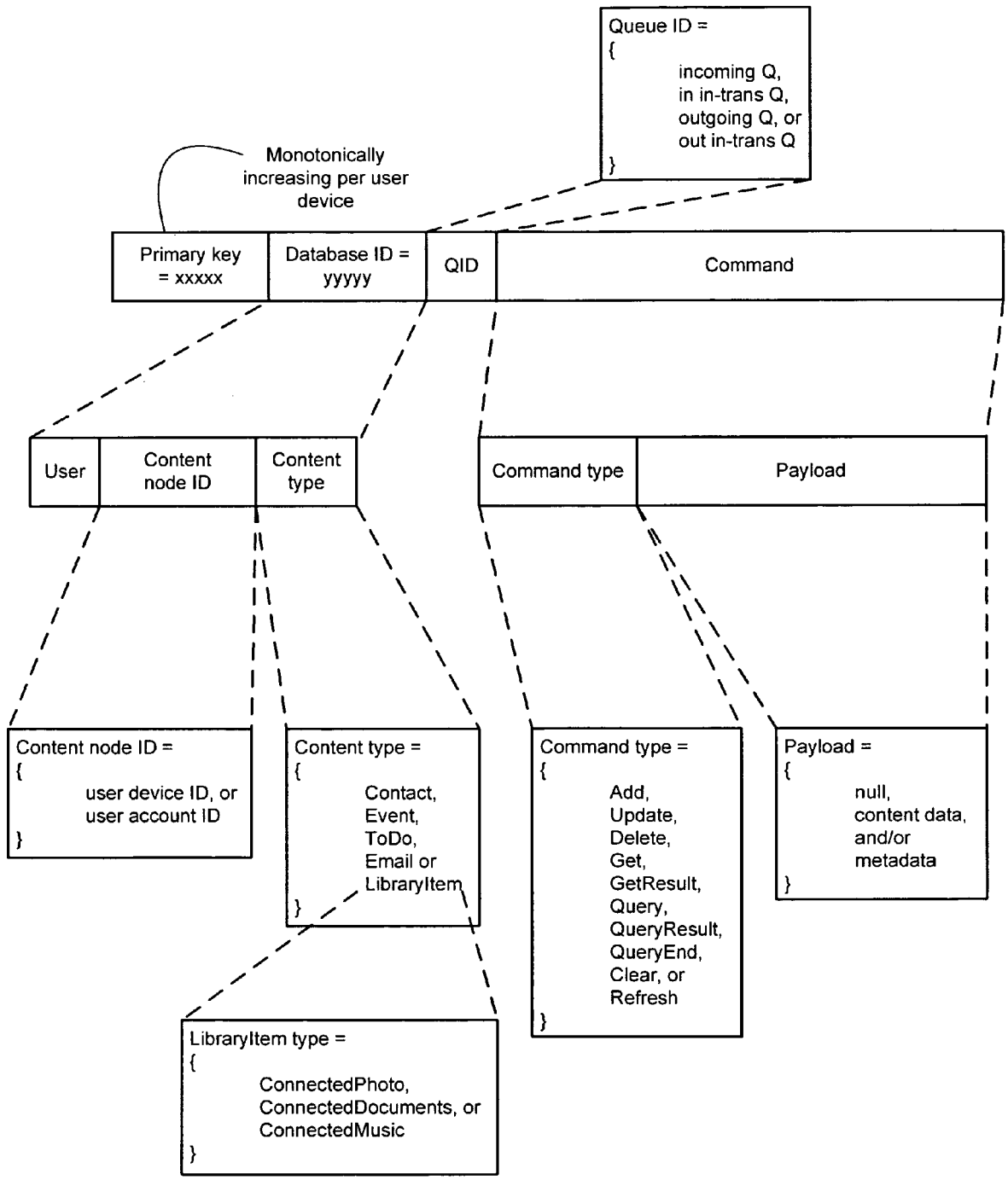
FIGS. 13 and 14A to 14I show structures of various commands according to embodiments of the present invention.

FIG. 13 shows a command associated with a primary key and database identifier according to embodiments of the present invention. The term command includes notifications and messages (which need not necessarily be in a "command" format) of such changes that may be acted upon accordingly by a receiver of the notifications and messages, such as content node. In some embodiments, a command includes a primary key that is a monotonically increasing value assigned by the processing logic 250 to each incoming command. The primary key is unique for all commands associated with a user. The primary key may also be unique for all commands associated with all users. In some embodiments, a time stamp may be used as the primary key.

A command is also associated with a database identifier. The database identifier may be used as an index or key into a database including commands from multiple users and multiple content nodes. The database identifier may be a sequentially increasing number assigned by the database for each content node and content type begin added to the database. Therefore, the database identifier may specifically identify, either indirectly or directly, a particular user, a particular content node or content node type, and a particular content type. A content node identifier may include an identifier to a particular user device or user account. A content type may include an indication of one of a Contact item, an Event item, a ToDo item, an Email item, or a Library item. The Library item may be used to indicate one of ConnectedPhoto metadata, ConnectedDocuments metadata, or ConnectedMusic metadata.

A command may also be associated with a queue identifier indicating whether the command may be considered to reside in an incoming queue 231, an incoming in-transit queue 232, an outgoing queue 241, or an outgoing in-transit queue 242. The command may be stored as an entry into a database, such as a SQL database, with associated attributes including the primary key, the database identifier and the queue identifier.

A command may contain a command type and a payload. The payload may include the content itself. Alternatively, the payload may include metadata, or may include both the content and metadata. Metadata provides information concerning the quality, condition, and other characteristics of the content. Metadata may include information such as a description of the content, an indication of a change to the content, and/or a reference or link to a source of the content.

The command type indicates an action taken or requested. In some embodiments, the command type indicates one of a list of actions including: add, update, delete, get, get-results, query, query-result, query-end and clear. For incoming commands, the command type indicates a change that has occurred. For example, a command received with an add command type means that content was added to the content node. For outgoing commands, the command type indicates a change that the content router is requesting to occur on a content node in order to keep the content node synchronized with a content node where a change was made. For example, an add command type means that the content specified in the payload should be added to the content node.

A command having a command type of add indicates an action of adding a content record to a content node. Payload for an add-command type may include the content itself, metadata about the content and/or a reference to the content.

A command having a command type of delete indicates an action of deleting a content record from a content node. Payload for a delete-command type may include metadata indicating which content and/or metadata about the content to delete.

A command having a command type of get indicates a request for getting the contents of a record from a content node. Payload for a get-command type may include metadata indicating which content and/or metadata about the content to get. A command having a command type of get-result is a command sent in response to a get-command type. Payload for a get-result type may include the content itself, metadata about the content and/or a reference to the content.

A command having a command type of query indicates a request for a category of content from a content node. Payload for a query-command type indicates the category of content being requested. The query-command type may be used to request all content on a content node, or all content having particular characteristics. A command having a command type of query-result indicates a response to a query-command type. Payload for a query-result-command type includes the requested content or metadata about the content. The query-result-commands may be sent by the content node 300 in multiple batches; therefore the content router 200 may need to given an indication of when the query results flow has finished. The final response to a query-command type is indicated in a command having a command type of query-end. The Payload for a query-end-command type may be either the final content having the particular characteristic or a null thereby indicated an empty set response. If no results are found, a query-command type results in a query-end-command type indicating a null response. If a single result is found, a query-command type results in a query-end-command type indicating a matching response. If more than one result is found, a query-command type results in one or more query-result-command types followed by a query-end-command type containing the final match.

A command having a command type of clear instructs a content node to remove a category of content indicated by the payload. A command having a command type of refresh instructs the content router 200 to recover the sending content node. Depending on the content node capabilities and the user configuration in the connected data set configuration, recovering may be initiated by either sending the content node 300 a clear command to clear its content or a query command to import all its data. In either case, the content node 300 may receive a consolidated content and metadata from one or more of the other content nodes, such that the content node 300 may be in-synch with connected content nodes.

The command also includes a data payload having a format dependent on the command type and data type. The data payload may contain a changed record or may contain metadata such as a link or reference to the changed record located at the data source or at a file relay server.

Figure 14A:
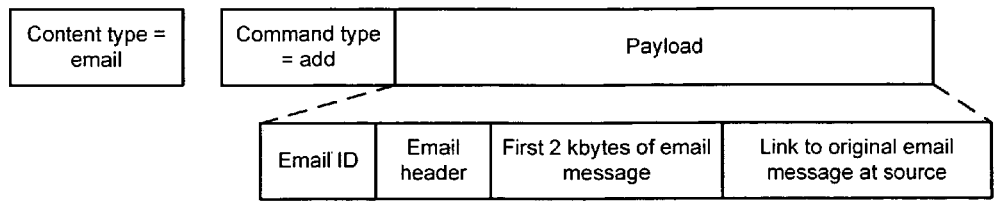
Figure 14B:
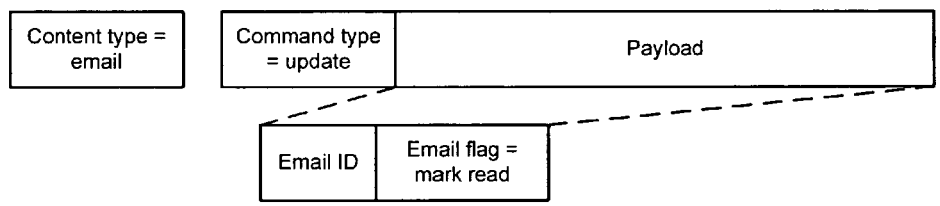
Figure 14C:
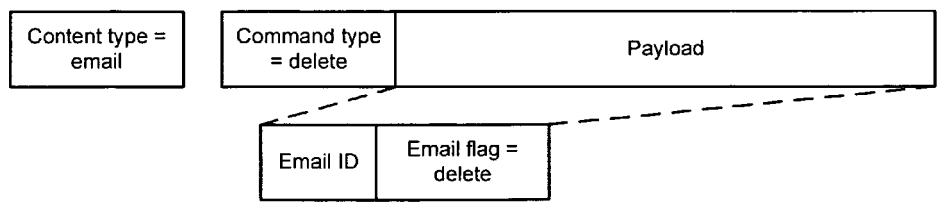

FIG. 14A shows a new email to be added to a content node. The data payload includes an email ID used to uniquely identify an email, a header, the first 2 kilobytes of the message and a link to the original message. FIG. 14B shows a command to instruct content nodes that an email has been read. FIG. 14C shows a command to delete a particular email.

Figure 14D:
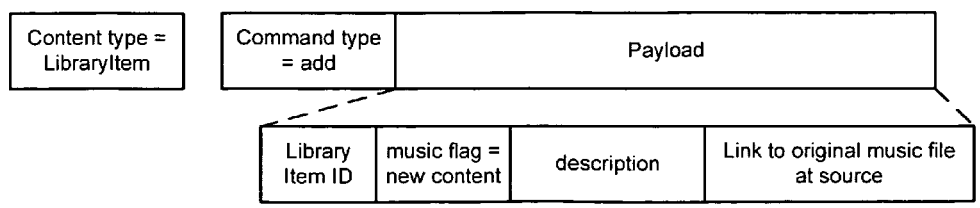
Figure 14E:
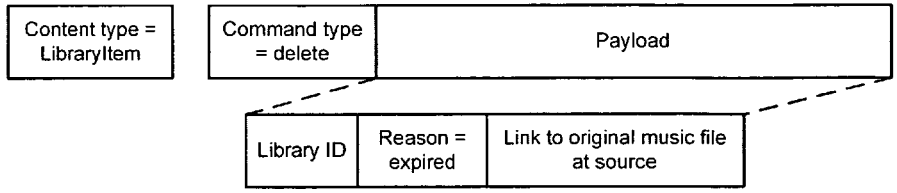
Figure 14F:
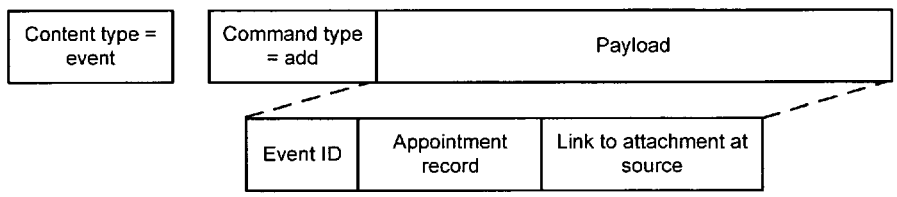
Figure 14G:
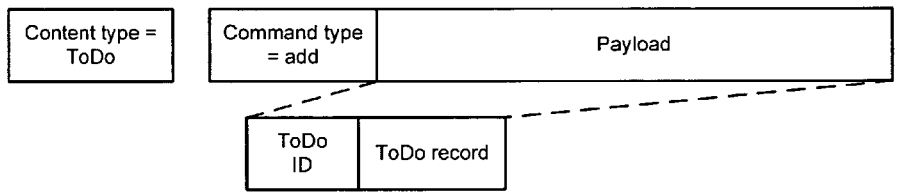
Figure 14H:
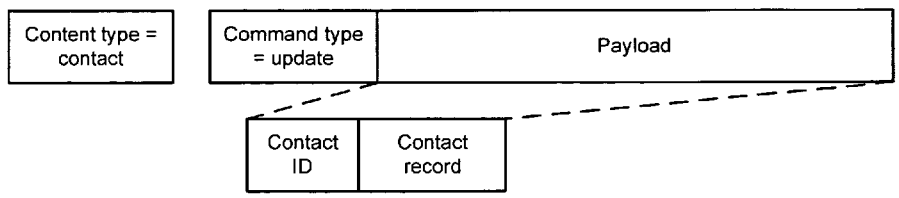
Figure 14I:
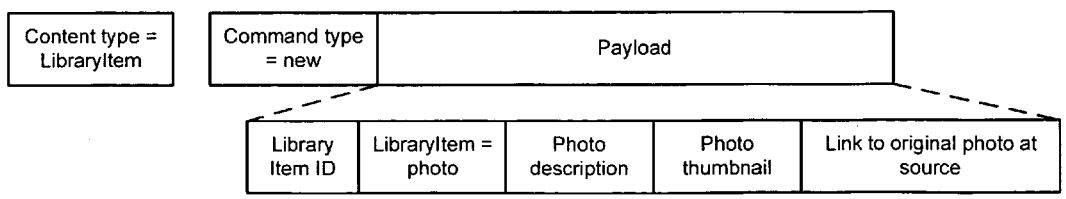

FIG. 14D shows a command to add a new audio file. FIG. 14E shows a command to delete an audio file. FIG. 14F shows a command to add a new appointment. FIG. 14G shows a command to add a new contact where the command contains the record. FIG. 14H shows a command to update a new contact where the command also contains the record. FIG. 14I shows a command to add a photo image. The photo itself is not included in the command but a reference to the original photo image may be included.

Figure 15A:
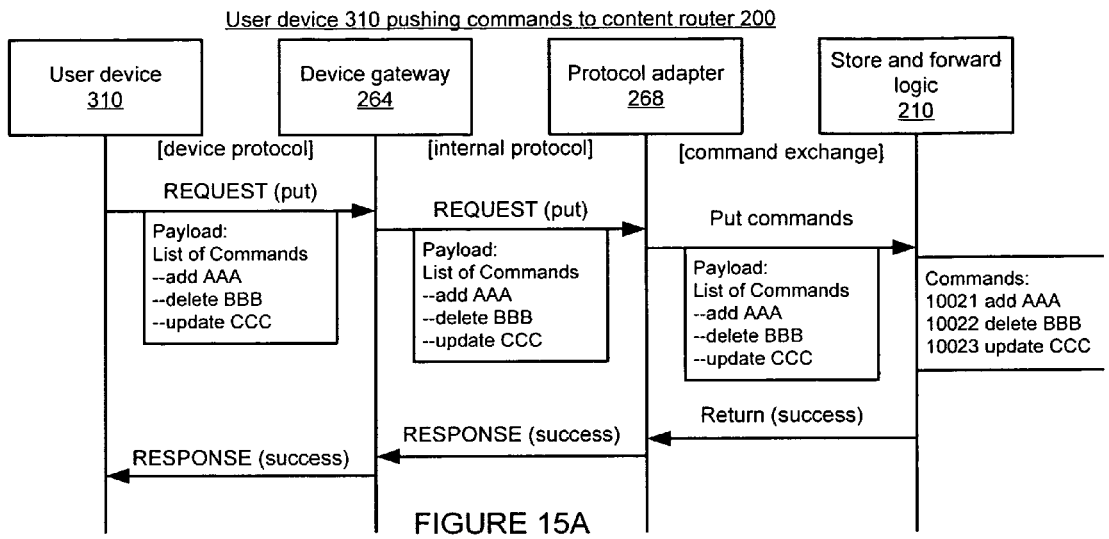
FIGS. 15A to 15C illustrate sequence diagrams showing signaling between a user device and store and forward logic according to embodiments of the present invention.
Figure 15B:
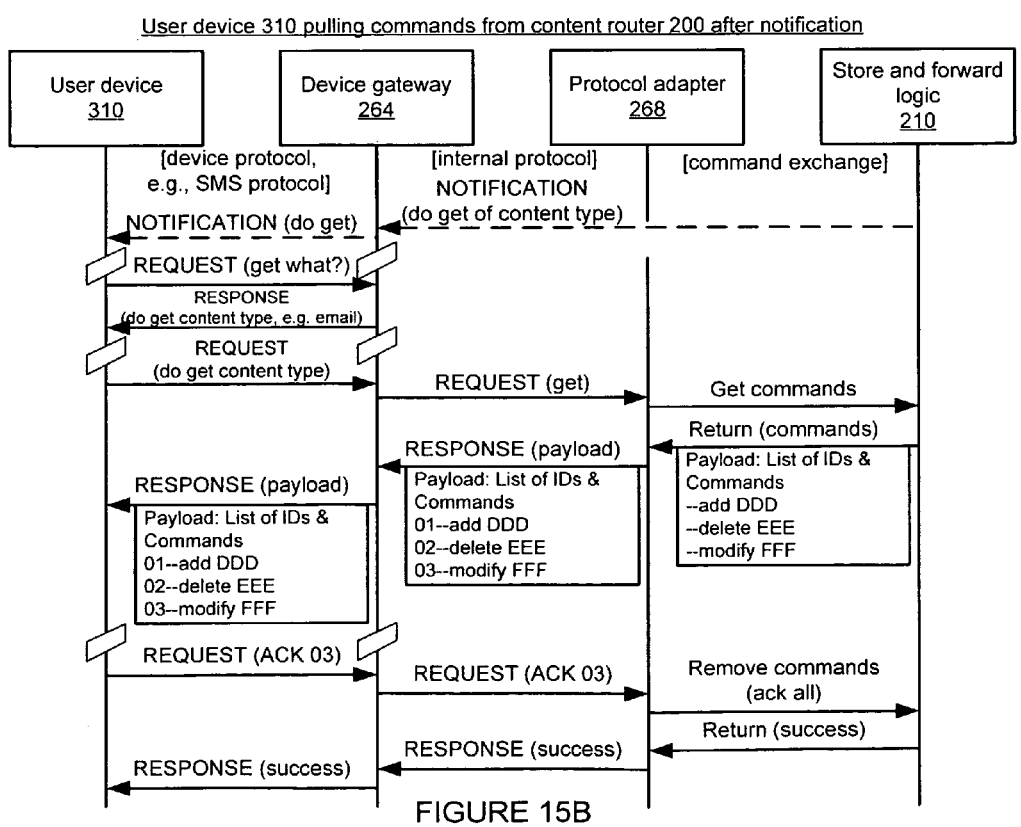
Figure 15C:
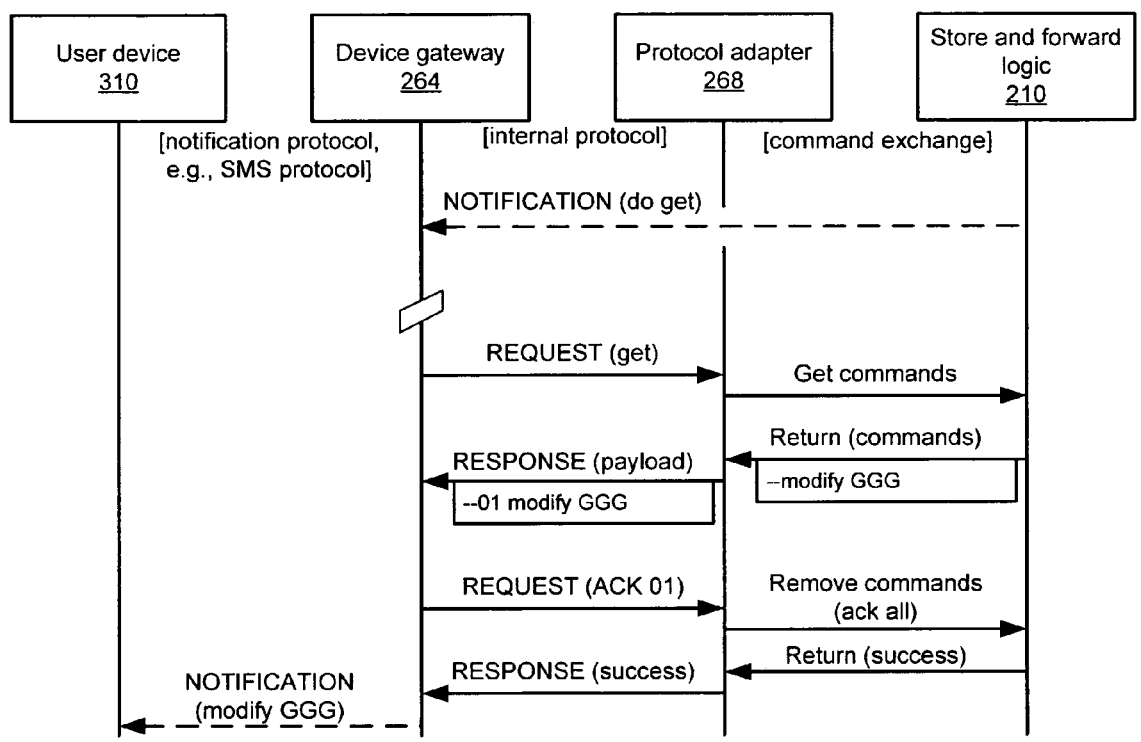

FIGS. 15A to 15C illustrate sequence diagrams showing signaling between a user device 310 and store and forward logic 210 according to embodiments of the present invention.

FIG. 15A shows a sequence when a user device 310 pushes one or more commands to a content router 200. A user device 310, such as a mobile PC with wireless capabilities, may undergo a series of changes to content and metadata on the user device 310. An application running on the user device 310 may periodically prepare a payload indicating the changes made during the period or may send commands when it regains wireless communications. Using a protocol available to the user device 310, the application prepares a REQUEST message to put a payload containing a list of commands. For example, a user may have received a new SMS message AAA. Therefore, the application may generate a command indicating that connected content nodes may add a new email AAA. Additionally, the user may have deleted an event BBB from a calendar and updated a contact CCC with a work phone number. In some embodiments, a batch of commands is limited to include only commands operating on a common command type. For example, a batch of commands may include only commands add, delete or modify email messages.

Those skilled in the art will recognize that a user device 310 may use various protocols to communication with the device gateway 264. Therefore, the REQUEST-RESPONSE protocol shown here is just one possibility. According to embodiments of the invention, each REQUEST-RESPONSE is an atomic pair of commands, where both commands must occur otherwise neither is considered successful. Unlike other protocols requiring multiple REQUEST-RESPONSE pairs, each REQUEST-RESPONSE pair according to the present invention may make progress in performing a task. For a wireless network, a long sequence of pairs of commands has a greater probability of incurring and interruption. Therefore, the single REQUEST-RESPONSE atomic pair provides optimal reliability and through put.

The user device 310 sends the REQUEST to put commands contained in its payload to a device gateway 264, which models a server to the user device 310. In modeling a server, the device gateway 264 acts on and responds to requests. The device gateway 264 translates from the device protocol to the internally used protocol, and then sends to the protocol adapter 268 a REQUEST indicating a put of the commands indicated in the payload. Alternatively, if the user device 310 was enabled to communicate using the internal protocol, the device gateway 264 may be bypassed.

The protocol adapter 268 converts the payload of the REQUEST to a sequence of commands (e.g., add, delete and update) and sends (puts) the commands to the store and forward logic 210 for the store and forward logic 210 to process. The store and forward logic 210 may assign a monotonically increasing primary key (e.g., 0010021, 0010022 and 0010023) to each command for internal use. Furthermore for each command, the store and forward logic 210 may determine a database ID, which may uniquely identify a user, a particular content node, and a content type. The store and forward logic 210 may also set the queue ID for each command to indicate that the command is an incoming or outgoing command that is pending execution or pending acknowledgement of successful execution. The store and forward logic 210 may perform a conflict check against each of the commands associated with the same database ID. If no conflicts are detected, the commands may be stored in the database with the assigned attributes. If a conflict is detected, the store and forward logic 210 resolves the conflict by removing a command existing in the database, discarding the incoming conflicting command, and/or aggregating the incoming command and the existing command.

In response to successful processing and entry into the incoming queue, the store and forward logic 210 returns an indication of the success to the protocol adapter 268. The protocol adapter 268 in turn responds to the REQUEST from the device gateway 264 with a RESPONSE that indicates successful forwarding of all of the commands received in the REQUEST. Likewise, the successful processing of the REQUEST from the user device 310 is acknowledged with a RESPONSE indicating the success as shown. A user device 310 receiving the RESPONSE indicating a success may discard the payload of commands sent earlier. If the user device 310 fails to receive this acknowledgement, it may resend the payload of commands in a subsequent REQUEST.

In accordance with embodiments of the present invention, a user device 310 completes a transaction with the content router 200 with a single REQUEST-RESPONSE exchange as shown. A single REQUEST-RESPONSE exchange reduces the change of an error interrupting a session as would occur if a protocol required multiple REQUEST-RESPONSE exchanges to complete a transaction. Each request and response pair is designed to make progress, unlike multi-pair protocols. In a multi-pair protocol, if a failure occurs midstream all progress is lost and the entire session must be restarted from the beginning. Therefore, in accordance with embodiments of the present invention, each successful single REQUEST-RESPONSE exchange makes progress towards completing a task of synchronizing content nodes and any failure effects only the single REQUEST-RESPONSE exchange.

FIG. 15B shows a sequence when a user device 310 requests (pulls) commands from a content router 200 after a notification is received. Once the store and forward logic 210 generates and stores a new outgoing command in the outgoing queue 241, the store and forward logic 210 may generate a notification signal to instruct the device gateway 264 to send a notification to the user device 310. The notification may or may not include an indication of content type. The device gateway 264 may collect a series of notifications destined for a content node and may periodically send the collected notifications to the user device 310, for example, using an HTTP packet, if available, or an SMS message. Notifications may be sent with little delay if a user device 310 is connected to the network 10 with a cost free channel or a channel of negligible cost, such as if it is docked to a wired internet connection. Notifications may be collected and send at frequent intervals if the user device 310 is connected with an inexpensive channel, such as with a GPRS connection. Notifications may be collected and sent infrequently if user device 310 is connected with an expensive channel, such as a SMS connection. In some embodiments, the content routing system keeps a flag updated to indicate a current connection type, thereby providing a variable the content routing system may use when determining a frequency of updating a content node.

After receiving the notification, the user device 310 may begin a single REQUEST-RESPONSE session to get a content type of pending commands. The user device 310 sends the device gateway 264 a REQUEST to get content type of the pending commands. The device gateway 264 replies with a RESPONSE to the REQUEST including an indication of the content type of the pending command.

After receiving the content type, the user device 310 may begin a single REQUEST-RESPONSE session to get a single command or batch of pending commands. The user device 310 sends the device gateway 264 a REQUEST to get pending commands. The device gateway 264 converts the REQUEST from the external protocol used by the user device 320 to a common internal protocol. The device gateway 264 sends the REQUEST in the common protocol to the protocol adapter 268. The protocol adapter 268 converts the REQUEST to a call to get commands from the outgoing queue 241. The store and forward logic 210 returns a payload containing a batch of commands from the outgoing queue 241. Alternatively, the store and forward logic 210 may return a single command at a time, which the protocol adapter 268 may combine to form a batch of commands. The protocol adapter 268 may associated an index to indicate the number of commands in the payload. The protocol adapter 268 replies to the REQUEST received from the device gateway 264 with a RESPONSE containing the payload of commands to be executed by the user device 310. Alternatively, the protocol adapter 268 may reply with a single command at a time in each response. The device gateway 264 forwards the RESPONSE as a RESPONSE to the REQUEST originally received from the user device 310.

Some time after the initial REQUEST-RESPONSE exchange, the user device 310 begins a second REQUEST-RESPONSE exchange to acknowledge successful processing of the commands. The device gateway 264 forwards this acknowledgement to the protocol adapter 268, which make a call to remove commands from the in-transit queue 242 in the store and forward logic 210. The store and forward logic 210 returns a success. The protocol adapter 268 replies to the REQUEST with a RESPONSE acknowledging the success. The device gateway 264 then replies to the REQUEST from the user device 310 with a RESPONSE acknowledging the success.

FIG. 15C shows a sequence of events when a content router 200 pushes a command within a notification to a user device 310. In some embodiments, the store and forward logic 210 includes a low priority and/or relatively small payload within a notification. For example, the fact that an email has been read may be considered a low priority and small byte sized event. Such low priority events may be communicated with a notification layer without the necessity of receiving an acknowledgement typically required in a REQUEST-RESPONSE exchange. For example, the store and forward logic 210 may send a payload including a flag showing that content GGG was modified. Command GGG may represent an email flag used to indicate that an email has changed from an unread state to a read state. The payload may also contain an indicator used to identify the particular email. Once the notification signal is received, the communication between the device gateway 264, the protocol adapter 268 and the store and forward logic 210 operate as described above with reference to FIG. 15B. Eventually, the device gateway 264 sends a notification including the command to the user device 310.

FIGS. 16A to 16D illustrate sequence diagrams showing signaling between a user account 320 and store and forward logic 210 according to embodiments of the present invention.

Figure 16A:
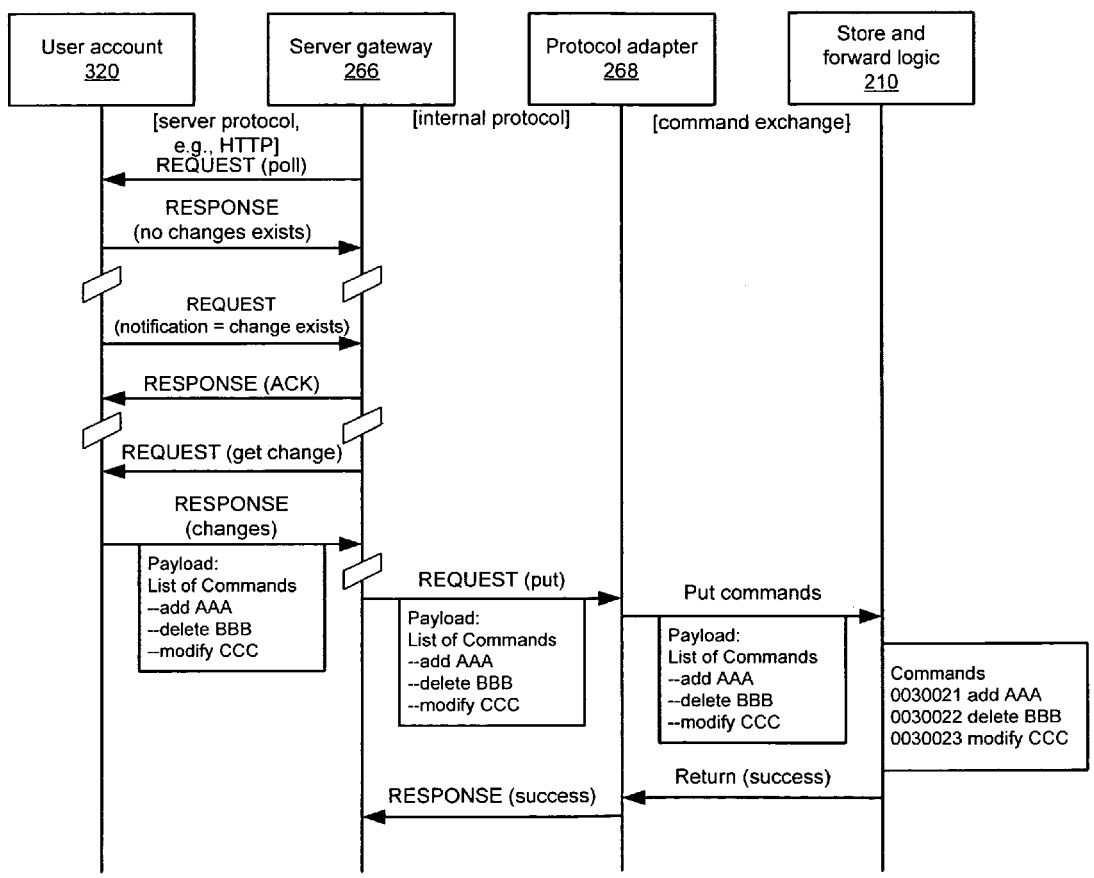
FIGS. 16A to 16D illustrate sequence diagrams showing signaling between a user account and store and forward logic according to embodiments of the present invention.

FIG. 16A shows a sequence when a content router 200 receives (gets) commands from a user account 320. A server gateway 266 may periodically poll the user account 320 with a single REQUEST-RESPONSE exchange. If not changes exist, the user account 320 may send a RESPONSE indicated such. If a change exists, the user account 320 may send a RESPONSE indicated the change (not shown). Alternatively, some user accounts 320 may initiate a REQUEST-RESPONSE exchange to indicate that a change exists. The server gateway 266 acknowledges that the REQUEST was received with a RESPONSE including an acknowledgement. In either case, once the server gateway 266 knows that one or more changes exists, the server gateway 266 sends a REQUEST requesting the changes. The user account replies in a RESPONSE with a payload containing a list commands.

The server gateway 266 translates from the server protocol to the common internally used protocol, and then sends to the protocol adapter 268 a REQUEST indicating a put of the commands indicated in the payload. Alternatively, if the user account 320 was enabled to communicate using the common protocol, the server gateway 266 may be bypassed.

The protocol adapter 268 converts the payload of the REQUEST to a sequence of commands (e.g., add, delete and update) and provides the commands to the store and forward logic 210. The store and forward logic 210 processes each command. The store and forward logic 210 may assign a monotonically increasing primary key (e.g., 0030021, 0030022 and 0030023) to each command. Furthermore for each command, the store and forward logic 210 may determine a database ID, which may uniquely identify a user, a particular content node, and a content type. The store and forward logic 210 may also set the queue ID for each command to indicate that the command is in an incoming queue state. The store and forward logic 210 may perform a conflict check against each of the commands associated with the same database ID. If no conflicts are detected, the commands may be stored in the database with the assigned attributes. If a conflict is detected, the store and forward logic 210 resolves the conflict by removing a command existing in the database, discarding the incoming conflicting command, and/or aggregating the incoming command and the existing command.

In response to successful processing and entry into the incoming queue, the store and forward logic 210 returns an indication of the success to the protocol adapter 268. The protocol adapter 268 in turn responds to the REQUEST from the server gateway 266 with a RESPONSE of success. If any REQUEST-RESPONSE exchange fails, previous REQUEST-RESPONSE exchange will not need to be repeated. In some embodiments, the server gateway 266 exchanges a REQUEST-RESPONSE pair (not shown) with the user account 320 to inform the user account 320 that it may discard the previously communicated commands.

Figure 16B:
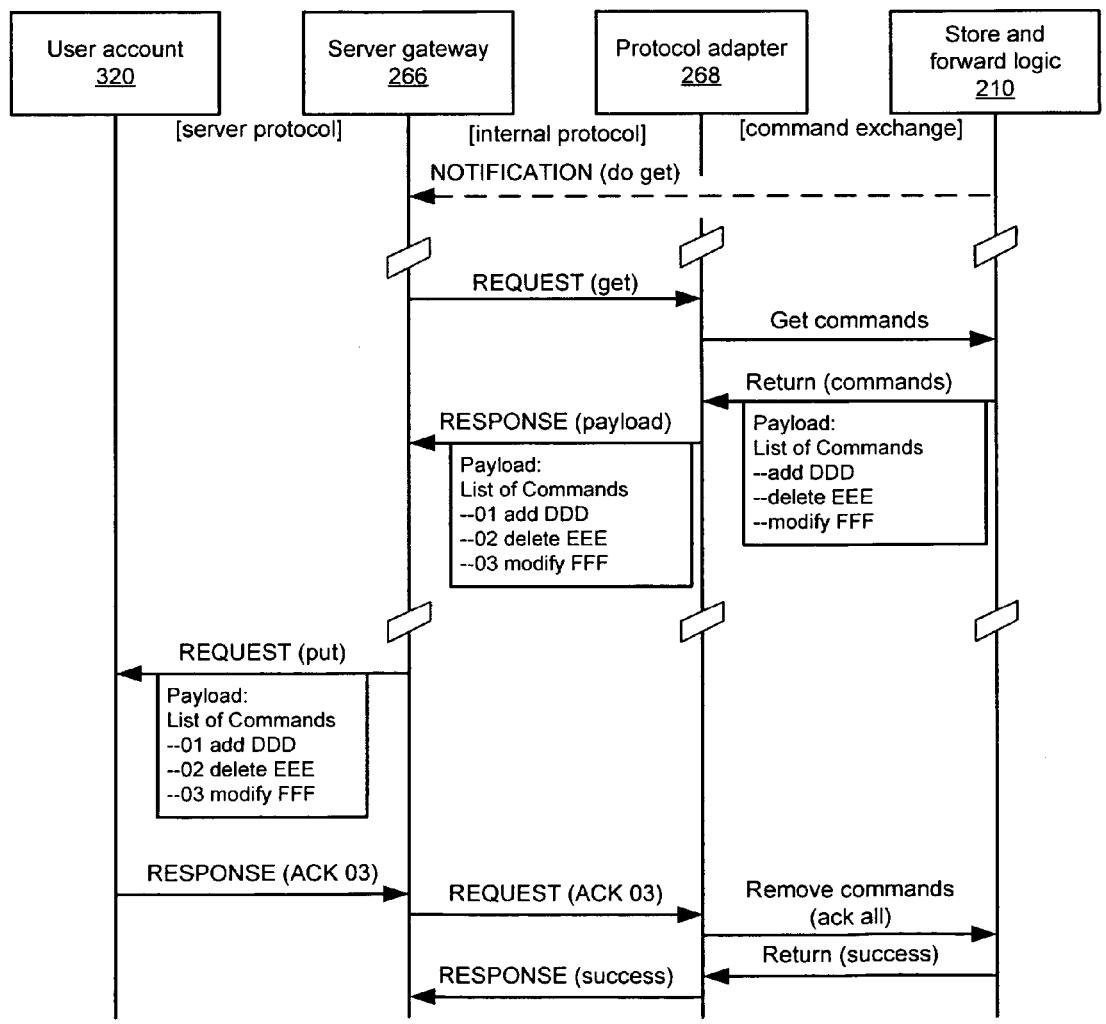

FIG. 16B shows a sequence when a content router 200 pushes (puts) commands to a user account 320. When store and forward logic 210 has commands in its outgoing queue for a user account 320, it may send a notification signal to the server gateway 266. In some embodiments, the notification signal includes a content type. The server gateway 266 captures the notifications and models a client when sending a REQUEST to get pending outgoing commands. In modeling a client, the server gateway 266 initiates request on behave of the user account for the outgoing commands. The protocol adapter 268 performs a get-commands call to the store and forward logic 210, which returns with a payload of commands. For example, the payload of commands may include adding a new email DDD, deleting a contact EEE, and modifying a title of multimedia content FFF. The protocol adapter 268 may assign an index to each command and includes the commands in a RESPONSE to the previously received REQUEST. The server gateway 266 then models a client and initiates a REQUEST to put commands to the user account 320. The user account 320 acknowledges receipt of the REQUEST and commands with a RESPONSE. The server gateway 266 then initiates a REQUEST to acknowledge receipt of the commands by the user account 320. The protocol adapter converts the acknowledgement into a remove commands call to the store and forward logic 210 to remove commands from the in-transits queue. The store and forward logic 210 returns a success, and the protocol adapter 268 acknowledges the RESPONSE received from the server gateway 266 with a RESPONSE.

Figure 16C:
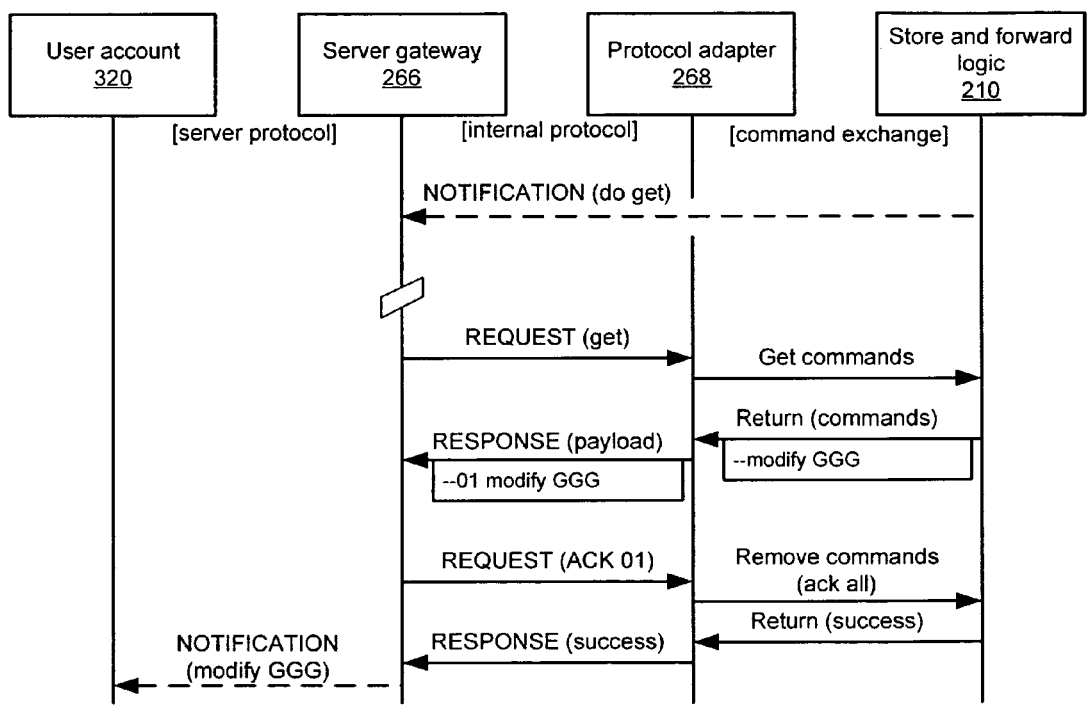

FIG. 16C shows a sequence of events when a server gateway 266 pushes a command in a notification message to a user account 320. In some embodiments, the store and forward logic 210 may include a low priority and/or relatively small payload with a notification. For example, the fact that an email has been read may be considered a low priority and small byte sized event. Such low priority events may be communicated with the notification layer without the necessity of receiving an acknowledgement typically required in a REQUEST-RESPONSE exchange. In some embodiments, the notification signal includes a content type. In response to receiving the initial notification signal, the server gateway 266 may model a client when sending a REQUEST to get pending outgoing commands. In response, the protocol adapter 268 performs a get-commands call to the store and forward logic 210, which returns with a command. For example, the command GGG may include an instruction to modifying a read state of an email. The protocol adapter 268 may assign an index to the command and includes the command in a RESPONSE to the previously received REQUEST. The server gateway 266 then pushes the command in a notification signal to the user account 320. Either before or after sending of the notification signal, the server gateway 266 may initiates a REQUEST to acknowledge receipt of the commands by the user account 320. The protocol adapter converts the acknowledgement into a remove command call to the store and forward logic 210 to remove the command from the in-transits queue. The store and forward logic 210 returns a success, and the protocol adapter 268 acknowledges the RESPONSE received from the server gateway 266 with a RESPONSE.

Figure 16D:
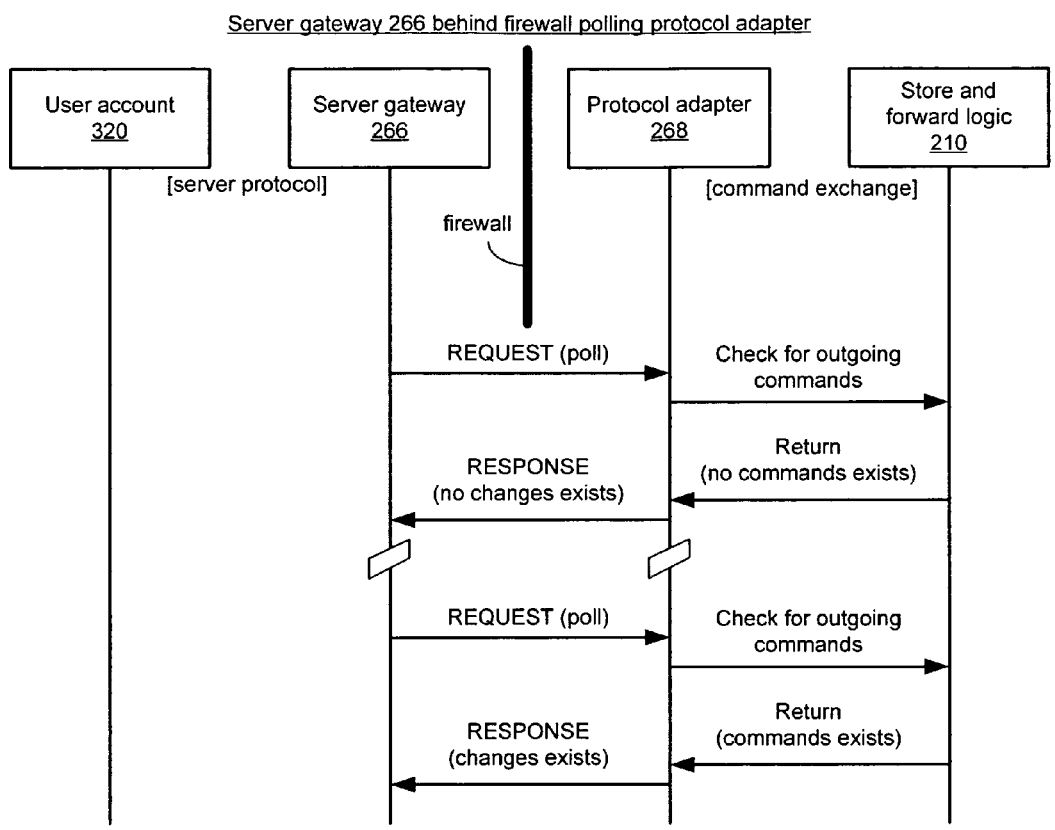

FIG. 16D shows an embodiment of the present invention with a server gateway 266 positioned behind a firewall along with an account server having a user account 320. If the server gateway 266 is behind a firewall, the protocol adapter 268 may be unable to initiate a REQUEST-RESPONSE exchange and a notification from the protocol adapter 268 would be blocked. In this case, the server gateway 266 may initiate each REQUEST-RESPONSE exchange.

Instead of receiving notifications to determine that the content router 200 has commands in its outgoing queue 241, the server gateway 266 may request the notification information by initiating a REQUEST-RESPONSE exchange. The server gateway 266 may periodically poll for commands in the outgoing queue 241 by sending the protocol adapter 268 a REQUEST indicating a poll for outgoing commands is requested. In response, the protocol adapter 268 calls the store and forward logic 210 to check for any outgoing commands for the user account 320. The store and forward logic 210 returns an indication of whether or not any commands exist in the outgoing queue 241. The protocol adapter 268 may respond to the previous REQUEST with a RESPONSE including the returned indication of whether or not any commands exist in the outgoing queue 241. If a command exists in the outgoing queue 241, the server gateway 266 may initiate a REQUEST to get the outgoing commands as shown in FIG. 16B (with a REQUEST-RESPONSE exchange) or as shown in FIG. 16C (within a notification signal). Additionally, the server gateway 266 may poll the user account 320 for changes if the user account 320 communicates commands to the server gateway 266, the server gateway 266 may initiate a REQUEST to put the commands to the incoming queue 231 as shown in FIG. 15A.

While the invention has been described in terms of particular embodiments and illustrative figures, those of ordinary skill in the art will recognize that the invention is not limited to the embodiments or figures described.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination of these. Different aspects of the invention may be implemented at least partly as computer software or firmware running on one or more data processors and/or digital signal processors. The invention may be implemented in a computer program product such as a machine readable medium (e.g., a memory card, ROM, RAM, PROM, EPROM, flash memory, magnetic or optical diskette, CD-ROM, DVD, and the like). The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A gateway for communicating an outgoing command from a command memory of a content router to a content node, the gateway comprising a computer-readable medium encoded with computer readable instructions for:
   receiving, from the command memory of the content router, a notification signal, wherein the received notification signal indicates a content type of an outgoing command in the command memory of the content router available for the content node;
   sending, to the command memory of the content router, a request for the outgoing command, the request including the content type;
   receiving, from the command memory of the content router, a response including the outgoing command;
   preparing, in response to receiving the outgoing command, an outgoing message including the outgoing command; and
   sending, to the content node, the message including the outgoing command in a notification signal to the content node.

2. The gateway of claim 1, further comprising computer-readable instructions for receiving, from the content node, a response acknowledging that the outgoing command was received by the content node.

3. The gateway of claim 1, further comprising computer-readable instructions for delaying sending for a duration of time based on a connection type between the gateway and the content node.

4. The gateway of claim 3, wherein the duration of time is further based on a duration of time to a previous communication between the gateway and the content node.

5. The gateway of claim 1, wherein the outgoing command includes metadata and an identification of content.

6. The gateway of claim 5, wherein the metadata includes a flag.

7. The gateway of claim 5, wherein the identification of content identifies an email message on the content node.

8. The gateway of claim 7, wherein the metadata indicates a read/unread state of the email.

9. The gateway of claim 1, further comprising computer-readable instructions for:
   sending, to the command memory of the content router, a request including an acknowledgement indicating that the outgoing command may be discarded; and
   receiving, from the command memory of the content router, a response including an indication that the request including the acknowledgement was received by the command memory of the content router.

10. The gateway of claim 1, wherein the computer-readable instructions for sending the outgoing command in the notification signal includes logic for sending the outgoing command as an encoded binary sequence of bits.

11. The gateway of claim 1, wherein the computer-readable instructions for sending, to the content node, the command in the notification signal includes logic for using an SMS gateway.

12. The gateway of claim 1, wherein the computer-readable instructions for sending, to the content node, the message including the outgoing command includes logic for sending a request including the command, the gateway further comprising computer-readable instructions for receiving, from the content node, a response indicating that the request including the command was received by the content node.

13. The gateway of claim 12, further comprising computer-readable instructions for:
   sending, to the command memory of the content router, a request including an acknowledgement indicating that the outgoing command may be discarded, wherein the sending is in response to receiving, from the content node, the response indicating that the request including the command was received by the content node; and
   receiving, from the command memory of the content router, a response including an indication that the request including the acknowledgement was received by the command memory of the content router.

14. The gateway of claim 1, wherein the content node is a user device.

15. The gateway of claim 14, wherein the user device includes a mobile phone.

16. The gateway of claim 1, wherein the content node is a user account.

17. The gateway of claim 16, wherein the user account includes an email account.

18. The gateway of claim 1, wherein the computer-readable instructions for preparing the outgoing message includes computer-readable instructions for converting the outgoing command in a first protocol to the outgoing messages in a second protocol.

19. The gateway of claim 18, wherein the first protocol includes a Remote Gateway Invocation (RMI) protocol.

20. The gateway of claim 19, wherein the RMI protocol includes an RMI protocol over Internet Inter-ORB protocol (RMI-IIOP).

21. The gateway of claim 18, wherein the first protocol includes a Remote Procedure Calling (RPC) protocol.

22. The gateway of claim 21, wherein the RPC protocol includes an XML-RPC protocol.

23. The gateway of claim 18, wherein the second protocol includes a Remote Procedure Calling (RPC) protocol.

24. The gateway of claim 23, wherein the RPC protocol includes an XML-RPC protocol.

25. The gateway of claim 18, wherein the second protocol includes a device based protocol.

26. The gateway of claim 1, further including computer-readable instructions for:
    sending, to the content node, a notification excluding the content type;
    receiving, from the content node, a request requesting a content type of the outgoing command;
    sending, to the content node, a response including the content type of the outgoing command; and
    receiving, from the content node, a request requesting the outgoing command, wherein the request includes the content type.

27. The gateway of claim 1, wherein the computer-readable instructions for sending, to the content node, the message including the outgoing command includes computer-readable instructions for sending a plurality of outgoing commands.

28. The gateway of claim 1, further comprising the content router.

29. The gateway of claim 1, wherein the computer-readable instructions for receiving, from the command memory of the content router, the notification signal includes computer-readable instructions for receiving the notification signal from store and forward logic of the content router.

30. A method for communicating an outgoing command from a content router to a content node using a gateway, the method comprising, at the gateway:
    receiving, from the command memory of the content router, a notification signal, wherein the received notification signal indicates a content type of an outgoing command in the command memory of the content router available for the content node;
    sending, to the command memory of the content router, a request for the outgoing command, the request including the content type;
    receiving, from the command memory of the content router, a response including the outgoing command;
    preparing, in response to receiving the outgoing command, an outgoing message including the outgoing command; and
    sending, to the content node, the message including the outgoing command in a notification signal to the content node.

31. The method of claim 30, further comprising receiving, from the content node, a response acknowledging that the outgoing command was received by the content node.

32. The method of claim 30, further comprising delaying sending for a duration of time based on a connection type between the gateway and the content node.

33. The method of claim 32, wherein the duration of time is further based on a duration of time to a previous communication between the gateway and the content node.

34. The method of claim 32, wherein the outgoing command includes metadata and an identification of content.

35. The method of claim 34, wherein the metadata includes a flag.

36. The method of claim 34, wherein the identification of content identifies an email message on the content node.

37. The method of claim 36, wherein the metadata indicates a read/unread state of the email.

38. The method of claim 30, further comprising:
    sending, to the command memory of the content router, a request including an acknowledgement indicating that the outgoing command may be discarded; and
    receiving, from the command memory of the content router, a response including an indication that the request including the acknowledgement was received by the command memory of the content router.

39. The method of claim 30, wherein sending the outgoing command in the notification signal includes sending the outgoing command as an encoded binary sequence of bits.

40. The method of claim 30, wherein sending, to the content node, the command in the notification signal includes using an SMS gateway.

41. The method of claim 30, wherein sending, to the content node, the message including the outgoing command includes sending a request including the command, the method further comprising receiving, from the content node, a response indicating that the request including the command was received by the content node.

42. The method of claim 41, further comprising:
    sending, to the command memory of the content router, a request including an acknowledgement indicating that the outgoing command may be discarded, wherein the sending is in response to receiving, from the content node, the response indicating that the request including the command was received by the content node; and
    receiving, from the command memory of the content router, a response including an indication that the request including the acknowledgement was received by the command memory of the content router.

43. The method of claim 30, wherein the content node is a user device.

44. The method of claim 43, wherein the user device includes a mobile phone.

45. The method of claim 30, wherein the content node is a user account.

46. The method of claim 45, wherein the user account includes an email account.

47. The method of claim 30, wherein preparing the outgoing message includes converting the outgoing command in a first protocol to the outgoing messages in a second protocol.

48. The method of claim 47, wherein the first protocol includes a Remote Method Invocation (RMI) protocol.

49. The method of claim 48, wherein the RMI protocol includes an RMI protocol over Internet Inter-ORB protocol (RMI-IIOP).

50. The method of claim 47, wherein the first protocol includes a Remote Procedure Calling (RPC) protocol.

51. The method of claim 50, wherein the RPC protocol includes an XML-RPC protocol.

52. The method of claim 47, wherein the second protocol includes a Remote Procedure Calling (RPC) protocol.

53. The method of claim 52, wherein the RPC protocol includes an XML-RPC protocol.

54. The method of claim 47, wherein the second protocol includes a device based protocol.

55. The method of claim 30, further including:
sending, to the content node, a notification excluding the content type;
receiving, from the content node, a request requesting a content type of the outgoing command;
sending, to the content node, a response including the content type of the outgoing command; and
receiving, from the content node, a request requesting the outgoing command, wherein the request includes the content type.

56. The method of claim 30, wherein sending, to the content node, the message including the outgoing command includes sending a plurality of outgoing commands.

57. A computer-readable storage medium comprising program code for use in a gateway including processing logic for communicating an outgoing command from a content router to a content node, the computer-readable storage medium comprising:
program code for receiving, from the command memory of the content router, a notification signal, wherein the received notification signal indicates a content type of an outgoing command in the command memory of the content router available for the content node;
program code for sending, to the command memory of the content router, a request for the outgoing command, the request including the content type;
program code for receiving, from the command memory of the content router, a response including the outgoing command;
program code for preparing, in response to receiving the outgoing command, an outgoing message including the outgoing command; and
program code for sending, to the content node, the message including the outgoing command in a notification signal to the content node.

58. The computer-readable storage medium of claim 57, further comprising program code for receiving, from the content node, a response acknowledging that the outgoing command was received by the content node.

59. The computer-readable storage medium of claim 57, further comprising program code for delaying sending for a duration of time based on a connection type between the gateway and the content node.

60. The computer-readable storage medium-of claim 59, wherein the duration of time is further based on a duration of time to a previous communication between the gateway and the content node.

61. The computer-readable storage medium of claim 57, wherein the outgoing command includes metadata and an identification of content.

62. The computer-readable storage medium-of claim 61, wherein the metadata includes a flag.

63. The computer-readable storage medium-of claim 61, wherein the identification of content identifies an email message on the content node.

64. The computer-readable storage medium-of claim 63, wherein the metadata indicates a read/unread state of the email.

65. The computer-readable storage medium-of claim 57, further comprising:
program code for sending, to the command memory of the content router, a request including an acknowledgement indicating that the outgoing command may be discarded; and
program code for receiving, from the command memory of the content router, a response including an indication that the request including the acknowledgement was received by the command memory of the content router.

66. The computer-readable storage medium-of claim 57, wherein the program code for sending the outgoing command in the notification signal includes program code for sending the outgoing command as an encoded binary sequence of bits.

67. The computer-readable storage medium of claim 57, wherein the program code for sending, to the content node, the command in the notification signal includes program code for using an SMS gateway.

68. The computer-readable storage medium of claim 57, wherein the program code for sending, to the content node, the message including the outgoing command includes program code for sending a request including the command, the computer-readable storage medium further comprising program code for receiving, from the content node, a response indicating that the request including the command was received by the content node.

69. The computer-readable storage medium of claim 68, further comprising:
program code for sending, to the command memory of the content router, a request including an acknowledgement indicating that the outgoing command may be discarded, wherein the sending is in response to receiving, from the content node, the response indicating that the request including the command was received by the content node; and
program code for receiving, from the command memory of the content router, a response including an indication that the request including the acknowledgement was received by the command memory of the content router.

70. The computer-readable storage medium of claim 57, wherein the content node is a user device.

71. The computer-readable storage medium of claim 70, wherein the user device includes a mobile phone.

72. The computer-readable storage medium of claim 57 wherein the content node is a user account.

73. The computer-readable storage medium of claim 72, wherein the user account includes an email account.

74. The computer-readable storage medium of claim 57, wherein the program code for preparing the outgoing message includes program code for converting the outgoing command in a first protocol to the outgoing messages in a second protocol.

75. The computer-readable storage medium of claim 74, wherein the first protocol includes a Remote Computer program product Invocation (RMI) protocol.

76. The computer-readable storage medium of claim 75, wherein the RMI protocol includes an RMI protocol over Internet Inter-ORB protocol (RMI-IIOP).

77. The computer-readable storage medium of claim 74, wherein the first protocol includes a Remote Procedure Calling (RPC) protocol.

78. The computer-readable storage medium of claim 77, wherein the RPC protocol includes an XML-RPC protocol.

79. The computer-readable storage medium of claim 74, wherein the second protocol includes a Remote Procedure Calling (RPC) protocol.

80. The computer-readable storage medium of claim 79, wherein the RPC protocol includes an XML-RPC protocol.

81. The computer-readable storage medium of claim 74, wherein the second protocol includes a device based protocol.

82. The computer-readable storage medium of claim 57, further including:
program code for sending, to the content node, a notification excluding the content type;
program code for receiving, from the content node, a request requesting a content type of the outgoing command;
program code for sending, to the content node, a response including the content type of the outgoing command; and
receiving, from the content node, a request requesting the outgoing command, wherein the request includes the content type.

83. The computer-readable storage medium of claim 57, wherein the program code for sending, to the content node, the message including the outgoing command includes program code for sending a plurality of outgoing commands.

84. A content router for communicating outgoing commands from the content router to a plurality of content nodes, the content router comprising:
command memory for holding incoming and outgoing commands; and
processing logic, coupled to the command memory, for:
saving to the command memory an incoming command received from a first content node and associated with a content type;
selecting a set of destination content nodes based on the content type and one or more routing parameters; and
for each of the selected destination content nodes:
saving an outgoing command to the command memory;
sending, to a gateway, a notification signal, wherein the sent notification signal indicates the content type of the outgoing command in the command memory available for the destination content node;
receiving, from the gateway, a request for the outgoing command, the request including the content type;
sending, to the gateway, a response including the outgoing command;
receiving, from the gateway, a request including an acknowledgement indicating that the outgoing command may be discarded;
removing the outgoing command from the command memory; and
sending, to the gateway, a response including an indication that the request including the acknowledgement was received by the content router.

85. The content router of claim 84, wherein the outgoing command includes metadata and an identification of content.

86. The content router of claim 85, wherein the metadata includes a flag.

87. The content router of claim 85, wherein the identification of content identifies an email message on the destination content node.

88. The content router of claim 87, wherein the metadata indicates a read/unread state of the email.

89. The content router of claim 84, wherein the destination content node is a user device.

90. The content router of claim 89, wherein the user device includes a mobile phone.

91. The content router of claim 84, wherein the destination content node is a user account.

92. The content router of claim 91, wherein the user account includes an email account.

93. The content router of claim 84, wherein sending, to the gateway, the response including the outgoing command includes sending the outgoing command in a Remote Method Invocation (RMI) protocol.

94. The content router of claim 93, wherein the RMI protocol includes an RMI protocol over Internet Inter-ORB protocol (RMI-IIOP).

95. The content router of claim 84, wherein sending, to the gateway, the response including the outgoing command includes sending the outgoing command in a Remote Procedure Calling (RPC) protocol.

96. The content router of claim 95, wherein the RPC protocol includes an XML-RPC protocol.

97. The content router of claim 84, further comprising the gateway.

98. The content router of claim 84, further comprising a connected data set configuration, coupled to the processing logic, for holding the one or more routing parameters.

99. The content router of claim 84, further comprising store and forward logic including the command memory and the processing logic.

100. A method for communicating an outgoing command from a content router to a content node, the method comprising, at the content router:
sending, to a gateway, a notification signal, wherein the sent notification signal indicates a content type of an outgoing command in the content router available for the content node;
receiving, from the gateway, a request for the outgoing command, the request including the content type;
sending, to the gateway, a response including the outgoing command;
receiving, from the gateway, a request including an acknowledgement indicating that the outgoing command may be discarded; and
sending, to the gateway, a response including an indication that the request including the acknowledgement was received by the content router.

101. The method of claim 100, wherein the outgoing command includes metadata and an identification of content.

102. The method of claim 101, wherein the metadata includes a flag.

103. The method of claim 101, wherein the identification of content identifies an email message on the content node.

104. The method of claim 103, wherein the metadata indicates a read/unread state of the email.

105. The method of claim 100, wherein the content node is a user device.

106. The method of claim 105, wherein the user device includes a mobile phone.

107. The method of claim 100, wherein the content node is a user account.

108. The method of claim 107, wherein the user account includes an email account.

109. The method of claim 100, wherein sending, to the gateway, the response including the outgoing command includes sending the outgoing command in a Remote Method Invocation (RMI) protocol.

110. The method of claim 109, wherein the RMI protocol includes an RMI protocol over Internet Inter-ORB protocol (RMI-IIOP).

111. The method of claim 100, wherein sending, to the gateway, the response including the outgoing command includes sending the outgoing command in a Remote Procedure Calling (RPC) protocol.

112. The method of claim 111, wherein the RPC protocol includes an XML-RPC protocol.

113. A computer-readable storage medium comprising program code for use in a content router including processing logic for communicating an outgoing command from the content router to a content node, the computer-readable storage medium comprising:
- program code for sending, to a gateway, a notification signal, wherein the sent notification signal indicates a content type of an outgoing command in the content router available for the content node;
- program code for receiving, from the gateway, a request for the outgoing command, the request including the content type;
- program code for sending, to the gateway, a response including the outgoing command;
- program code for receiving, from the gateway, a request including an acknowledgement indicating that the outgoing command may be discarded; and
- program code for sending, to the gateway, a response including an indication that the request including the acknowledgement was received by the content router.

114. The computer-readable storage medium of claim 113, wherein the outgoing command includes metadata and an identification of content.

115. The computer-readable storage medium of claim 114, wherein the metadata includes a flag.

116. The computer-readable storage medium of claim 114, wherein the identification of content identifies an email message on the content node.

117. The computer-readable storage medium of claim 116, wherein the metadata indicates a read/unread state of the email.

118. The computer-readable storage medium of claim 113, wherein the content node is a user device.

119. The computer:readable storage medium of claim 118, wherein the user device includes a mobile phone.

120. The computer-readable storage medium of claim 113, wherein the content node is a user account.

121. The computer-readable storage medium of claim 120, wherein the user account includes an email account.

122. The computer-readable storage medium of claim 113, wherein the program code for sending, to the gateway, the response including the outgoing command includes program code for sending the outgoing command in a Remote Method Invocation (RMI) protocol.

123. The computer-readable storage medium of claim 122, wherein the RMI protocol includes an RMI protocol over Internet Inter-ORB protocol (RMI-IIOP).

124. The computer-readable storage medium of claim 113, wherein the program code for sending, to the gateway, the response including the outgoing command includes program code for sending the outgoing command in a Remote Procedure Calling (RPC) protocol.

125. The computer-readable storage medium of claim 124, wherein the RPC protocol includes an XML-RPC protocol.

* * * * *

UNITED STATES PATENT AND TRADEMARK OFFICE
CERTIFICATE OF CORRECTION

PATENT NO. : 7,623,515 B2
APPLICATION NO. : 11/182288
DATED : November 24, 2009
INVENTOR(S) : Breuer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1071 days.

Signed and Sealed this

Twenty-sixth Day of October, 2010

David J. Kappos
*Director of the United States Patent and Trademark Office*